(12) United States Patent  
Logan et al.

(10) Patent No.: US 9,416,827 B1
(45) Date of Patent: Aug. 16, 2016

(54) CLUTCH ASSEMBLY WITH DUAL ACTUATION PISTON

(71) Applicant: Logan Clutch Corporation, Westlake, OH (US)

(72) Inventors: W. Andrew Logan, Lakewood, OH (US); Michael S. Vining, Lakewood, OH (US); Robert S. Tekesky, North Olmsted, OH (US); Robert M. Kalinsky, Broadview Heights, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 0 days.

(21) Appl. No.: 14/823,072

(22) Filed: Aug. 11, 2015

Related U.S. Application Data

(63) Continuation-in-part of application No. 14/256,119, filed on Apr. 18, 2014, now Pat. No. 9,284,993, and a continuation-in-part of application No. 13/135,003, filed on Jun. 22, 2011, now Pat. No. 8,839,933.

(60) Provisional application No. 62/036,253, filed on Aug. 12, 2014, provisional application No. 61/872,275, filed on Aug. 30, 2013, provisional application No. 61/398,303, filed on Jun. 23, 2010.

(51) Int. Cl.
*F16D 25/08* (2006.01)
*F16D 13/52* (2006.01)
*F16D 25/12* (2006.01)
*F16D 48/02* (2006.01)

(52) U.S. Cl.
CPC .............. *F16D 25/083* (2013.01); *F16D 13/52* (2013.01); *F16D 25/14* (2013.01); *F16D 2300/08* (2013.01); *F16D 2300/14* (2013.01)

(58) Field of Classification Search
CPC ..... F16D 25/06; F16D 25/062; F16D 25/063; F16D 25/0635; F16D 25/0638; F16D 25/08; F16D 25/082; F16D 25/083; F16D 25/14; F16D 13/22; F16D 13/38; F16D 13/52; F16D 2125/04; F16D 2125/06; F16D 2125/08
See application file for complete search history.

(56) References Cited

U.S. PATENT DOCUMENTS

| 2011/0099994 A1* | 5/2011 | Reisch | .................. F16D 25/061 60/477 |
| 2011/0108384 A1* | 5/2011 | Reisch | .................. F16D 25/061 192/69 |

* cited by examiner

*Primary Examiner* — Jacob S Scott
(74) *Attorney, Agent, or Firm* — Ralph E. Jocke; Walker & Jocke

(57) ABSTRACT

A clutch assembly includes a fluid-actuated piston that allows clutch usage in both high pressure and low pressure applications. The configuration of the clutch assembly is usable with both hydraulic and pneumatic pressure actuation. Seal configurations create differently sized internal piston surface areas against which inlet pressure applied at hydraulic or pneumatic fluid inlet ports act to move the piston. The utilization of differently sized piston surface areas allows the piston to apply essentially the same clutch engaging compression force in both high pressure hydraulic actuation and lower pressure pneumatic actuation applications.

19 Claims, 33 Drawing Sheets

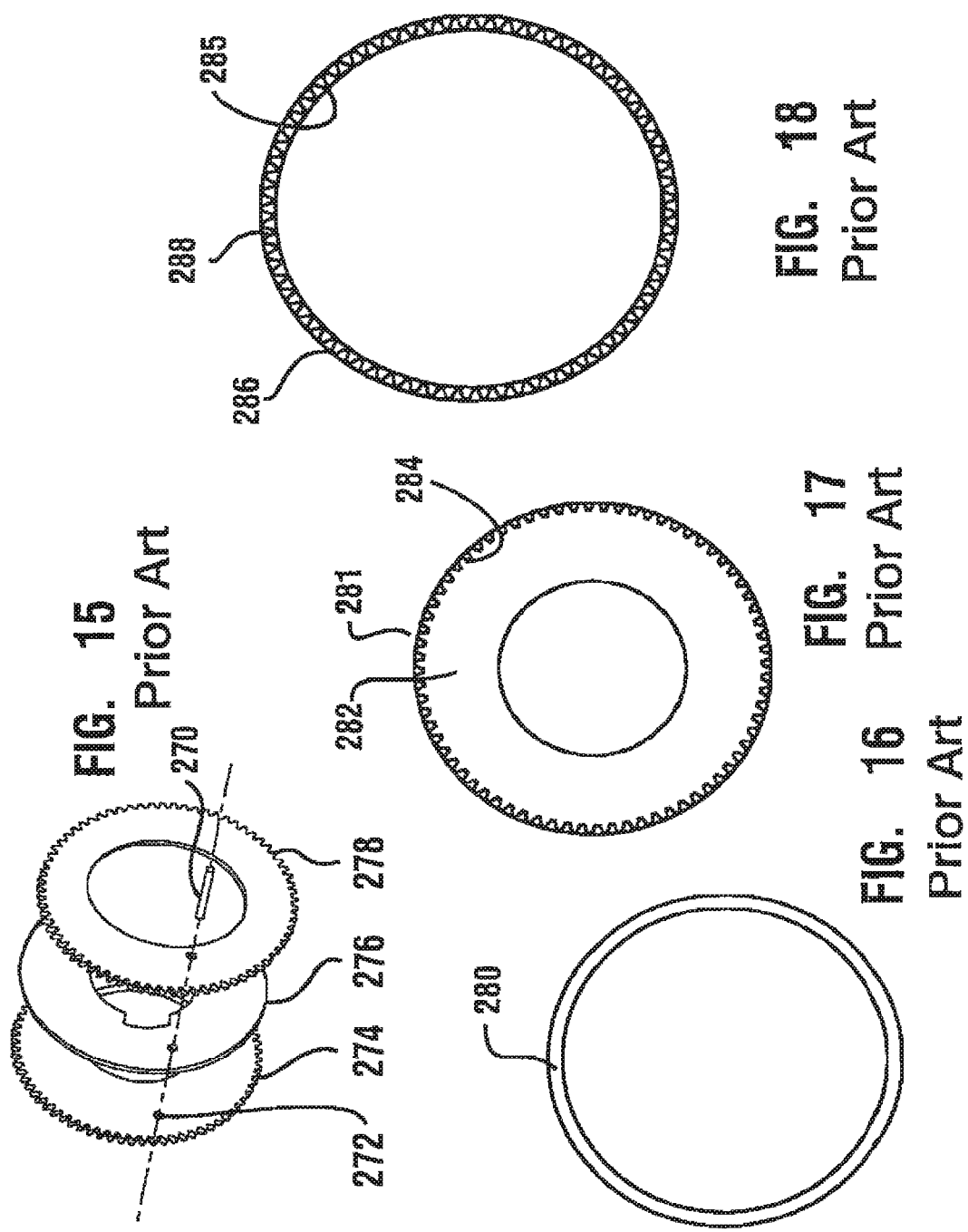

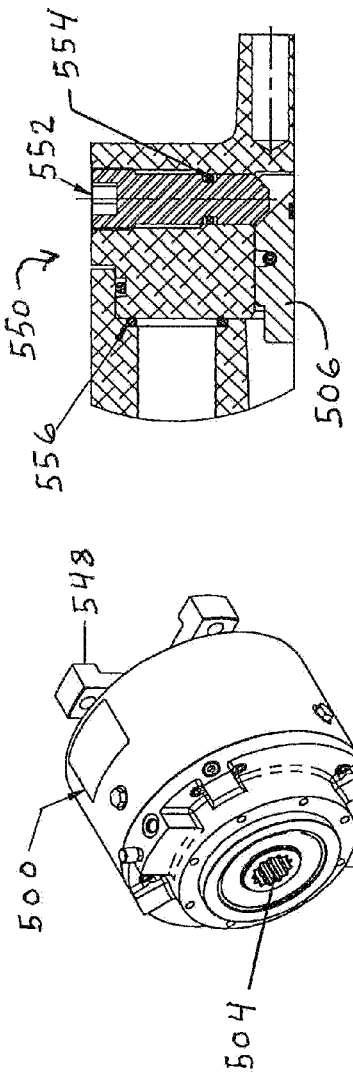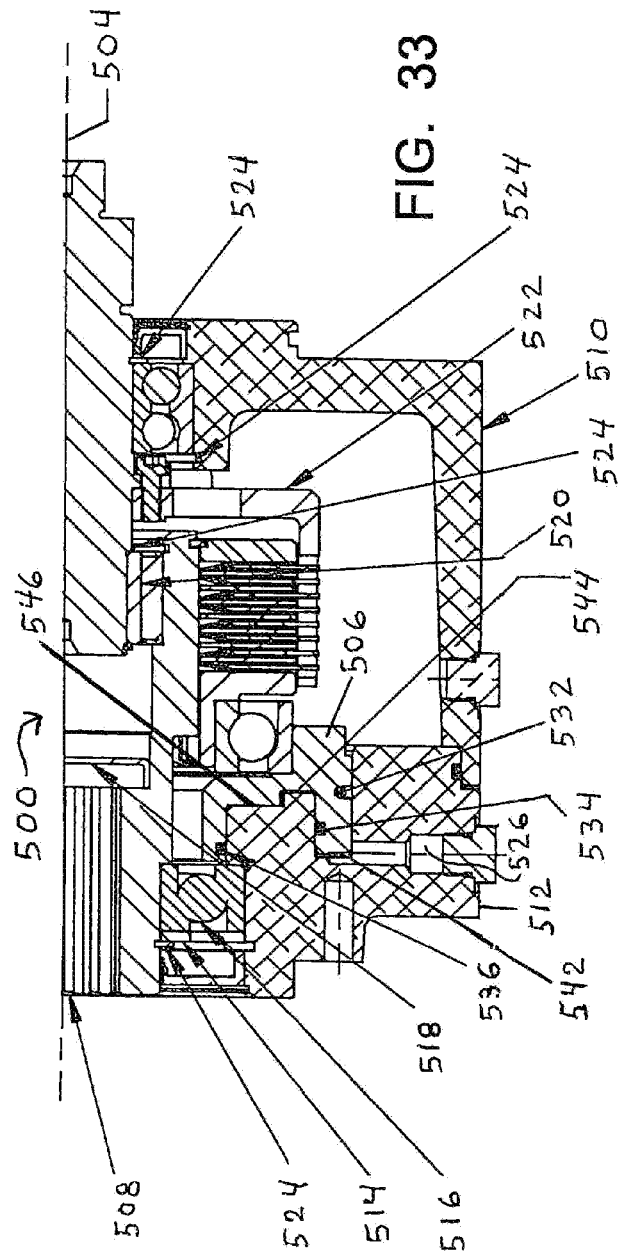

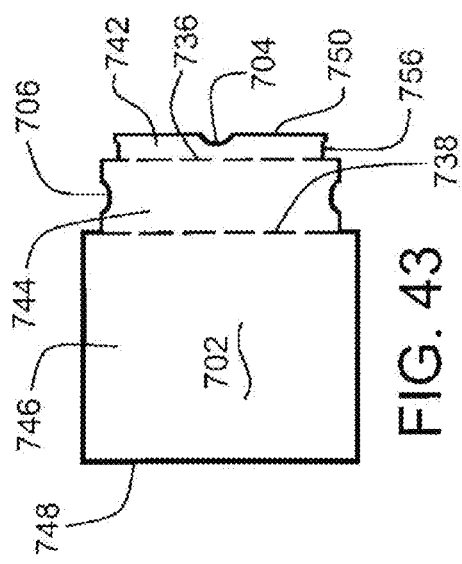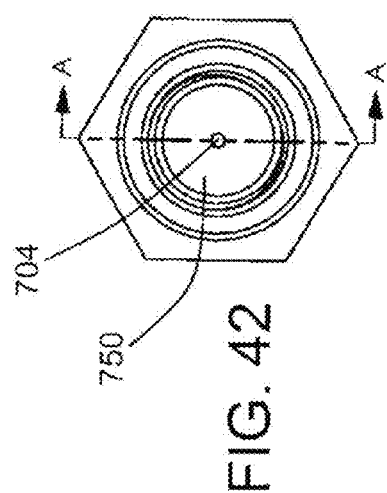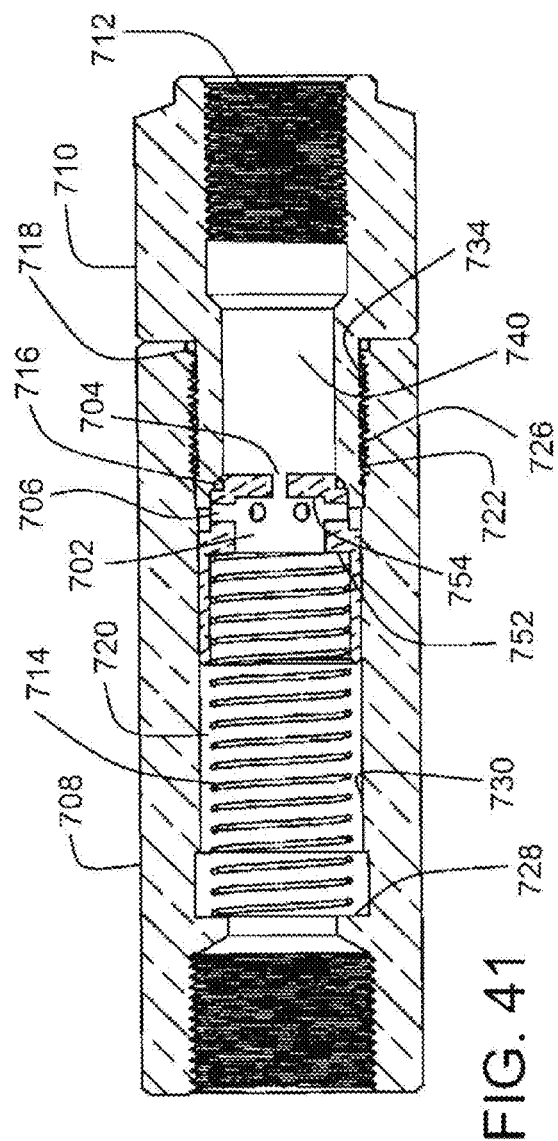

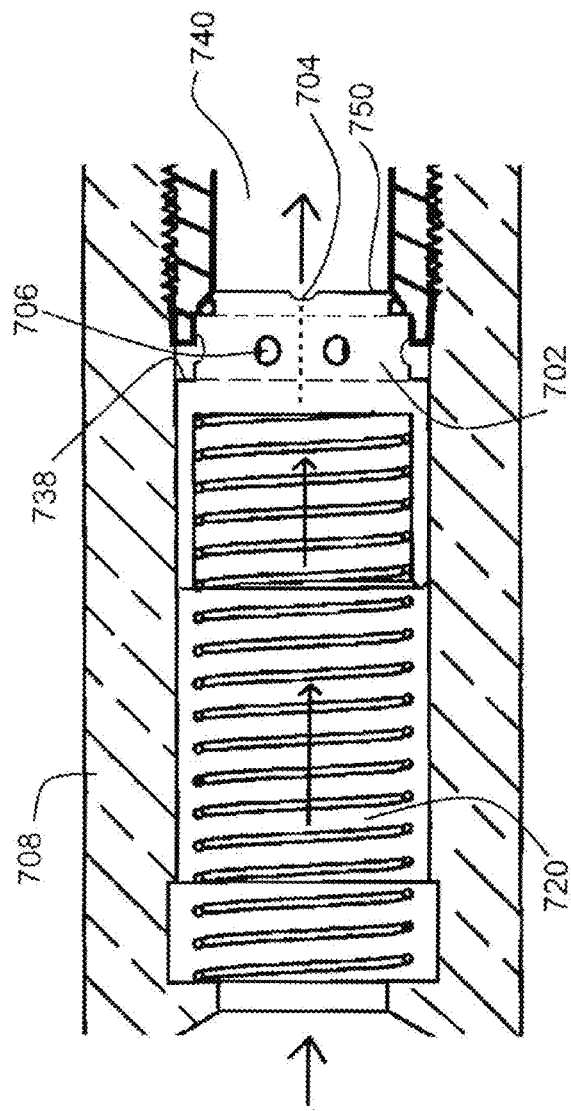
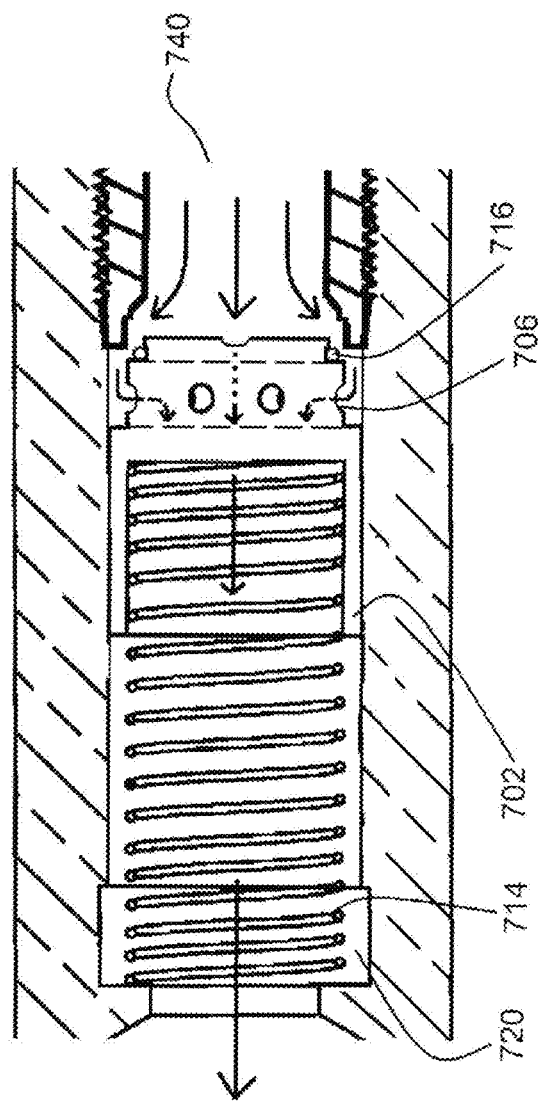

CLUTCH ASSEMBLY WITH DUAL ACTUATION PISTON

TECHNICAL FIELD

This invention relates to mechanical power transmission systems. Particularly this invention relates to clutch assemblies and systems in which clutch assemblies are used for selectively transmitting power.

BACKGROUND OF THE DISCLOSURE

Power transmission systems are used to selectively deliver rotational power from a driver such as an internal combustion engine or other source of rotational power, to a driven device. Driven devices may commonly include such things as pumps, electric generators, winches, chippers, the tires of a vehicle or the propeller of a watercraft. Clutches are used to selectively engage and disengage the driver from the driven device.

Mechanical clutches commonly operate to selectively engage and disengage the driver and driven devices by having a stack of adjacent clutch discs. The discs in the stack, which are also referred to herein as discs of a disc pack, selectively mechanically engage the driving and driven members. The axial force that acts between the discs can be selectively varied. When the clutch is not engaged, the discs that move with the driving member are sufficiently disposed from the discs that are engaged with the driven member such that they can rotate relative thereto. To engage the clutch, the discs in the stack are axially compressed such that the discs connected to the driving member are in pressurized abutting engagement with the discs connected to the driven member. As a result, the driven member is caused to rotate with the driving member, and the driven device is engaged with the driver.

Mechanical clutches commonly experience certain types of issues which limit their capabilities and useful life. These include wearing of the clutch discs over time with repeated engagement and disengagement of the clutch. Other issues may include providing sufficient axial force to the discs in order to transmit the level of power needed to operate the driven device. Other issues include avoiding excessive heat which can shorten the life of clutch discs and also limit power transmission capabilities. Other issues include shock and jarring which can damage driven devices when clutches are rapidly engaged. Additional problems and drawbacks can be encountered with mechanical clutches and systems depending upon the particular system in which a clutch is used.

Mechanical clutches and related systems may benefit from improvements.

OBJECTS OF EXEMPLARY EMBODIMENTS

It is an object of exemplary embodiments to provide an improved mechanical clutch.

It is a further object of some exemplary embodiments to provide an improved mechanical clutch with greater power transmission capabilities.

It is a further object of some exemplary embodiments to provide an improved mechanical clutch with longer life.

It is a further object of some exemplary embodiments to provide an improved mechanical clutch for use in PTO applications.

It is a further object of some exemplary embodiments to provide an improved mechanical clutch that is more economical to operate.

It is a further object of some exemplary embodiments to provide an improved mechanical clutch that can be activated either hydraulically or pneumatically.

It is a further object of some exemplary embodiments to provide an improved mechanical clutch that provides for controlled engagement.

It is a further object of some exemplary embodiments to provide an improved mechanical clutch and system that can provide benefits in performance.

It is a further object of some exemplary embodiments to provide an improved mechanical clutch and system that can be more readily serviced.

It is a further object of some exemplary embodiments to provide methods of making improved mechanical clutches and systems.

Further objects of exemplary embodiments will be made apparent in the following Detailed Description of Exemplary Embodiments and the appended claims.

The foregoing objects are accomplished by the exemplary embodiments employing the principles described herein.

BRIEF DESCRIPTION OF DRAWINGS

FIG. 15 shows a friction disc alignment arrangement.

FIG. 16 shows an anti-vibration liner.

FIG. 17 shows a liner adjacent friction disc teeth.

FIG. 18 shows a liner adjacent drive gear teeth.

FIG. 33 shows an exemplary embodiment of another clutch assembly.

FIG. 34 shows an angled exterior view of the clutch assembly of FIG. 33.

FIG. 35 shows an exemplary embodiment of another mechanical piston arrangement.

FIG. 41 shows a cross section view of the flow control valve in an assembled state.

FIG. 42 shows an end view of the flow control valve.

FIG. 43 shows the poppet cartridge component of the flow control valve.

FIG. 44 shows operational position of the flow control valve during inlet flow.

FIG. 45 shows an operational position of the flow control valve during exhaust flow.

DETAILED DESCRIPTION OF EXEMPLARY EMBODIMENTS

Figure 1:
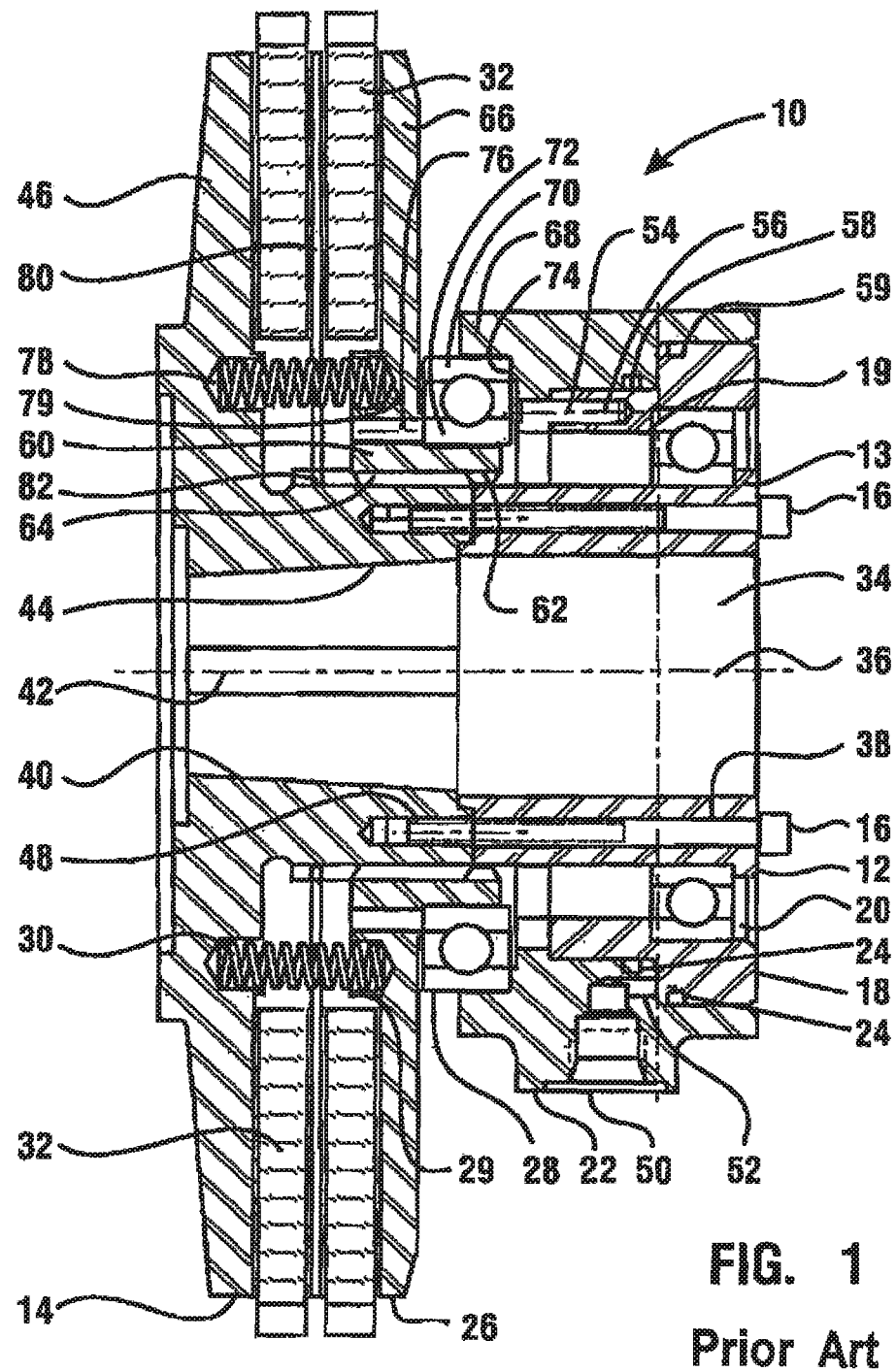
FIG. 1 is a cross-sectional view of a dual disc clutch assembly.

FIG. 1 shows an exemplary clutch apparatus. It should be understood that although certain clutch apparatus components will be described herein with reference to a PTO clutch apparatus, it is within the scope of the present disclosure for the clutch components to also be applicable with other types of clutches. The clutch components shown in FIG. 1 are connectable to form at least a portion of a PTO clutch assembly 10.

The PTO clutch assembly 10 includes a hub 12, friction plate 14 (which may also be referred to herein as a back plate), connector members 16, housing 18, first bearing arrangement 20, piston assembly 22, O-rings 24, pressure plate 26, second bearing arrangement 28, keeper 29, biasing members 30, and at least one friction disc 32. The clutch assembly 10 can be arranged about a shaft. The clutch assembly 10 can be operated to rotationally drive the shaft (i.e., a drive shaft).

The hub 12 is generally annular and includes a central bore passage 34 configured for arrangement in the assembly to receive and surround a drive shaft. The passage 34 includes a longitudinal axis 36. The hub is rotatable and includes holes, bores, or openings 38, each configured for arrangement in the assembly to receive a respective connector member 16. The friction plate 14 is rotatable and generally cylindrical. The friction plate 14 includes a central bore passage 40 configured for arrangement in the assembly to receive and surround the drive shaft. The passage 40 includes a longitudinal axis 42. In the exemplary clutch assembly 10 of FIG. 1 the passage 40 is tapered, with the circumferentially interior taper narrowing in a direction away from the hub 12. As discussed in more detail herein, the taper helps to hold the clutch assembly 10 onto the shaft. The tapered portion 40 of the friction plate 14 prevents movement of the clutch assembly 10 in a first axial direction relative to a correspondingly tapered segment of the drive shaft. The corresponding tapers can remain in fixed contact with each other during operation of the clutch assembly. The entire friction plate 14 can be radially supported on the tapered shaft segment.

The friction plate includes a base flange portion 44 and an arm portion 46. The flange portion 44 forms the passage 40. The arm portion 46 radially extends substantially perpendicular to the flange portion 44. The friction plate 14 also includes holes, bores, or openings 48, each configured for arrangement in the assembly to receive a respective connector member 16. In the exemplary clutch assembly 10, the friction plate 14 includes a plurality of shaft engaging portions capable of imparting rotation to the drive shaft. For example, the friction plate can have male/female portions (e.g., keys) that correspondingly engage with respective female/male portions (e.g., slots) of the drive shaft. In alternative embodiments both the hub and the friction plate (or only the hub) can be structured to engage the shaft for rotation therewith.

Each connector member 16 is sized to simultaneously extend in a hub opening 38 and friction plate opening 48 to connect the hub 12 to the friction plate 14. In the exemplary clutch assembly 10, the connector members comprise screws. During hub to friction plate connection, each threaded screw is engaged with the corresponding threads of aligned bores 38, 48.

In an exemplary arrangement, an annular radial gap remains between the hub bore 34 and the shaft. That is, the hub 12 remains spaced from the shaft during clutch engagement operation. The shaft may be without a step at its tapered and non-tapered shaft segments. Radial support for the hub 12 comes through its connection with the friction plate 14. The hub 12 can be supported by the friction plate 14 via the engagement between the tapered friction plate portion 40 and the tapered shaft segment. The entire clutch assembly 10 can be radially supported by the tapered segment of the shaft. Thus, the tapered shaft segment also supports the piston assembly 22. The housing 18 is generally cylindrical and is configured for arrangement in the assembly in generally surrounding relation about the hub 12.

The first bearing arrangement 20 comprises at least one bearing assembly. The first bearing arrangement 20 is configured for arrangement in the assembly between the hub 12 and the housing 18. The first bearing arrangement may also be referred to herein as a housing bearing arrangement, which comprises at least one housing bearing assembly. The housing bearing arrangement enables the hub to rotate relative to the housing. In the exemplary clutch assembly 10 the housing bearing arrangement comprises at least one ball bearing, with a plurality of bearing balls annularly positioned about the hub. In the exemplary clutch assembly 10, the housing bearing arrangement 20 is removably fixed between a hub flange 13 and a housing flange 19. The piston assembly 22 is generally cylindrical and configured for arrangement in the assembly adjacent the housing 18. The piston assembly 22 is arranged for sealing engagement with the housing. The piston assembly includes at least one air or fluid receiving port 50 in (air or fluid) communication with a respective air or fluid passage 52. In the exemplary clutch assembly 10 the piston assembly 22 is air or fluid actuated (or activated) to move axially relative to the housing 18 in sealed relation therewith. The piston assembly 22 can be driven by air and/or liquid, other gas or gases, or a combination of gases and fluids. The piston assembly 22 can operate as a hydraulic piston. The piston assembly 22 includes one or more guide pins 54 for guiding the piston assembly during movement thereof relative to the housing. Each guide pin 54 is slidable in a respective recess or bore 56 of the housing.

The O-rings 24 are configured for arrangement in the assembly between the housing 18 and the piston assembly 22. The O-rings 24 allow the piston assembly 22 to be in sealing engagement with the housing 18. The O-rings are seated in respective circumferential slots or grooves in at least one of the housing and piston assembly. It should be understood that seal types other than O-rings may also be applicable. In the exemplary clutch assembly 10 a piston seal O-ring is sized for positioning in a piston groove 58 and a housing seal O-ring is sized for positioning in a housing groove 59. Thus, the piston seal ring moves along with the piston assembly but the housing seal ring remains stationary with the housing. The air or fluid passage 52 is configured for discharging air or fluid between the O-rings 24, 24. The increase in pressure between the O-rings causes the piston assembly 22 to move in the axial direction toward the friction plate 14. Thus, the piston assembly 22 is operative to be pressure driven by air or fluid in an axial direction relative to the housing 18. The pressure plate 26 is generally cylindrical and is configured to be arranged in the assembly in mating slidable relationship with the flange portion 44 of the friction plate 14. The pressure plate 26 and the friction plate 14 are mated together (e.g., keyed, splined) to rotate together. The mated pressure plate is also able to move axially relative to the friction plate.

FIG. 1 shows the relationship of projections/slots 62 of a pressure plate base flange portion 60 mated with projections/slots 64 of the friction plate flange 44. The pressure plate includes an arm portion 66 radially extending substantially perpendicular to the flange portion 60. The arm portion 66 extends in a direction parallel to the friction plate arm portion 46. The spacing between the pressure plate and the friction plate is substantially the same along the length of a friction disc positioned therebetween. That is, the gap spacing is substantially the same along an elongated distance in the parallel direction (i.e., perpendicular to the longitudinal axis). As described in more detail herein, the pressure plate can be axially moved responsive to activation of the piston assembly.

The second bearing arrangement 28 comprises at least one bearing assembly. The second bearing arrangement 28 is configured for arrangement in the assembly between the piston assembly 22 and the pressure plate 26. The second bearing arrangement may also be referred to herein as a piston bearing arrangement, which comprises at least one piston bearing assembly. The piston bearing arrangement 28 enables the pressure plate 26 to rotate relative to the piston assembly 22. In the exemplary clutch assembly 10 the piston bearing arrangement comprises at least one thrust bearing, with a plurality of bearing balls annularly positioned about the flange portion 60 of the pressure plate 26. In the exemplary clutch assembly 10, the piston bearing arrangement 28 is removably fixed in the radial direction between a piston flange 68 and the pressure plate flange 60. The piston bearing arrangement 28 includes a radially outer portion 70 and a radially inner portion 72. The outer portion 70 can abut an annular lip 74 of the piston assembly 22 for movement therewith during piston assembly activation. The inner portion 72 can be engaged to the pressure plate 26 for rotation therewith via a bearing guide pin 76. The piston bearing arrangement 28 can be arranged in the assembly 10 with axially play between the piston assembly 22 and the pressure plate 26. Alternatively, the piston bearing arrangement can be arranged in the assembly with constant contact with both the piston assembly and the pressure plate. Nevertheless, pneumatic or fluid activation of the piston assembly 22 is operative to cause the piston bearing arrangement 28 and the pressure plate 26 to be axially moved toward the friction plate 14.

The biasing members 30 are each configured for arrangement in the assembly between the pressure plate 26 and the friction plate 14. The biasing members 30 are operative to provide a biasing force against the pressure plate relative to the friction plate. In the exemplary clutch assembly 10 each biasing member comprises a compression spring. Each spring 30 is positioned in a state of compression between and in engagement with both the pressure plate and the friction plate. Thus, each spring 30 is operative to impart a pushing force against the pressure plate in a direction away from the friction plate. As shown in FIG. 1, a friction plate spring seat or aperture 78 and a pressure plate spring seat or aperture 79 can receive respective ends of a compression spring 30. A flange keeper 29 can provide radial support to the spring and maintain the spring ends in the seats 78, 79. The springs are configured so that the pushing force generated is large enough to move the pressure plate in a direction away from the friction plate when the piston assembly is not in an activated condition. The springs are also configured so that the generated pushing force is smaller than the air or fluid force generated to drive the piston assembly. Thus, the springs 30 are configured for operative association relative to the piston assembly configuration, including the diameters of the air or fluid receiving port 50 and the air or fluid passage 52. That is, the size and force of the applicable spring can be dependent on the piston assembly, and vice versa. In the exemplary clutch assembly 10 the length of the spring is greater than the engaged thickness of the friction discs.

Figure 2:
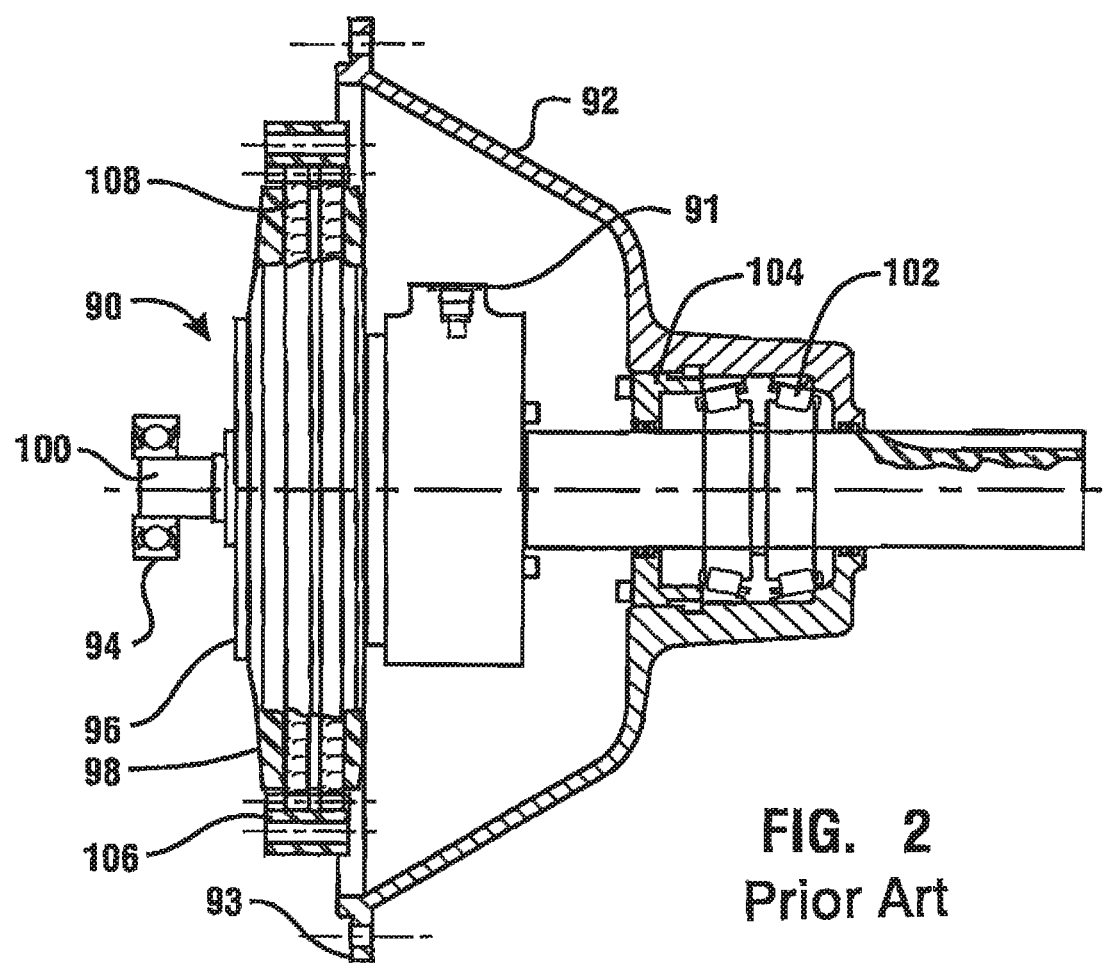
FIG. 2 is a schematic view of a dual disc clutch assembly installed in a Bell Housing.

The at least one friction disc 32 is configured to be arranged in the assembly between the pressure plate 26 and the friction plate 14. The exemplary clutch assembly 10 comprises two friction discs 32, 32. It should be understood that more or fewer friction discs are possible depending on the application. For example, the use of two friction discs can result in greater torque provided to the drive shaft in comparison to the use of only one friction disc. The friction discs 32 are placed in the assembly so that one is operative to engage the pressure plate and the other is operative to engage the friction plate. The outer circumference of each friction disc is geared to correspond (e.g., a splined relationship) with a drive source (e.g., a splined ring associated with a flywheel). The friction discs 32 can comprise a composite material, including impregnated fiber and/or brass fines and/or powdered metal. A disc separator plate 80 is arranged between the discs 32 in mating slidable relationship with the friction plate flange 44. The disc separator is positioned about the axial flange 44 of the friction plate. The disc separator and friction plate are mated (e.g., keyed, splined) to rotate together. The mated disc separator 80 is also able to move axially relative to the friction plate 14. FIG. 1 shows a projection 82 linking or mating the disc separator 80 to the friction plate flange 44. The friction plate projections 64 can be used in mating with the disc separator projections 82. The disc separator 80 can be cylindrically shaped with openings therein to permit passage of the springs 30 therethrough. As described in more detail herein, the mated disc separator 80 can be axially slid relative to the friction plate 14 responsive to activation of the piston assembly 22. FIG. 2 shows an exemplary double disc PTO clutch assembly 90 installed in a Bell Housing 92. The operation and components of the clutch assembly 90 are similar to those previously discussed with regard to the clutch assembly 10 of FIG. 1. For example, the clutch assembly 90 includes an air or fluid inlet port 91. The Bell Housing may comprise a Twin Disc® Bell Housing style for a PTO clutch. The Bell Housing 92 includes an annular mounting flange 93.

A shaft bearing arrangement 94 is engaged to an end of a drive shaft 100 to provide axially alignment or centering of the shaft. The shaft bearing arrangement 94 can be positioned in a supporting device, such as a flywheel. The shaft bearing arrangement 94 also provides rotational stability to the drive shaft. The bearings prevent the drive shaft 100 from rotating with a flywheel. A shaft nut arrangement 96, which may also include a washer, holds the friction plate 98 and the clutch assembly 90 onto the drive shaft 100. As previously discussed, the tapered passage (e.g., passage 40 of a friction plate 98) prevents movement of the clutch assembly 90 in a first axial direction relative to a correspondingly tapered shaft 100. The single nut 96 prevents movement of the clutch assembly 90 in the opposite axial direction relative to the shaft 100. Thus, the clutch assembly 90 can be readily connected/disconnected to a tapered shaft using a single nut 96. The easy-on easy-off quick release arrangement facilitates the ability to quickly change the clutch assembly or components thereof. The secure connection caused by the nut arrangement 96 also prevents the springs 30 from keeping the friction plate 14 away from the friction discs 32 during actuation of the piston 22. That is, with the clutch assembly 90 securely fastened to the shaft 100, the friction plate 98 is prevented from moving axially.

The drive shaft can be positioned and supported in the Bell Housing by another bearing arrangement 102. In an exemplary embodiment the bearing arrangement 102 comprises Timken® bearings or deep groove ball bearings. The Timken® bearings 102 and the bearing arrangement support 104 are mounted in the Bell Housing 92. The bearings 102 are angled with respect to each other to prevent movement of the drive shaft 100 in both axial directions relative to the Bell Housing. Also shown is a drive gear ring 106 which may be attached to the flywheel. The ring 106 can have interior splines for mating engagement with the friction discs 108 which are likewise correspondingly circumferentially splined or geared.

Figure 3:
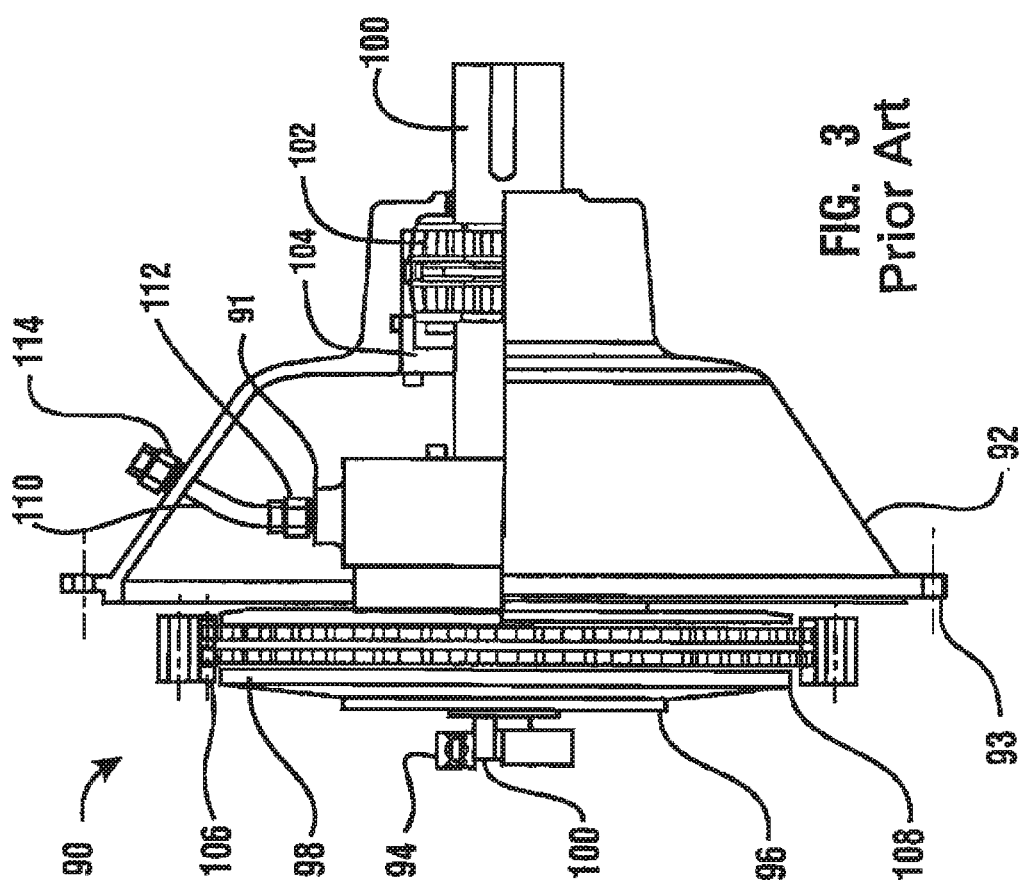
FIG. 3 is a partial cut away detailed view of the clutch assembly of FIG. 2.

FIG. 3 shows a partial cut away detailed view of the clutch assembly arrangement 90 of FIG. 2. Also shown is an air or fluid actuation line 110 fastened to the injection port 91 by a nut 112. The actuation line 110 may be flexible to permit bending with movement of the piston. The actuation line extends through the Bell Housing 92 and is fastened thereto by another nut 114.

Figure 4:
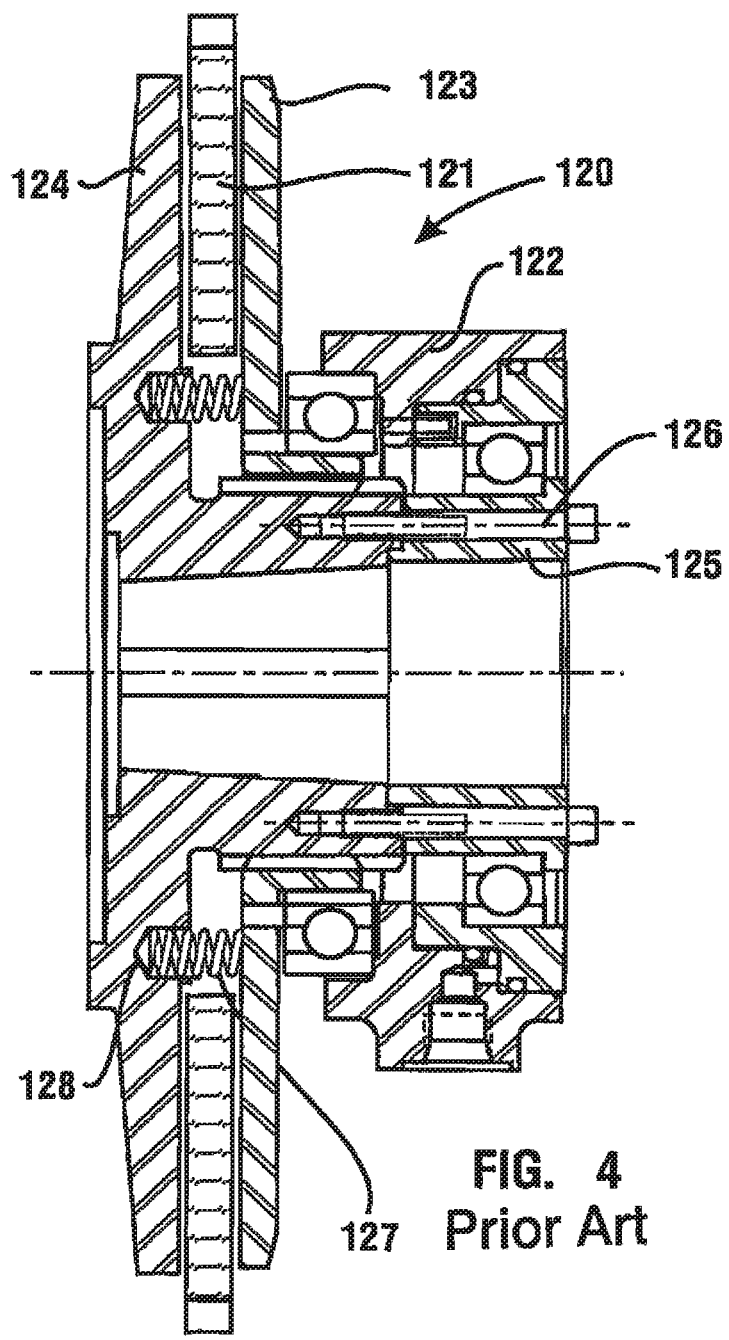
FIG. 4 is a cross-sectional view of a single disc clutch assembly.

In operation the piston assembly is axially driven toward the friction plate responsive to a predetermined pressure level be reached between the piston assembly and the housing due to the input of air or fluid into the air or fluid inlet port. Axial movement of the piston assembly acts to cause axial movement of the piston bearing arrangement. Axial movement of the piston bearing arrangement acts to cause axial movement of the pressure plate. Axial movement of the pressure plate acts to cause slipping abutment with the first (closest) rotating friction disc resulting in axial movement of the friction disc. Axial movement of the first friction disc acts to cause slipping abutment with the disc separator resulting in axial movement of the disc separator. Axial movement of the disc separator acts to cause axial movement of the second (furthest) rotating friction disc. Axial movement of the second friction disc acts to cause engagement with the friction plate. Thereafter, with no further axial movement permitted, the pressure plate, first friction disc, disc separator, second friction disc, and friction plate are positively frictionally engaged (e.g., compressed together) to rotate as a single unit. Thus, the clutch assembly, upon activation of the piston assembly, can translate rotation from the friction discs to a drive shaft extending along the longitudinal axis. FIG. 4 shows an exemplary PTO clutch assembly 120 comprising a single friction disc 121. The clutch assembly 120 operates in the same manner as the clutch assembly 10 of FIG. 1. The clutch assembly 120 has mostly the same clutch components as the clutch assembly 10, except for the single disc arrangement instead of the dual disc/disc separator arrangement. However, with use of a sole friction disc some of the components can be of a different (e.g., smaller) size. For example, the clutch assembly 120 can use an axially shorter piston assembly 122 because less travel distance is required to bring about positive (full) rotational translation to the drive shaft with only a single friction disc 121 between the pressure plate 123 and friction plate 124. Correspondingly, a shorter hub 125 and screws 126 can be used. Likewise, shorter compression springs 127 can be used because of the smaller axial gap between the pressure plate 123 and friction plate 124. Also, because of the shorter spring length, spring stability can be managed without both the friction plate and the pressure plate having aligned spring recesses. That is, a shorter spring 127 can be supported in only a single spring recess 128. The single recesses can all be in either the friction plate or the pressure plate, or in a combination of both plates.

Figure 5:
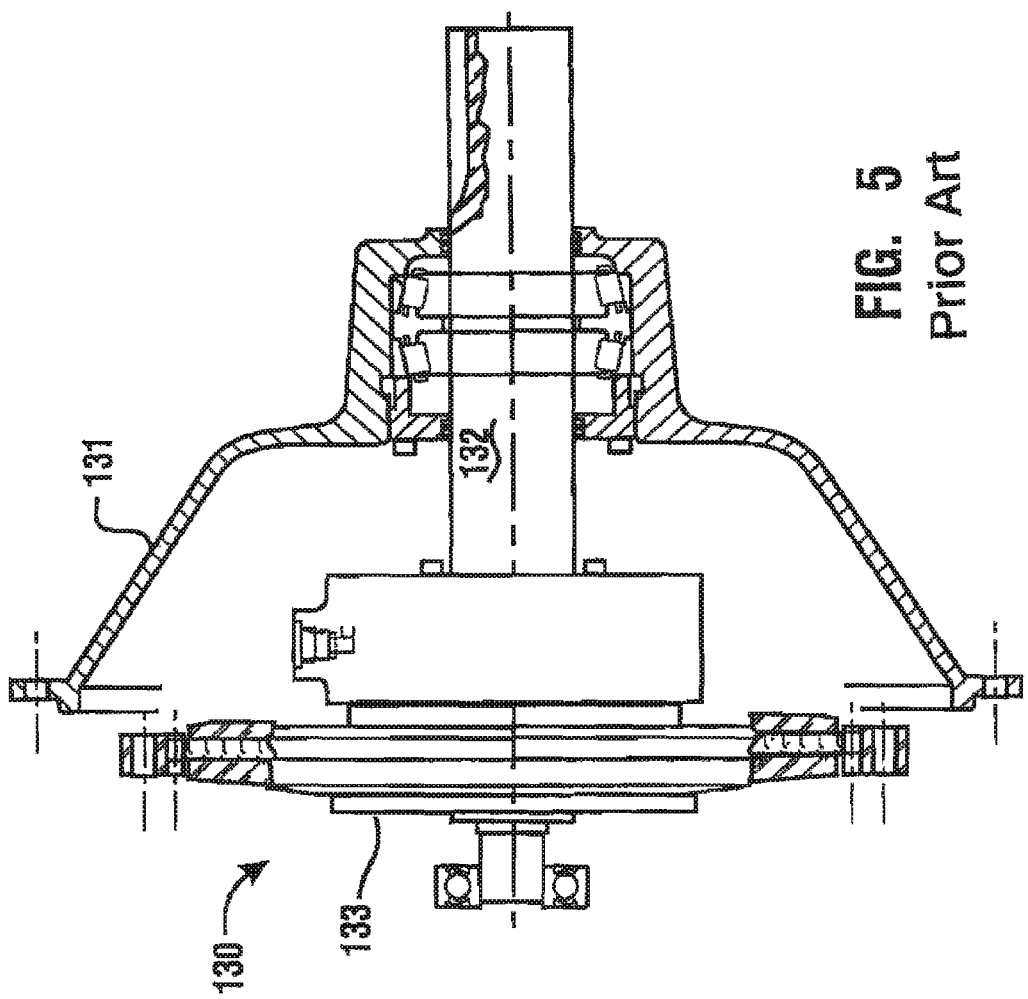
FIG. 5 is a schematic view of a single disc clutch assembly installed in a Bell Housing.

FIG. 5 shows an exemplary single disc PTO clutch assembly 130 installed in a Bell Housing 131. The clutch assembly 130 operates in the same manner as the clutch assembly 120 of FIG. 4. The drive shaft 132 and Bell Housing 131 can have the same configuration and be connected in the same manner as previously discussed with regard to FIG. 2. Again, a single nut 133 can hold the clutch assembly 130 onto the drive shaft 132.

In other exemplary clutch assembly arrangements the screws fastening the friction plate to the hub can be inserted and removed from the friction plate side instead of the hub side. A tap bore can extend through the friction plate to align with a bore extending partly into the hub. The shaft nut/washer can be arranged to cover the bore in the friction plate.

Thus, in this screw arrangement the removal of the shaft nut would grant access to the friction plate screw(s).

Removal of the friction plate screws permits the friction disc (along with the friction plate and springs) to be removed without disturbing the other assembly components arranged on the shaft. Thus, the friction discs and springs can be readily and efficiently accessed and replaced.

Figure 7:
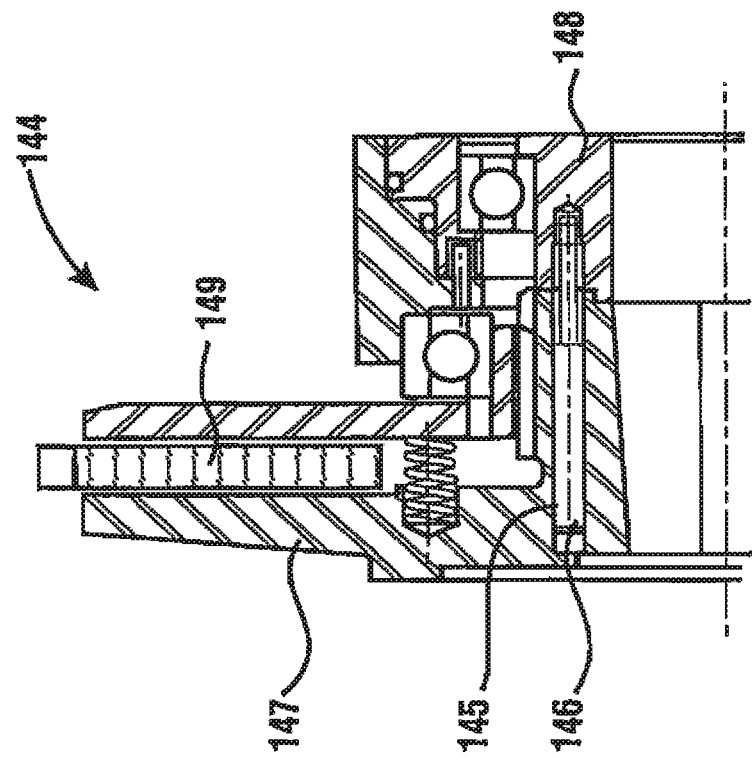
FIG. 7 shows an alternative clutch assembly screw arrangement.
Figure 6:
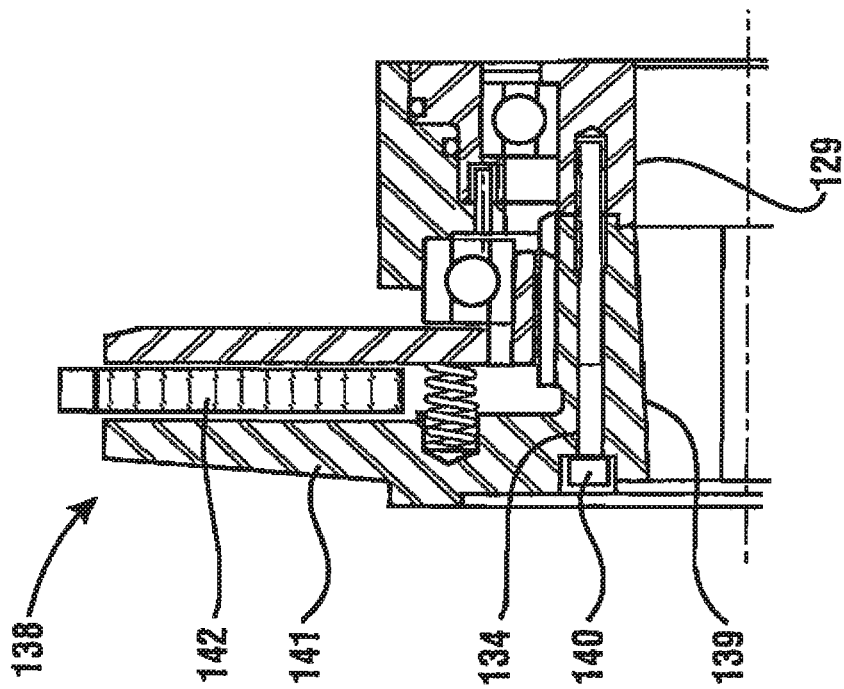
FIG. 6 shows a screw arrangement in a clutch assembly portion.

FIGS. 6 and 7 show such exemplary arrangements of connector members 134, 146 (e.g., screws). For reasons of brevity only clutch assembly portions 138, 144 have been shown in FIGS. 6 and 7. The portions are taken from clutch assemblies having similar structure and operation to the clutch assembly of FIG. 4 except for the positioning of the screws that fasten the friction plate and hub to each other. The arrangement permits the screws to be inserted and removed from a bore extending through the friction plate. That is, the screw arrangement enables the screws to be accessed from the friction plate side of the clutch assembly, instead of the hub side. A friction disc can be replaced without removing the hub from the shaft.

FIG. 6 shows a clutch assembly portion 138 having a bore 139, screw 134 with a head flange 140, friction plate 141, hub 129, and friction disc 142.

FIG. 7 shows a clutch assembly portion 144 having a bore 145, screw 146, friction plate 147, hub 148, and friction disc 149. The screw 146 can be headless. It should be understood that the screw arrangements shown in FIGS. 6 and 7 are likewise applicable with a clutch assembly having plural friction discs, such as the clutch assembly of FIG. 1.

Figure 8:
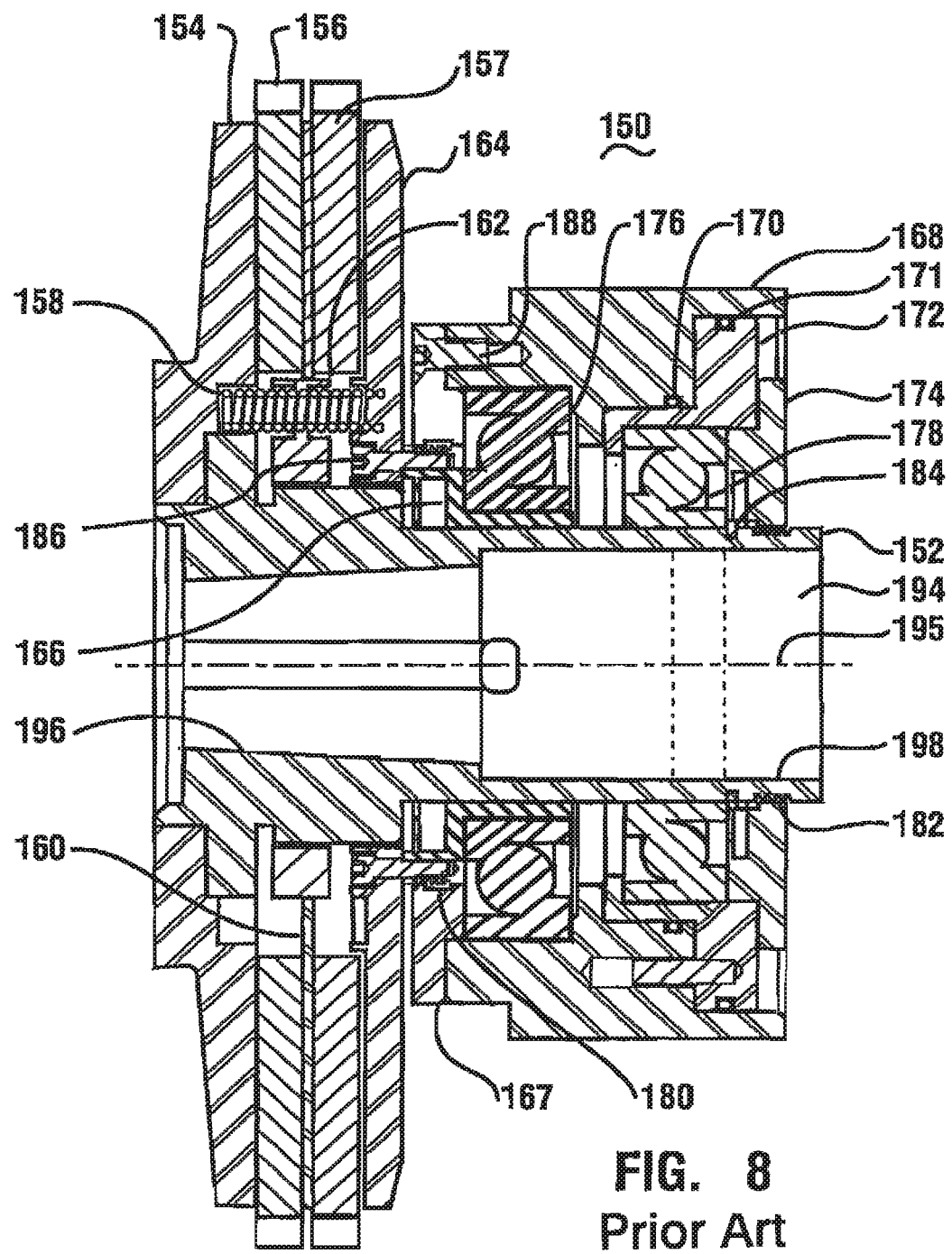
FIG. 8 shows a cross-sectional view taken along section A-A of FIG. 9.
Figure 9:
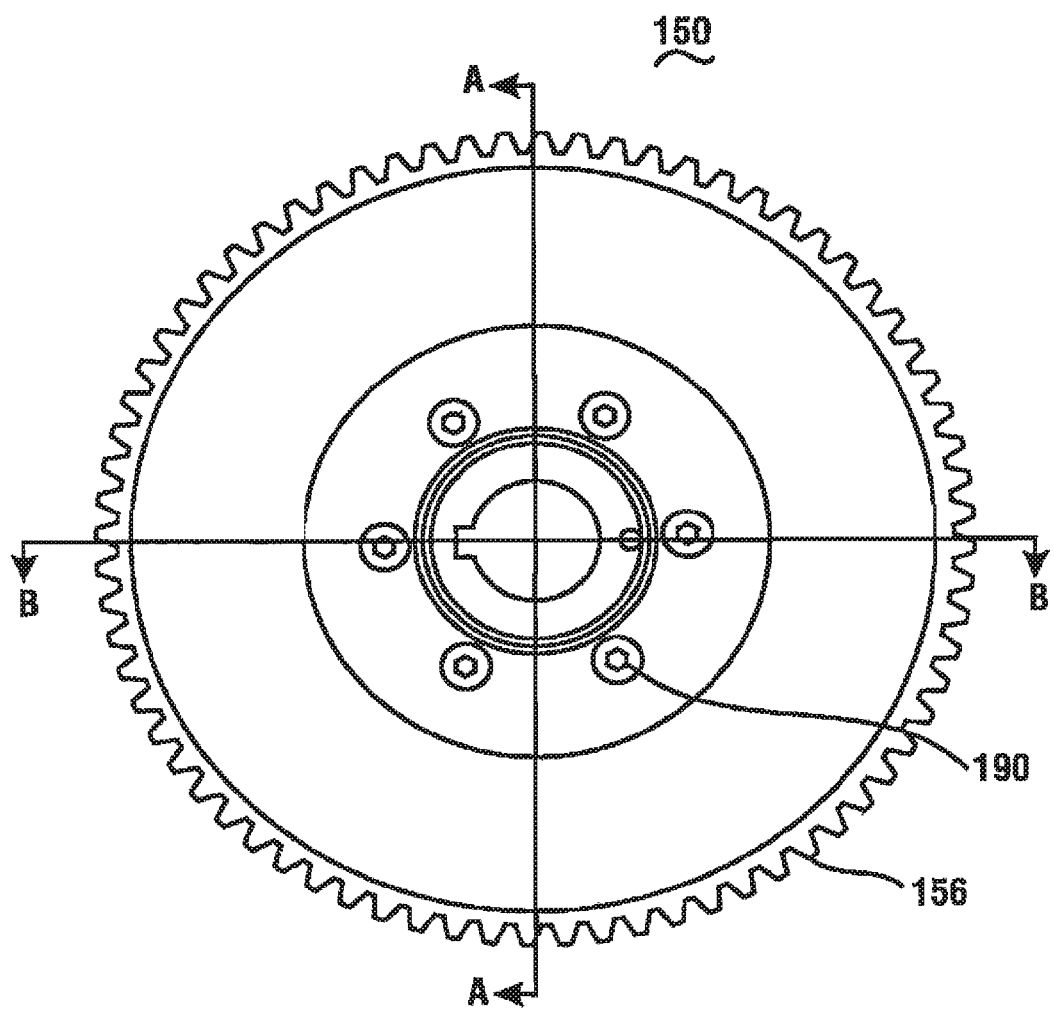
FIG. 9 shows an alternative dual disc clutch assembly.
Figure 10:
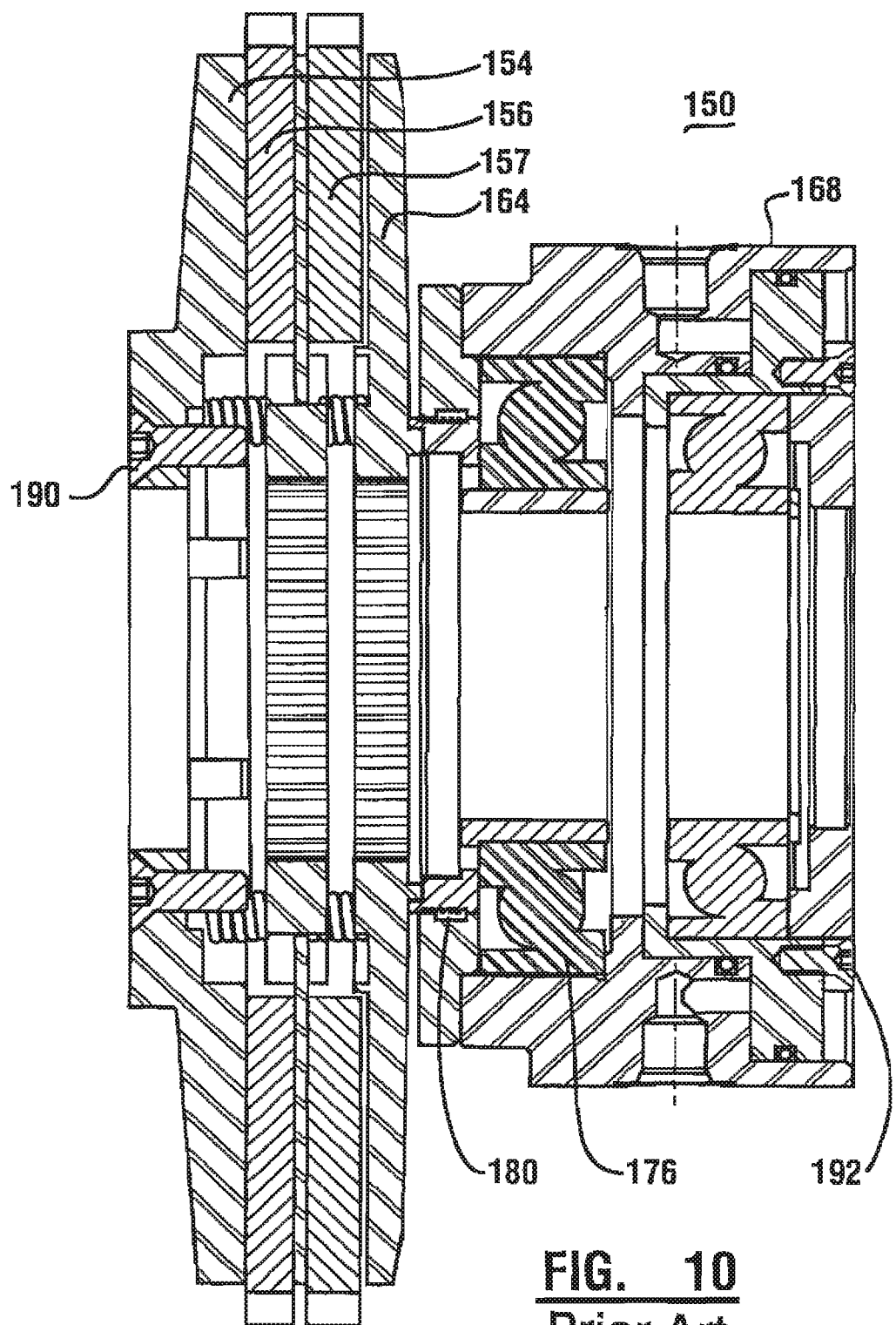
FIG. 10 shows a cross-sectional view taken along section B-B of FIG. 9 without the hub portion.

FIGS. 8-10 show views of an alternative dual disc clutch assembly 150. FIG. 8 is a cross-sectional view taken along section A-A of FIG. 9. FIG. 9 shows a side view. FIG. 10 is a cross-sectional view taken along section B-B of FIG. 9.

The alternative clutch assembly 150 can likewise be used in a PTO operation with a Bell Housing. The clutch assembly components can operate in manners similar to previously discussed similar components. As previously discussed, an existing Bell Housing can be retrofit 15 with the PTO clutch assembly. Certain removed existing components (e.g., shaft) may be reused.

FIG. 8 shows particular components of the clutch assembly 150, including a hub 152, friction plate 154 (which may also be referred to herein as a back plate), friction discs 156, 157, compression spring 158, disc separator 160, disc separator projections 162, pressure plate 164, spacers 166, 167, piston assembly 168, O-rings 170, 171, cylinder assembly 172, spacer 174, angular contact bearings 176, 178, labyrinth seals 180, 182, snap ring 184, and fasteners 186, 188.

FIG. 9 shows additional fasteners 190. FIG. 10 shows additional fasteners 192.

The general operations of labyrinth seals and angular contact bearings are known, and need not be discussed further. However, in the novel clutch assembly 150, the angular contact bearings 176, 178 enable high torque performance while the labyrinth seals 180, 182 assist in the reduction or elimination of heat. As shown in FIG. 8, the hub 152 includes a bore 194. The bore is configured to receive a shaft. The longitudinal axis of the shaft can align with the bore axis 195. The bore 194 includes a tapered portion 196 and a non-tapered portion 198. The shaft likewise can include a tapered segment and a non-tapered segment. In a manner previously discussed, the non-tapered bore portion 198 can remain radially spaced from the non-tapered shaft segment during clutch engagement. This spacing enables the hub 152 to be radially supported solely (via the tapered bore portion 196) by the tapered shaft segment. The hub 152 can support the entire clutch assembly 150. Thus, the entire clutch assembly 150 can be radially supported by the tapered shaft segment. It follows that the friction plate 154 and the piston assembly 168 can be likewise supported (via the hub 152) at the tapered shaft segment.

Operation of the clutch assembly 150 can be ascertained from FIG. 8. Activation (e.g., pneumatic or fluid) of the piston assembly 168 is operative to cause the pressure plate 164 to move axially toward the friction plate 154. The friction discs 156 can be driven by an engine via a drive gear ring (e.g., ring 106), such driving operation being well known. Engagement of the friction plate 154 and the pressure plate 164 with the respective friction discs 156, 157 imparts rotation to the clutch (and its hub 152). The hub 152 and the shaft are correspondingly radially connected with each other via male/female portions, keys/slots, or spines/grooves. Thus, rotation of the hub 152 imparts rotation to the shaft. As is well known, shaft rotation can be used to drive one or more devices, such as a work tool.

In a manner previously discussed (e.g., nut arrangement 96), the clutch assembly 150 can be securely attached to the shaft by a nut arrangement. The nut arrangement prevents movement of the clutch assembly 150 relative to the shaft in a first axial direction. The corresponding hub taper and shaft taper engagement prevents movement of the clutch assembly 150 relative to the shaft in an opposite axial direction. Thus, the hub 152 can be radially and axially supported by the tapered shaft segment.

With the clutch assembly 150, the friction discs 156, 157 can be replaced without requiring removal of the nut arrangement. As seen in FIGS. 8 and 10, the friction plate 154 is connected to the hub 152 by fasteners 190. Removal of the fasteners 190 enables the friction plate 154 to be removed from the clutch assembly 150. Removal of the friction plate 154 permits direct access to the friction discs 156, 157. As further seen in FIGS. 8 and 10, at the disc end portion of the clutch assembly 150 the inner diameter of a friction disc 156 is greater than the outer diameter of the hub 152. Thus, the friction discs 156, 157 can be removed by axially moving them away from the hub 152 while the hub is still connected to the shaft. Thus, the clutch assembly 150 includes an easily removable friction plate 154 for quick access to the friction discs 156, 157.

Figure 11:
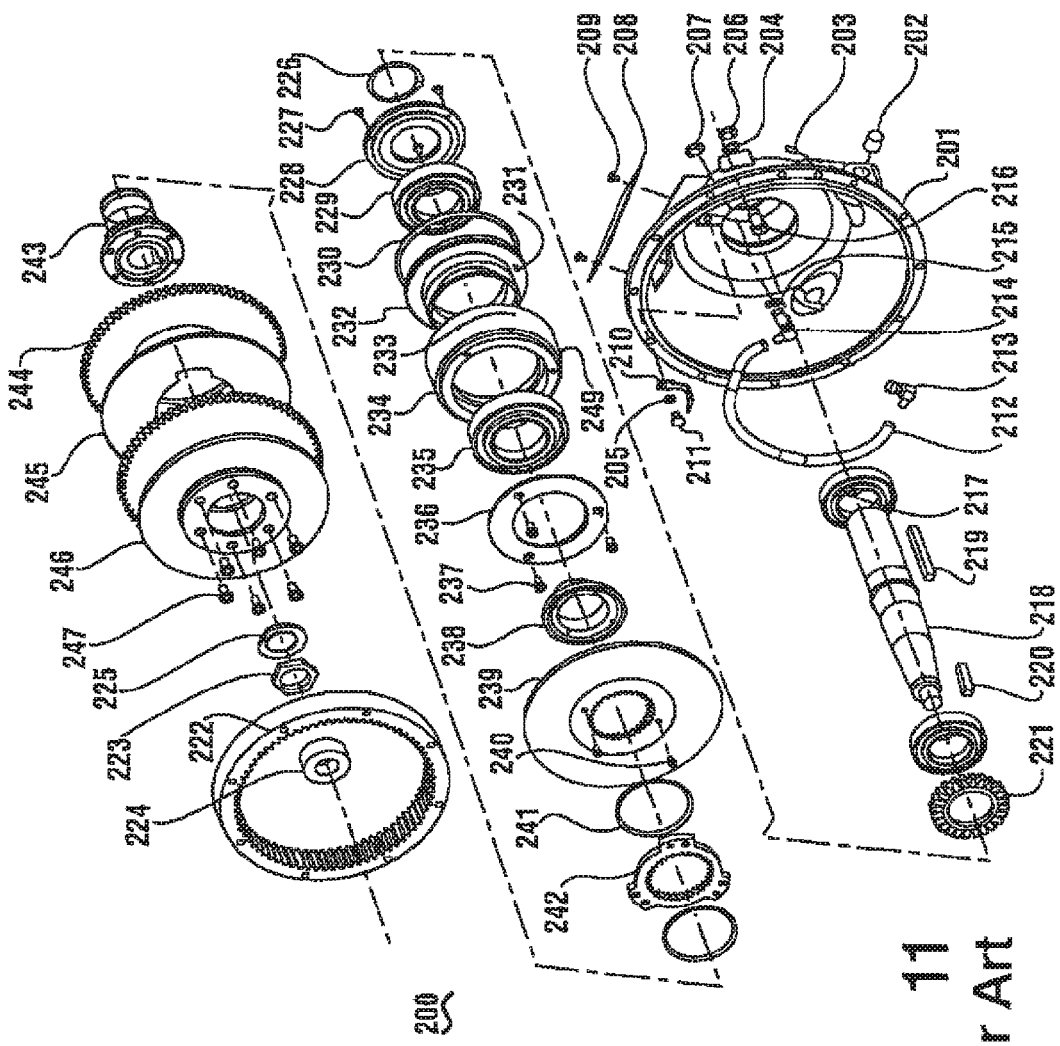
FIG. 11 shows an exploded view of components of an exemplary Bell Housing arrangement.

FIG. 11 shows an exploded view of components of an exemplary Bell Housing arrangement 200 that includes a further exemplary clutch assembly. The exemplary arrangement 200 includes a Bell housing 201, stopper plug 202, set screw 203, lock washers 204, 205, nuts 206, 207, name plate 208, pan head screw 209, anti-rotation bracket 210, hex bolt 211, hose assembly 212, swivel elbow 213, bulkhead fitting 214, washer 215, hex bolt 216, tapered roller bearing 217, shaft 218, shaft key 219, hub key 220, and bearing nut 221. The arrangement 200 further includes a drive ring 222, lock nut 223, shaft bearing 224, and lock washer 225. The arrangement 200 further includes a retaining ring 226, fasteners 227, spacer 228, angular contact bearing 229, O-rings 230, dowel pin 231, cylinder 232, O-ring 233, piston assembly 234, angular contact bearing 235, spacer 236, fastener 237, spacer 238, pressure plate 239, fastener 240, wave spring 241, separator 242, hub 243, (twin) friction discs 244, separator disc 245, back plate 246, and fasteners 247. A biasing member (e.g., spring) can be used to generate a separating force between the pressure plate 239 and the back plate 246 in a manner previously discussed. An exemplary clutch assembly can comprise components 226-247. The clutch assembly components 226-247 may be grouped or packaged together to form a clutch assembly kit.

The anti-rotation bracket 210 can prevent the piston assembly 234 from rotating. The anti-rotation bracket 210 can be attached to the housing 201. A portion of the bracket 210 can mate with a slot 249 in an outer circumferential edge of the piston assembly 234. In FIG. 11 the slot 249 can be seen at the bottom of the piston assembly 234.

The swivel elbow 213 enables the use of a rigid hose 212. In an exemplary hose assembly arrangement, one end of the hose 212 is fitted to the bulkhead 214 at a first (top) position. The other end of the hose 212 is fitted to the piston assembly 234 at a second (bottom) 20 position. The positioning and length of the hose 212 enable the piston 234 to move axially without bending or tangling the rigid hose.

Figure 12:
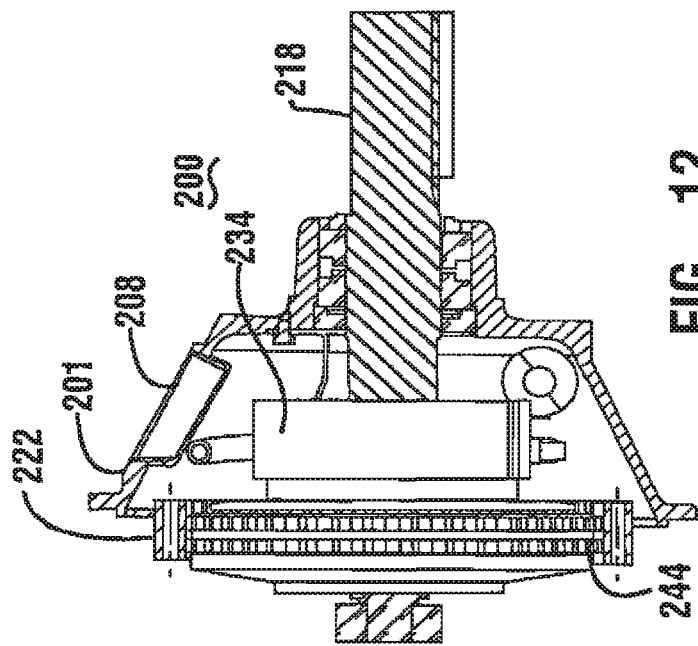
FIG. 12 shows the assembled components of FIG. 11.

FIG. 12 shows the assembled arrangement 200. For clarity, only a few of the components in FIG. 12 have been referenced, such as the housing 201, name plate 208, shaft 218, drive ring 222, piston assembly 234, and friction disc 244.

Figure 13:
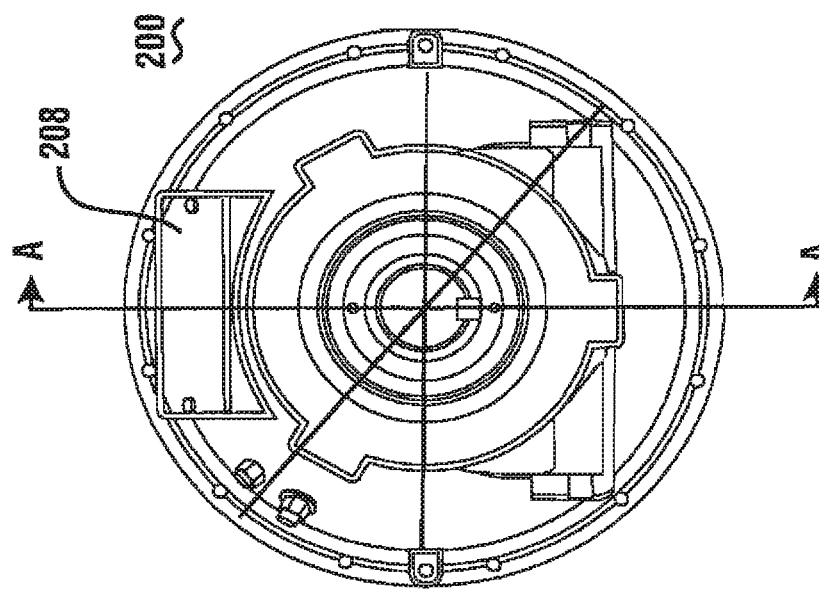
FIG. 13 shows a rear view of the assembled arrangement of FIG. 12.

FIG. 13 shows a side view of the assembled arrangement 200. The name plate 208 on the housing 201 can be readily seen in FIG. 13. FIG. 12 is taken along A-A of FIG. 13.

Figure 14:
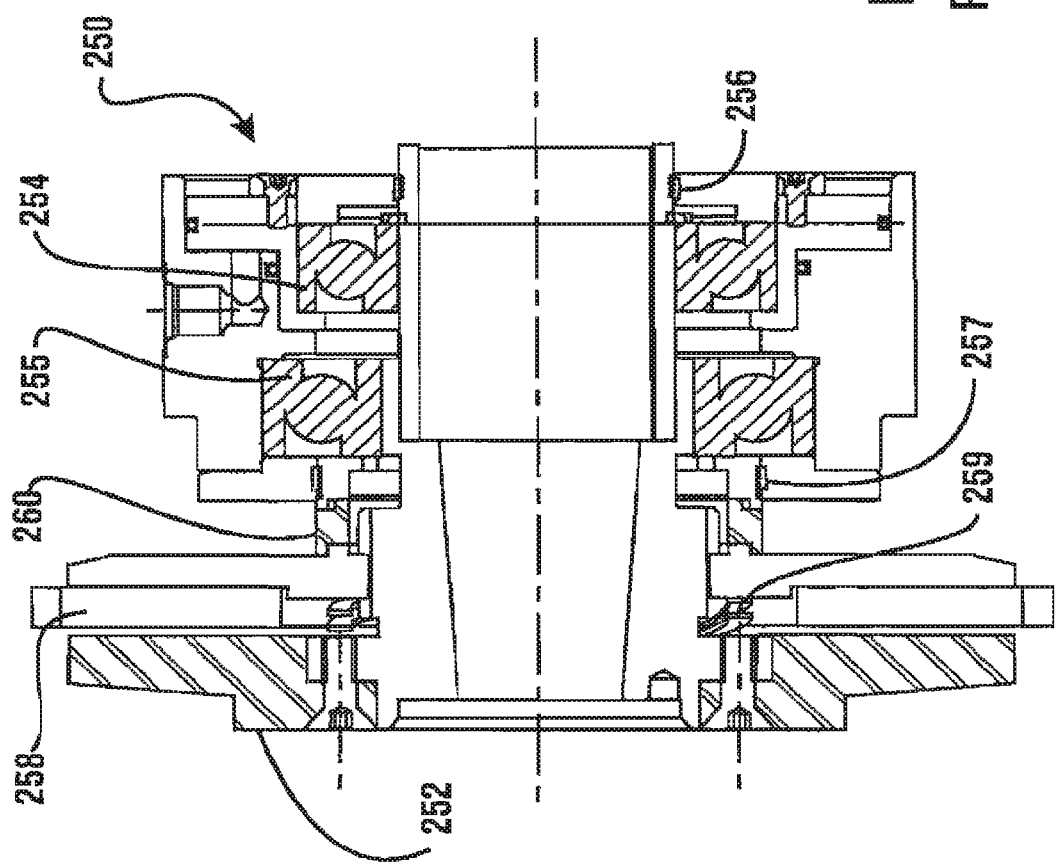
FIG. 14 shows an exemplary clutch assembly.

FIG. 14 shows another exemplary clutch assembly 250. The clutch assembly 250 is similar to the clutch assembly shown in the assembled arrangement 200. The clutch assembly 250 includes a removable back plate 252, angular contact bearings 254, 255, labyrinth seals 256, 257, and biasing member 259 (e.g., spring). However, instead of the previously discussed twin friction discs of the clutch assembly in assembled arrangement 200, the clutch assembly 250 has only a single friction disc 258. A spacer 260 is used to fill the axial void (distance) caused by a removed friction disc (and a separator disc). The spacer 260 can be chosen from among a plurality of spacers of various axial lengths to ensure spacing accuracy. The use of a spacer enables the same clutch assembly 250 to be used with one or more friction discs.

In a further exemplary clutch assembly installation process, friction discs can be aligned with each other prior to their installation about the shaft. The friction discs and the separator disc can each have one or more (axially extending) alignment holes therethrough. Each alignment hole is configured to receive an alignment pin therethrough. An alignment pin can extend through several aligned holes to maintain the friction discs in alignment during their installation. The alignment pins may be removed after the drive ring has been properly installed. The holes may have a radial female slot through which a radial male key at an end of an alignment pin can pass. After the key has passed through the holes, it can then be turned to provide engagement with the innermost side of a friction disc. FIG. 15 shows an alignment pin or rod 270 that can extend through aligned holes 272 in a first friction disc 274, a separator disc 276, and a second friction disc 278. An exemplary clutch assembly enables a reduction in torsional vibration. A drive gear ring (e.g., ring 106, 222) can be fitted with a resilient, flexible material adjacent the gear teeth. The resilient material can comprise a moldable liner that is placed intermediate the gear ring and the friction discs (e.g., 156, 157; 244). The liner can act as a vibration damper. The anti-vibration liner can be pliable so as to fill the gaps adjacent the gear teeth and the friction discs to reduce vibration. The resilient material may comprise a gel, paste, film, rubber, elastomeric, polymer, and/or plastic substance or material. The material can be applied to both the gear ring and the friction discs. The material may also comprise a hard slippery coating or composite which promotes slidability and/or reduces wear between the teeth. Turcite® material may be used.

The liner can be a unitary member (e.g., a boot ring) that includes plural moldable items therein, such as plastic balls. The liner can be cut to ensure proper fitting. The unitary member can be handled as a single unit. Alternatively, the liner may be applied non unitarily. For example, the liner may be sprayed or coated onto the gear teeth (or the friction discs) as a plurality of separate substances or as a fluid. Later, the substances or fluid may harden to form a single anti-vibration unit. FIG. 16 shows a moldable annular liner 280. The liner 280 can be positioned adjacent to teeth prior to a gear ring and friction disc engagement. FIG. 17 shows a liner 281 located over the teeth 284 of a friction disc 282. FIG. 18 shows a liner 285 located inside of a drive gear ring 286, adjacent the drive gear teeth 288. Engagement between a gear ring 286 and a friction disc 282 allows a liner to be compressed and evenly dispersed between the engaging teeth 284, 288. An annular liner may be placed into position as a ring. Alternatively, one or more strips of liner may be cut from a roll of liner. During liner installation, the liner can conform to the shape of gaps between (gear ring or friction disc) teeth. The teeth can be used to initially hold the liner in position until engagement occurs between the gear ring and friction disc. In other installation arrangements the liner may include a self-adhesive backing. A self-adhesive backing may be used that temporarily adheres a liner strip adjacent to the teeth. The self-adhesive backing maybe covered with peel-off paper. The adhesive feature of the backing can be time and/or heat sensitive. For example, after a predetermined time or temperature, the backing loses its ability to connect the liner to the teeth. The adhesive feature allows ample time for installation of the gear ring and friction disc. After assembly of the gear ring and friction disc the engaged teeth hold the liner in position, and the adhesive feature is no longer needed. The exemplary clutches described herein can each be used in an exemplary clutch control process with regard to machine operation. Diagnostic monitoring can be used in conjunction with an exemplary clutch to prevent stalling of an engine and/or damage to machine components. The monitoring arrangement includes a controller having one or more sensor devices in operative connection with at least one microprocessor. The controller can also be in operative connection with a jog/run switch, a start button, and a stop button.

Figure 19:
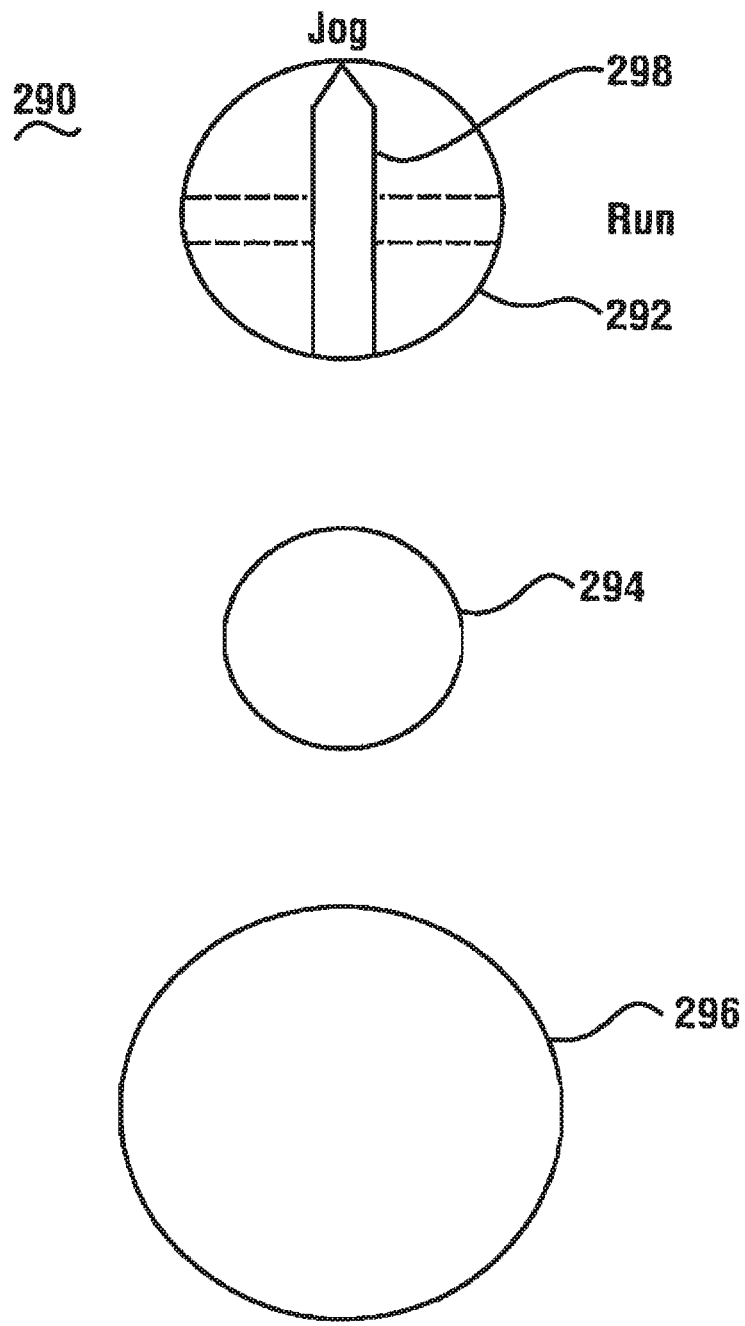
FIG. 19 shows a machine control panel portion.
Figure 20:
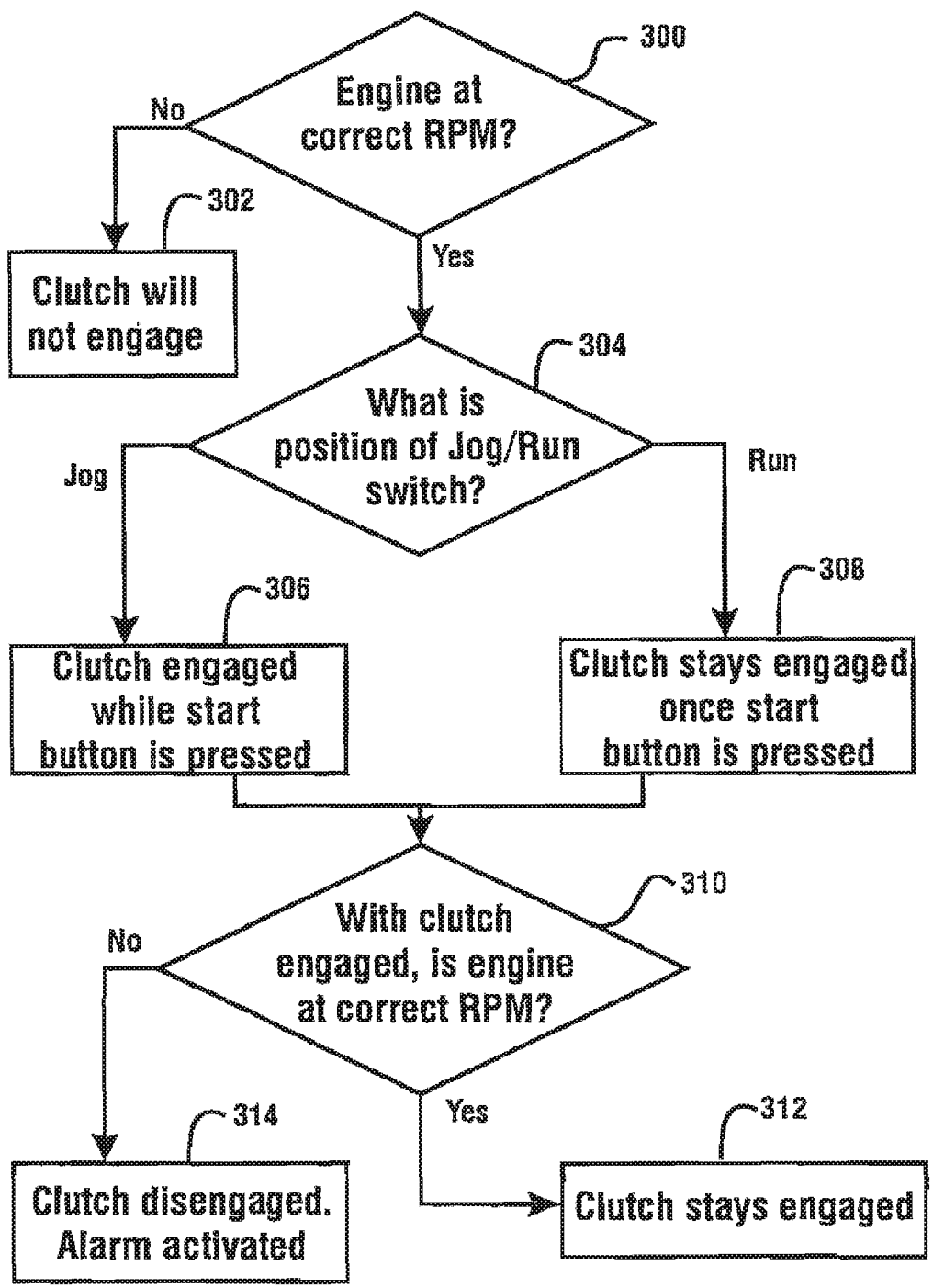
FIG. 20 shows a clutch control monitoring process.

FIG. 19 shows an area of a machine control panel 290 that includes a jog/run switch 292, a start button 294, and a stop button 296. The stop button 296 can be used by the machine operator to disengage the clutch and/or stop the drive engine. A lever 298 on the jog/run switch 292 can be positioned (e.g., rotated while depressed) to dictate the operational mode of the clutch. Alternative forms of jog/run switches may be used, including a two-way flip switch. FIG. 20 shows a flow chart of steps involving an exemplary clutch control sequence.

At startup, at least one sensor can be used to measure engine speed. If the controller determines that the engine speed is at or above a predetermined RPM, then the clutch can be engaged.

Otherwise, the clutch will not engage. Box 302 represents that the clutch cannot be placed in engagement as a result of the "No" determination at decision 300. The RPM setting can be adjusted.

The microprocessor can use at least one sensor to determine 304 the position of the jog/run switch. Depending on the position of the jog/run switch, the operational mode of the clutch will be either the jog mode or the run mode. In jog mode the clutch is only engaged while the start button is being manually pressed. Box 306 represents the clutch being engaged in jog mode. In run mode the clutch becomes engaged and stays engaged after the start button is manually pressed at least once 308. Box 308 represents the clutch being engaged in run mode. The microprocessor can use at least one sensor to determine whether the clutch is engaged. While the clutch is engaged, the diagnostics can again check 310 the engine RPM. If the engine speed is acceptable, then clutch engagement is maintained. Box 312 represents that clutch engagement is continued as a result of the "Yes" determination at decision 310. Otherwise, the clutch is disengaged. Box 314 represents that clutch engagement is discontinued as a result of the "No" determination at decision 310. The microprocessor can cause an alarm to be activated responsive to the condition. The alarm may be visual and/or audible. For example, a warning light may be tripped to begin flashing. While the clutch remains engaged during machine operation, the engine RPM can be repeatedly checked 310. An RPM check can occur after a predetermined time period. The time period can be adjusted. The rechecking can be used by the microprocessor to respond to the shaft being bogged down. Such an event would cause the clutch to be automatically disengaged and the alarm to be tripped. The automatic disengagement can prevent damage to the machine. An operator may then shut down the machine. In alternative monitoring arrangements, while the clutch remains engaged during machine operation, the rotational speed of the shaft can be repeatedly checked instead of (or in combination with) the engine RPM. Thus, the exemplary monitoring arrangement can prevent engine stall. Likewise, damage to the machine and the clutch can be prevented. The clutch monitoring arrangement also enables monitoring in both jog condition and run condition.

An exemplary PTO clutch assembly can be factory or field retrofitted to replace a new or existing Twin Disc® Bell Housing style PTO clutch. The exemplary PTO clutch assembly permits ready replacement. In a retrofit operation, the mechanical linkage components associated with an existing clutch assembly arrangement can be removed and replaced by the exemplary PTO clutch assembly. Certain removed components of the existing Bell Housing style PTO clutch arrangement may be reused, such as the Bell Housing, drive shaft, shaft nut/washer, friction discs, and splined flywheel ring.

Additionally, replacement part kits can contain one or more components of an exemplary PTO clutch assembly. In an exemplary part replacement operation (e.g., changing a friction disc) the assembly can be disassembled to the extent necessary to permit replacement of the particular part(s). The shaft nut can be removed. Removal of the friction plate permits access to the friction disc(s) and springs for removal without disturbing the other assembled clutch components arranged on the shaft. Thus, the friction discs and springs can be readily and efficiently accessed and replaced. Other fastening screws can be removed, permitting other components to be accessed and removed/replaced. Alternatively, the entire clutch assembly can first be removed as a unit from the drive shaft and Bell Housing for later selective disassembly.

Exemplary embodiments of the novel clutch assembly apparatus have a self-adjusting disc pack to minimize slippage. Furthermore, mechanical linkages, hand levers, and yokes can be eliminated. The clutch assembly allows for remote actuation. The clutch can be air or fluid actuated to enhance applications requiring cold start. The quick release arrangement of the clutch assembly with respect to a drive shaft enables fast engagement thereto and disengagement therefrom. Thus, replacement of a clutch assembly component (or the entire assembly) can be carried out in a more efficient manner. Additionally, the novel clutch assembly arrangement enables existing clutch assemblies (or parts of the novel clutch assembly) to be replaced in the field to reduce down time. The novel clutch assembly can also be used to provide a benefit in both pressure and torque capacity over existing mechanical PTO units.

It should be understood that an exemplary embodiment of the novel clutch assembly is a self adjusting clutch. No mechanical adjustment is needed. The piston assembly can be axially driven to automatically compensate for any wear in a friction disc.

Exemplary embodiments of the novel clutch assembly apparatus can be used to retrofit a plurality of PTO clutches, including model types SAE 2, SAE 3, SAB 4, and SAE 5. Particular examples of clutch models that can be replaced by a respective exemplary clutch assembly include (but are not limited to) Single Disc 890-0058-SAE 3PTO, Twin Disc® 890-005 9-SAE 3PTO, and Twin Disc® Mechanical PTO Clutch # SP 111 and SP2 11. The novel clutch assembly apparatus allows retrofit with existing Bell Housings. An exemplary clutch assembly can be used with chipper devices or grinder devices. An exemplary clutch assembly can be used with devices requiring high torque operation during the (cutting) disposal of material (e.g., wood or metal).

An exemplary arrangement involving friction discs and separator disc will now be discussed. In the arrangement, each friction disc has a configuration that reduces the need for an initial break-in and burnishing thereof.

Conventionally, break-in and burnishing of new friction discs are normally required in order to reduce high spots (e.g., burrs) in the friction material. After conventional friction discs are initially installed, the presence of their high spots prevents full face contact with separator discs from being achieved. Thus, the ability of the friction discs to transmit full torque is not initially present. Only after the conventional friction discs have been broken in and lapped together against the separator discs do the high spots become generally worn down, enabling full face contact to finally occur between the friction discs and the separator discs.

It was found that high spots near the center of a friction disc are more problematic because they are harder to wear down. Because of their location, high spots closer to the disc center reduce disc contact further radially outward. Thus, inner high spots cause friction disc transmitted force to be reduced.

It was discovered that more initial torque transmission capability for a friction disc could be achieved (without any need for break-in) by removing approximately ten thousandths of an inch (10 micro-inches; 0.010 inches) of friction material in a direction radially outward to approximately one half of the disc diameter. Thus, when the exemplary friction disc is installed, the disc contact is necessarily only radially outward (and away) from the ten thousandths undercut (or recess or depression or grooved area). As a result, disc contact is more solid (or complete) away from the center of the clutch shaft, which results in more torque being initially transmitted.

Any high spots in the radially outward area (i.e., the higher area located radially outside of the undercut) are more quickly worn down by the lapping action (e.g., abrasion) of the friction disc against a separator disc. Eventually this outward area is worn down to the level where the inner recessed area also makes contact with the separator disc. This eventual wear, which leads to contact by the recessed area, further contributes to the overall torque transmission capability. However, because this eventual wear contact is provided in a smaller area (relative to the size of the outward area) and is closer to the axis of rotation, the amount of its overall torque contribution is less. Thus, the initial reduction in the amount of friction material in contact with the separator disc due to the undercut does not reduce initial transmission force. Rather, as an unexpected result, the undercut actually increases initial transmission force.

For reasons previously discussed, the main diameter of friction disc contact is increased by the addition of the recess feature. By definition of the torque formula used for friction style clutches, this in turn cause an increase in the torque capacity of the clutch device.

Figures 21, 22:
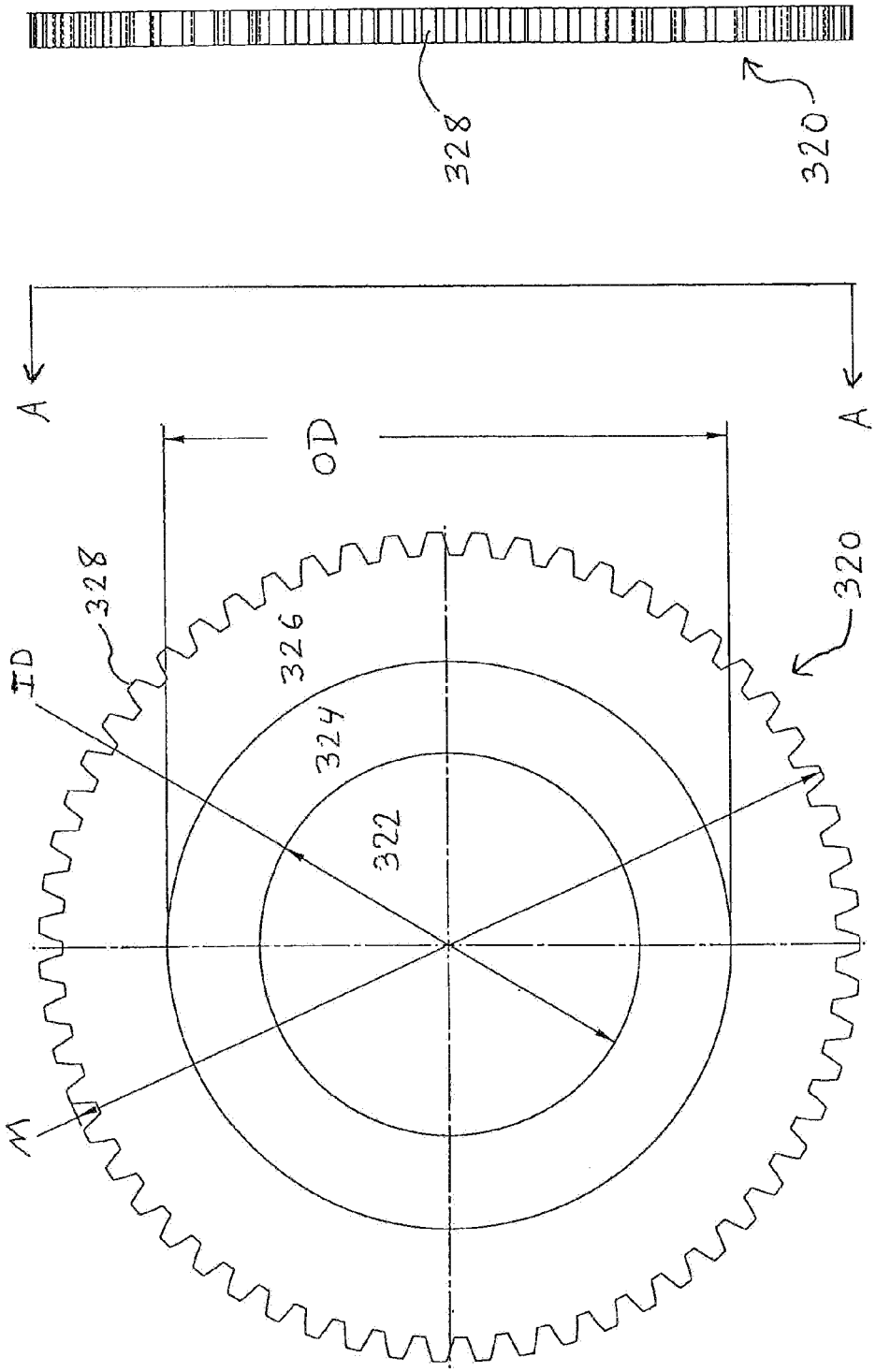
FIG. 21 shows a front view of an exemplary friction disc.
FIG. 22 shows a side view taken along section A-A of the exemplary friction disc of FIG. 21.

FIG. 21 shows a front view of an exemplary friction disc 320. The friction disc 320 has (in a direction extending radially outward) a center opening 322, a recessed inner area 324, and a relatively higher outer area 326. The recessed area 324 has an inner diameter (ID) and an outer diameter (OD) Each side of the disc comprises a recessed inner area 324 and an outer area 326. The disc also includes teeth 328. Also shown is a major diameter (M).

FIG. 22 shows a side view of the exemplary friction disc 320 taken along an outer edge.

Prior to its modification, the friction disc can be of the organic, Kevlar®, carbon fiber, non-asbestos, molded type that is commercially sold by Scan Pac Manufacturing. Friction discs can be used which have a variety of sizes, including those having thicknesses of 0.50, 0.625, and 0.75 inches. Friction discs can also be used which have a variety of different sized and amount of circumferential teeth.

The modification includes providing a recess in approximately the inner half of each side of the friction disc. Each side recess extends radially outwardly (from the opening) a distance that is approximately 35-50% of the total radial distance of the solid disc material. An exemplary recessed radial area is formed by having approximately 0.010 inch depth of friction material removed within the tolerance range of approximately plus-minus (±) 0.004 to 0.008 inches. Thus, the exemplary recess should have a surface that is about 0.010 inches lower than the surface of the radially outer (uncut) section. A recess can be formed by using processes such as cutting, machining, grinding, honing, abrading, etc., or may be molded into the disc profile.

An exemplary friction disc has external involute spline data comprising: type of fit=Fellows; number of teeth=59; diametral pitch=4/5; pressure angle=20; base diameter (ref)=13.8605; pitch diameter (ref)=14.750; major diameter=15.105 inches; minor diameter=14.235/14.221 inches; circular tooth thickness=0.3876 (max actual) and 0.3824 (min actual); measurement over pins=15.340 (min) and 15.327 (max); and pin diameter=0.4320 inches. The material comprises PMA MIX no. 090204. The inside diameter of the recessed area is approximately 7.00 inches. The tolerances are angular: mach±2'; with a bend (in inches) of ±0.030 (one place decimal), ±0.010 (two place decimal), and ±0.005 (three place decimal). Remove all burrs and break all sharp edges 0.15×45". The machined friction disc weight is approximately 5.5 lbs.

In the exemplary friction discs and separator discs relationship, the separator discs are also modified. Each separator disc can comprise a metal (e.g., steel or iron) plate that is machined to provide a surface having a coarse micro finish. For example, the separator discs can be provided with a coarse micro finish in the range of 240-280 Ra micro-inch. In an exemplary separator disc, each side has a finish in the range of 250-270 Ra micro-inch. This additional coarseness provides greater initial friction and grab (with adjacent friction discs) which facilitates immediate force transmission. This structural modification to the separator discs further eliminates the need for break-in and burnishing of the discs.

For reasons previously discussed, the coarse surface of the separator discs will accelerate the burnishing effort of the mating friction discs. This exemplary coarseness feature will also provide a temporary improvement in coefficient of friction between the mating surfaces (of the friction and separator discs), and thus will increase the torque capability of the clutch device until burnishing is achieved (and completed).

The exemplary arrangement of friction discs and separator discs can be used in many applications. The arrangement can be used in a dry application. For example, use with general transmission of force from an automotive or mobile flywheel which involves an SAE, ISO, or DIN type of mount. The exemplary friction discs and separator discs relationship can be used in a Bell Housing clutch.

A further exemplary embodiment includes a microprocessor-controlled proportioning valve that can be integrated with a clutch, such as a Bell Housing clutch. The proportioning valve can be used to increase pressure applied by the clutch piston to the friction discs from 100 to 200 psi over approximately 4-5 seconds. A parabolic curve force application applies the increasing pressure so that there is some period of disc slip. However, disc slip decreases with increasing pressure up to the point of solid disc engagement. As opposed to conventional bumping techniques, use of the microprocessor-controlled proportioning valve provides less risk of fracturing the friction discs.

An exemplary embodiment is directed to an apparatus, which comprises a dry application clutch friction disc. The friction disc comprises a radially extending material area and a radially extending open area. The open area is absent friction disc material yet comprises a center axis extending transversely through the open area. The friction disc is rotatable about the axis.

The radially extending material area comprises a high strength material, such as a para-aramid synthetic fiber (e.g., Kevlar® material). The material area comprises an inner circumferential surface and a toothed outer circumferential area, where the inner circumferential surface bounds the open area. The toothed outer circumferential area comprises fifty-nine teeth. In between the inner circumferential surface and the outer circumferential area, the material area has a non uniform thickness. The material area comprises opposite sides of the friction disc. Each disc side comprises a surface area extending radially outward from the inner circumferential surface to the toothed outer circumferential area. Each surface area comprises an inner planar surface region and an outer planar surface region. The inner planar surface region comprises an annular area extending radially outward from the inner circumferential surface to an intermediate radial position located approximately half way between the inner circumferential surface and the toothed outer circumferential area. The outer planar surface region comprises an annular area extending radially outward from the intermediate radial position to the toothed outer circumferential area. The inner planar surface region is recessed relative to the outer planar surface region in an inwardly axial direction a distance of approximately ten thousandths of an inch. An exemplary recess comprises a machined recess.

A further exemplary embodiment includes a dry application clutch comprising a friction disc. The friction disc comprises an annular radially extending material area which extends radially intermediate of an outer circumferential area and an open area. This material area includes disc material which comprises a side surface of friction material. The side surface comprises an inner annular side surface portion and an outer annular side surface portion. The inner annular side surface portion is disposed intermediate of the outer annular side surface portion and the open area. The inner annular side surface portion has an inner generally planar surface. The outer annular side surface portion has a generally planar surface which extends generally transversely outward beyond the inner generally planar surface of the inner annular side surface portion. The generally planar surface extends radially from the inner annular side surface portion to at least the outer circumferential area.

The friction disc has transversely opposed disc sides. The outer annular side surface portion of each side comprises a generally planar surface extending generally transversely outward beyond the respective inner annular side surface portion. The outer annular side surface portions have an approximate thickness of one of 0.500, 0.625, and 0.750 inches. The inner annular side surface portion extends radially outward from the open area to the outer annular side surface portion. The inner annular side surface portion is a recess in the friction material. The recess comprises a recess machined from the friction material, and extends generally transversely inward approximately ten thousandths of an inch relative to the outer annular side surface portion.

An exemplary material area has a maximum radial length comprising a first length. The recess has a maximum radial length comprising a second length. The second length is approximately half the length of the first length. The exemplary friction material comprises non asbestos, carbon fiber material, such as Kevlar®.

The further exemplary embodiment also includes at least one article including computer executable burnishing instructions (e.g., software) operative to cause a microprocessor to control a proportioning valve to allow pressure applied by a clutch piston to the friction disc to increase from approximately 100 psi to approximately 200 psi over a period of approximately 4 to 5 seconds. Examples of an exemplary article include a hard drive, memory stick, programmable semiconductor memory, magnetic memory, optical memory, and a memory storage device. An exemplary article can comprise a non-transitory computer readable medium including computer executable instructions operative to cause at least one computer to carry out the valve control.

The further exemplary embodiment additionally includes a separator disc having a size enabling operational engagement with the friction disc in a bell housing flywheel clutch arrangement. The separator disc comprises a central open area which is absent separator disc material. The separator disc also comprises an outer circumference. The separator disc also comprises an annular separator material area of substantially uniform thickness radially extending from a toothed inner circumferential area to the outer circumference. In initial clutch operation, the annular separator material area is only engageable with the generally planar surface of the outer annular side surface portion. The separator disc comprises an iron separator disc, wherein the annular separator material area comprises a machine-generated coarse surface having a micro finish in the range of 250-270 Ra micro-inch.

Another exemplary embodiment comprises an apparatus which includes a dry application bell housing flywheel clutch arrangement. The arrangement comprises at least one friction disc, at least one separator disc, and a piston. Each respective separator disc is located adjacent to a respective friction disc. The piston is operative to cause operational engagement between respective friction discs and separator discs. Each friction disc comprises fifty-nine disc teeth and has a maximum thickness of one of approximately 0.500, 0.625, and 0.750 inches. Each friction disc also comprises transversely opposed sides.

Each side comprises an annular radially extending outer material area. Each outer material area is radially outwardly bound by a disc teeth area. Each outer material area also comprises a first planar outer side surface that maximumly extends radially a first length. Each side also comprises an annular radially extending machined recess area.

Each recess area comprises friction disc material. Each recess area is also radially inwardly bound by an open area that is absent friction disc material. On each side, the recess area is radially outwardly bound by the outer material area. Each recess area further comprises a second planar outer side surface. On each side, the second planar outer side surface is positioned/located transversely inward from the first planar outer side surface a distance of approximately ten thousandths of an inch. The second planar outer side surface maximumly extends radially a second length which approximately equals the first length.

An exemplary clutch arrangement is operationally useful in different environments. For example, in a marine environment the engine may be tilted relative to the horizontal for purposes of being oriented with the angle of a drive shaft for a propeller. In another environment an engine may be tilted nose-down in order to produce a space saving configuration. The exemplary clutch can be used in both of these types of environments. Specifically, the exemplary clutch permits usage thereof in environments where the drive shaft is not in a horizontal position during operation. Thus, the exemplary clutch can be mounted on the front of an engine or a gear box in an orientation in which the drive shaft is not horizontal.

Figure 23:
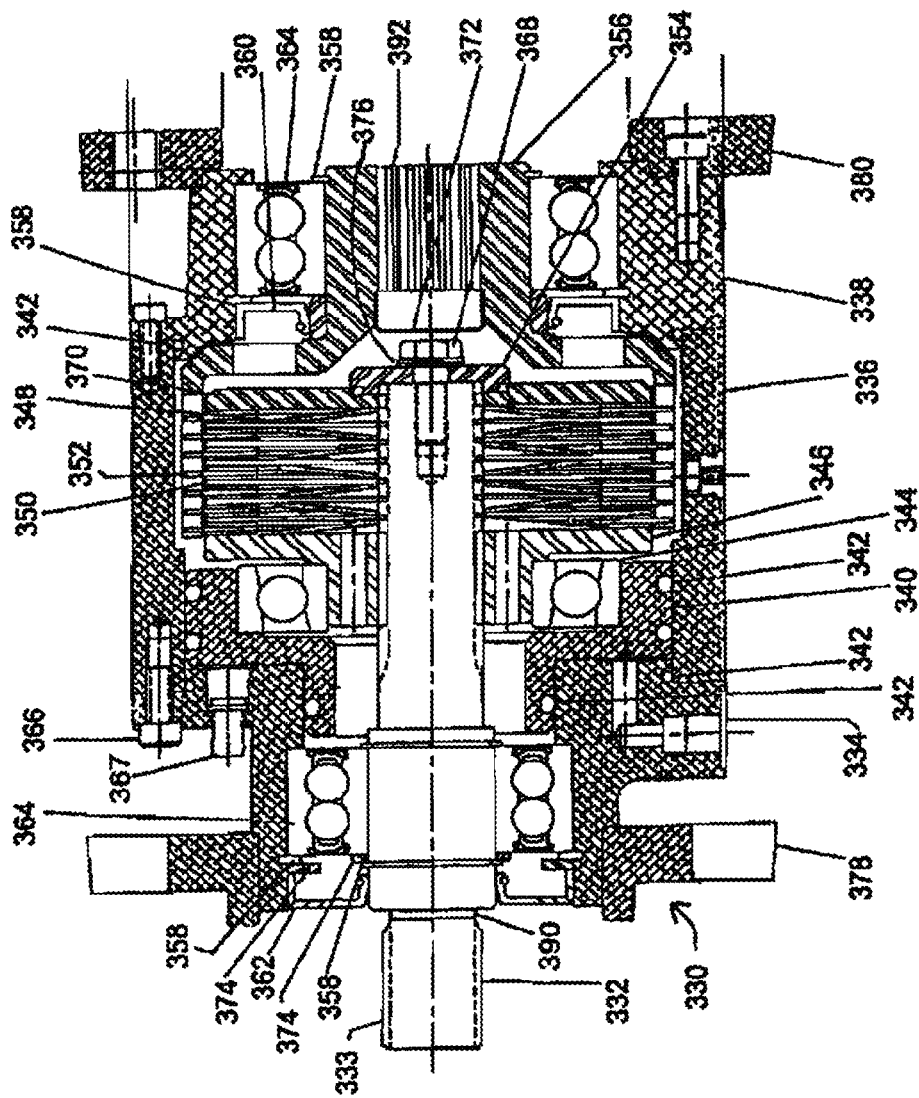
FIG. 23 shows an exemplary embodiment of a PTO clutch assembly arrangement.
Figure 24:
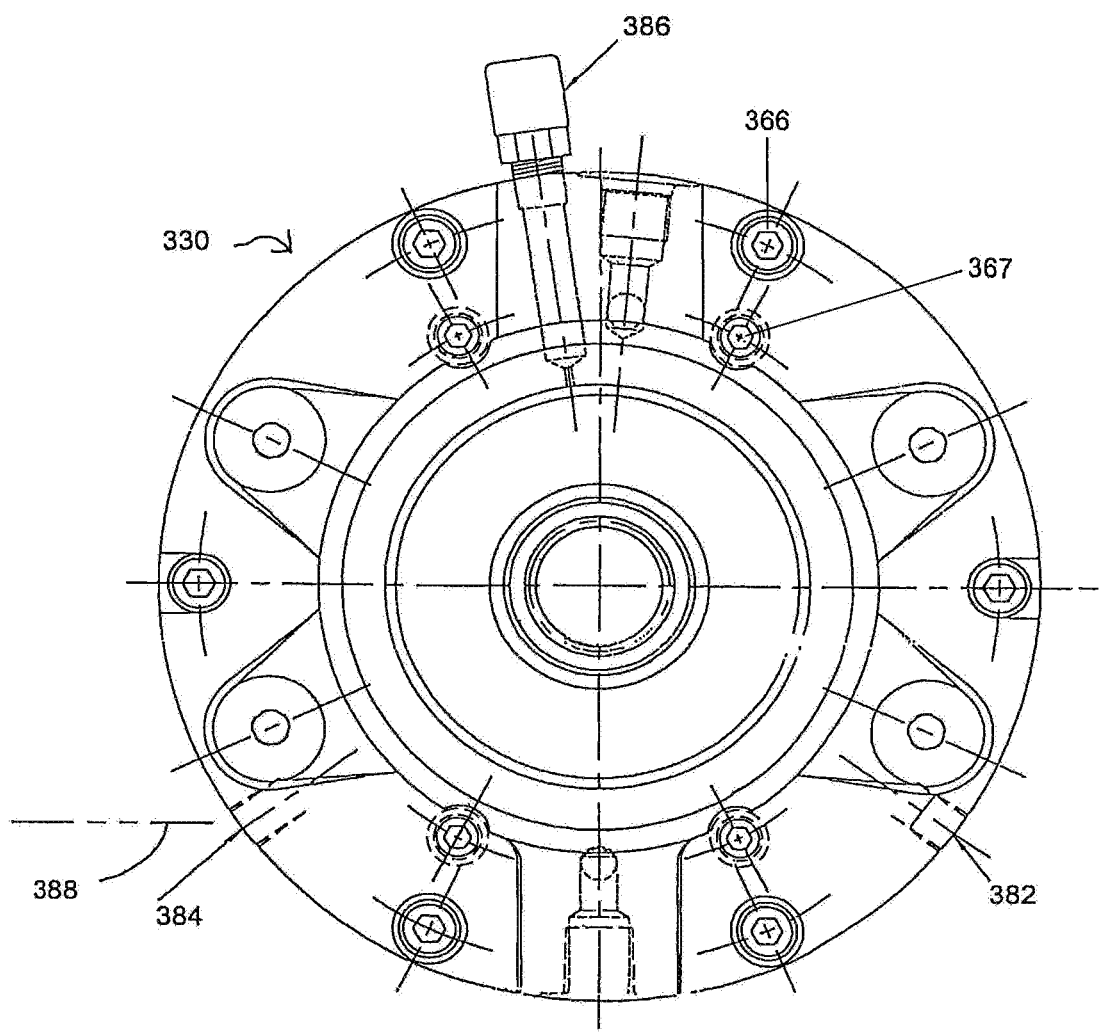
FIG. 24 shows an end view of the clutch assembly.

FIGS. 23 and 24 show an exemplary embodiment of a PTO clutch assembly arrangement 330. FIG. 23 is a cross-sectional view of the clutch assembly 330. FIG. 24 is a cross-sectional view taken along section A-A of FIG. 23.

FIG. 23 shows the clutch assembly 330 comprising an input shaft 332 with splines 333, input housing 334, housing 336, output housing 338, piston 340, O-rings 342, angular contact ball bearing arrangement 344, pressure plate 346, Belleville springs 348, separator discs 350, friction discs 352, washer 354, drive cup 356, retaining rings 358, seals 360, 362, ball bearings 364, a fastening screw 366, a mechanical piston (which comprises a come-home engagement screw 367 that allows the piston 340 to be axially moved manually), hex head 368, back plate 370, freeze plug 372, support washers 374, lock washer 376, male flange 378, female flange 380, and drive cup output spline 392. FIG. 24 additionally shows plugs 382 for closing holes 384, a breather vent 386, and an oil lubrication (full) level line 388.

The shaft transition area between the toothed shaft input area 333 and the body of the shaft 332 includes a notch or neck 390. The configuration of the neck 390 has a smooth parabolic curved shape. This smooth configuration contributes to reduced shear in the shaft transition area.

The seal 360 is adjacent to the spline drive side of the drive shaft 332. The seal 360 comprises a double lip seal which prevents fluid flow both into and out of the body of the clutch. For example, the seal 360 prevents inward fluid flow when external positive pressure is acting on the face of the seal. Such situations may occur when the clutch is attached to the front of an engine, gear box, or similar device. Likewise, when the clutch is in a downward-facing orientation there may be a situation where air pressure is acting externally on the seal. The dual lip seal 360 seals against infiltration and oil leakage. The dual lip seal 360 prevents fluid (e.g., oil) from entering the clutch body and washing out the bearings 364 to cause bearing heat failure. The dual lip seal 360 also prevents fluid from filling the housing 336, which could cause bearing failure due to excess heat. In an exemplary embodiment the double lip seal 360 is a Viton® seal which can successfully operate at a temperature of approximately 400° F.

The angular contact ball bearings 344 can operate to hold the pressure from the piston 340 against the disc pack 350, 352 when the clutch is engaged. In the exemplary embodiment, the clutch housing 336 is considered full of lubricant when the lubricant fills about only about a third of the housing capacity. At the full level the internal lubricant comprises about 4 oz of an automatic transmission fluid, such as Dexron® III or Dexron® VI. Alternatively, Shell Tellus® 68 hydraulic oil may be used.

The overfill holes 384 in the housing 336 are configured to prevent overfilling of the lubricant. The holes 384 are normally closed by the plugs 382. By having one or more of the plugs 382 removed at the time of adding new lubricant to the housing, any excess lubricant is caused by gravity to flow out of the open hole(s). As a result of any excess lubricant having been automatically removed, the remaining lubricant in the housing is automatically properly set at the full level line 388. Of course any removed plug 382 is reinstalled before clutch operation.

An unexpected result of having a lesser amount (e.g., one third of capacity) of lubricant in the clutch housing 336 is enhanced cooling of the angular contact ball bearings 344. Apparently, the additional empty area in the housing (caused by the limited amount of lubricant used) allows for greater splashing and/or dispersion of the lubricant. This additional splashing and dispersion ability enables the lubricant to quickly transfer its heat directly to metal housing sections that are located far away from the bearings. That is, as opposed to the entire capacity being completely filled with lubricant, the splashing and dispersion onto remote (cooler) surfaces enables heated lubricant to more quickly find an available heat sink that can absorb excess heat (from the lubricant). The result is a faster and/or greater amount of heat transfer from the bearings.

Figure 25:
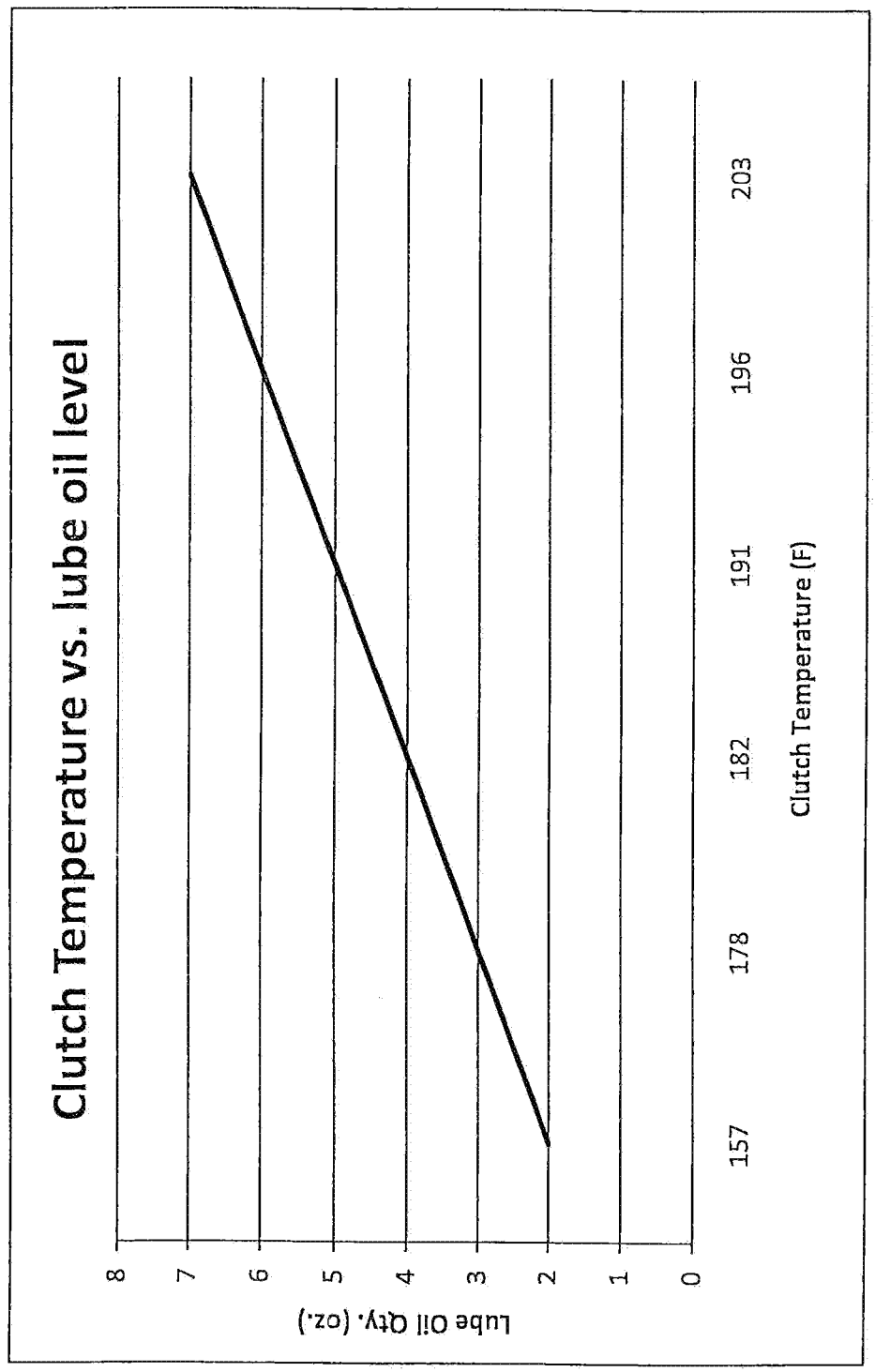
FIG. 25 comprises a graph showing the relationship between lubricant level and clutch surface temperature.

FIG. 25 comprises a chart which graphically shows the benefit of using only a limited amount of lubricant. Specifically, the chart shows lubricant level versus clutch surface temperature for a Logan Clutch model 500 clutch. Temperatures for lubrication fluid quantities from 2-7 oz were measured. The clutch parameters include the clutch being in a horizontal position, 110 psi air supplied, 2500 clutch rpm, and Dexron® VI ATF used as the lubricant.

A lock arrangement 400 holds the clutch back plate 370 in position. The lock arrangement 400 includes the heavy end washer 354. The annular washer 354 has an annular projection 394 that can sit/rest in and engage an annular recess 396 in the back plate 370. As can be seen in FIG. 23, the projection 394 is disposed radially inward from the outer circumferential edge 398 of the end washer 354.

The end washer 354 is tightly held in position against the back plate 370 by a bolt/screw 402 (having the hex head 368) and the intermediate locking washer 376. The locking washer 376 is configured to grippingly engage and rotate the heavy end washer 354 relative to the back plate 370 as the hex head 368 (or nut) is being turned in the tightening direction. This rotation enables a more complete tightening of the bolt/screw 402. The locking washer 376 comprises a pair of pieces 404, 406. Each piece has a threaded face which can respectively engage the other threaded face to form a cam engagement lock. The locking washer 376 is configured so that prior to complete tightening, it can apply greater frictional engagement to the end washer 354 than the end washer 354 can apply to the back plate 370. That is, before tightening is completed the friction force created between the end washer 354 and the locking washer 376 can be greater than the friction force created between the end washer 354 and the back plate 370. Thus, rotation of the end washer 354 relative to (and sliding against) the back plate 370 can occur.

In contrast, even if an end washer in a conventional clutch structure was able to engage the back plate, this same end washer could not rotate relative to the back plate during tightening. As a result, the conventional clutch back plate lock arrangement (in comparison to the exemplary lock arrangement) would prevent a bolt from being fully tightened.

As discussed above, one advantage of the end washer 354 and locking washer 376 relationship is that the back plate 370 can be more fully and securely fastened. A further advantage is that the clutch can be reversed (e.g., operate the drive shaft in a reverse direction) with less risk that the bolt/screw 402 will loosen. This is because relative to the (non slip) end washer/locking washer relationship, the end washer/back plate relationship provides for the surface of the end washer's projection 394 to slip relative to the surface of the back plate's recess 396. As a result of this end washer/back plate slippage relationship, the force that can be applied toward loosening the bolt/screw 402 is limited.

The freeze plug 372 is mounted to provide an inner seal at the output spline 392. The freeze plug 372 prevents material from entering in and from leaking out of the clutch housing 336. The O-ring seals 342 also prevent leakage from the housing 336.

In an exemplary embodiment the shaft 332 is hardened using an ion nitride process. This hardening helps prevent nicking (or denting, notching, grooving, chipping) of the shaft splines, especially in the area of the piston 340, back plate 370, separator discs 350, and friction discs 352. Such nicking in this area often occurs in conventional clutch structure due to heavy vibration associated with marine diesel engines. Thus, the hardened spline area of the exemplary shaft enables the piston 340 and the discs 350, 352 to more readily move axially. The shaft 332 also includes a nitrite coating which causes the shaft's outer surface to be more slippery, which further prevents nicking.

As previously discussed, the exemplary clutch is usable in PTO applications. The exemplary clutch can also be used in applications to run (operate) hydraulic pumps and in applications to run air compressors.

An exemplary embodiment is directed to an apparatus, which comprises a PTO clutch assembly arrangement. The arrangement comprises an input end housing section, an output end housing section, an intermediate housing section, a rotatable shaft, a rotatable drive cup, an annular piston, and a lock arrangement.

Input twin ball bearings and a double lip seal are located in the input end housing section. Output twin ball bearings and a one-way seal are located in the output end housing section. Both the double lip seal and the one-way seal are operable up to approximately 400 degrees Fahrenheit.

At least a part of the intermediate housing section extends intermediate the input end housing section and the output end housing section. The intermediate housing section is configured to hold lubrication fluid. Angular contact ball bearings are located in the intermediate housing section. A disc pack, a pressure plate, and a back plate are also located in the intermediate housing section. The back plate includes an annular recess. The disc pack is located intermediate the pressure plate and the back plate. The disc pack includes a plurality of rotatable separator discs, a plurality of rotatable friction discs, and at least one biasing member. In an exemplary embodiment, the at least one biasing member includes a plurality of springs, such as Belleville springs.

The intermediate housing section includes at least one lubrication fluid overfill outlet and at least one plug configured to respectively close the at least one lubrication fluid overfill outlet. With the at least one plug removed during lubrication fluid adding, excess lubrication fluid is caused to escape by gravity through the at least one lubrication fluid overfill outlet resulting in a predetermined full level of lubrication fluid in the intermediate housing section. The intermediate housing section comprises a total internal volume. At the predetermined full level, approximately one third (30-36%) of the total internal volume includes lubrication fluid. In an exemplary embodiment, the intermediate housing section includes three lubrication fluid overfill outlets and three respective plugs.

The shaft includes a shaft input end, a shaft output end, and an axis. The shaft axially extends inside both the input end housing section and the intermediate housing section. The shaft is rotationally guided by input twin ball bearings. The shaft engages the double lip seal at two axially spaced positions. The shaft is rotationally guided by the angular contact ball bearings. The shaft is connected to the separator discs. The shaft comprises a propeller drive shaft which is specifically structurally configured toward marine environment usage. For example, the shaft comprises an ion nitride-hardened rotatable shaft which is angularly operable in the range of 7 to 10 degrees from horizontal. The PTO clutch arrangement is manually operable to engage and disengage PTO from the shaft.

The drive cup is connected to the friction discs. The drive cup is rotationally guided by the output twin ball bearings. The drive cup engages the one-way seal enabling the one-way seal to assist in preventing lubrication fluid leakage. The drive cup includes a toothed bore. The drive cup also includes a seal plug at one end of the toothed bore. In an exemplary embodiment, the seal plug is located at the inner end of the toothed bore.

The piston is at least partly located in the intermediate housing section. The piston is movable in an axial direction (e.g., movable in a direction of the shaft axis). Activation of the piston is operative to cause the piston to move to cause the shaft to impart rotation to the drive cup through engagement between the friction discs and the separator discs. That is, activation of the piston is operative to cause engagement of separator discs with respective friction discs to impart rotation to the drive cup. The Belleville springs are operative to provide a force in an axial direction acting against this engagement.

The lock arrangement is operative to hold the shaft output end and the back plate in operative engagement, such as by fastening the shaft output end to the back plate. The lock arrangement includes a threaded fastener, an end washer, and a locking washer.

The threaded fastener includes a rotatable screw (or a bolt) having a fastener head. The screw (and head) is rotatable relative to the shaft during tightening of the screw (or bolt). The end washer includes an axially extending annular projection configured to rest in the annular recess. The annular projection is also configured to engage the back plate while in the annular recess.

The locking washer is located axially intermediate the fastener head and the end washer. The locking washer operationally engages the end washer causing the end washer to rotate with rotation of the locking washer. Thus, rotational tightening of the fastener head causes the locking washer to engagingly rotate the end washer relative to the back plate. As a result, rotational tightening of the fastener head causes the annular projection in the annular recess to rotate into locking engagement with the back plate. This locking engagement enables operational usage of the shaft in both a first rotational direction and a second rotational direction, where the second rotational direction is opposite the first rotational direction.

In an exemplary embodiment of a clutch, the clutch has a maximum HP of 228 HP, maximum torque of 500 ft/lbs, min/max actuation pressure of 90/120 psi (7-78 bar), maximum operating speed of 2400 rpm, and maximum back pressure to tank of 5 psi. Inertial values are 0.24 lb-ft$^2$ disengaged and 0.56 lb-ft$^2$ engaged. The unit weight of the clutch is approximately 45 lbs (20.4 kg). The locking washer 376 comprises a Nord-Lock® locking washer. Internal lubrication comprises 4 oz of Dexron® III ATF, Dexron® VI ATF, or Shell Tellus® 68 hydraulic oil. With the total amount of lubricant filling only about a third of the housing capacity, an operational clutch surface temperature of no higher than 180° F. can be achieved. The input shaft 332 can comprise a SAE spline 'C' 14 tooth 12/24 DP input shaft. The toothed inner bore 392 of the drive cup 356 can comprise a SAE spline 'C' 14 tooth 12/24 DP output bore. When mounted, the clutch drive shaft can be successfully operated at approximately 7 degrees of axial tilt (or bend) in any direction.

Figure 26:
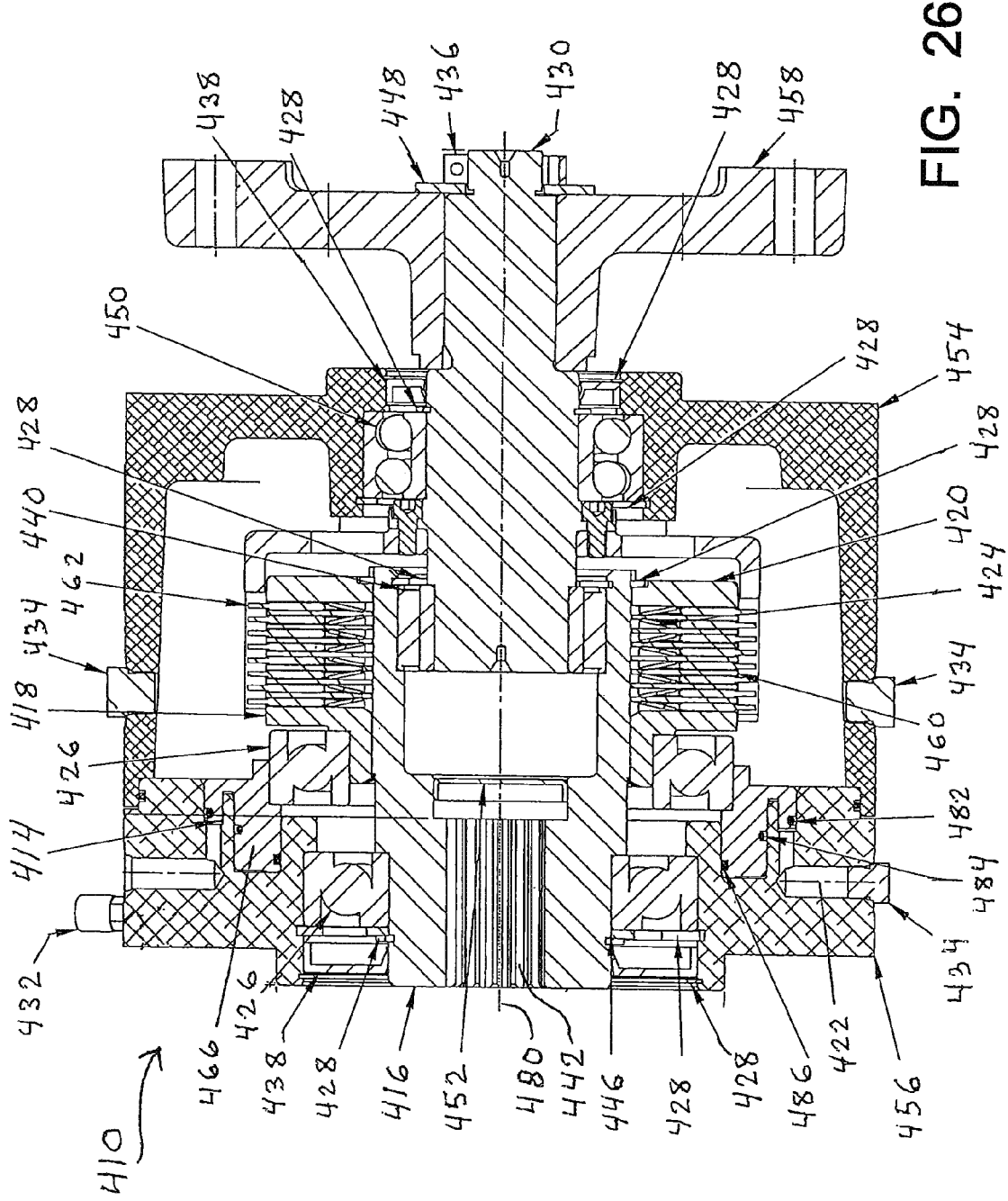
FIG. 26 shows an exemplary embodiment of a clutch assembly.

FIG. 26 shows another exemplary embodiment of a clutch assembly arrangement 410. The clutch assembly 410 includes (or can be used with) a piston assembly 414, hub 416, pressure plate 418, back plate 420, inlet port 422, at least one biasing member 424 (e.g., a Belleville spring), ball bearings 426, retaining rings 428, drive cup (or shaft assembly) 430, breather vent 432, port plugs 434, clamp collar 436, shaft seals 438, needle roller bearing 440, spline 442, support washer 446, flat washer 448, ball bearing 450, expansion plug 452, input housing 454, output housing 456, input drive flange 458, separator disc 460, and friction disc 462. The clutch assembly 410 may be used in a PTO operation.

It should be understood that although the novel clutch assembly may be described herein with reference to PTO operation, it is within the scope of the present invention for the clutch assembly and components to also be applicable with other types of known clutch operations and applications. For example, embodiments of the exemplary clutch assembly may include a friction clutch, a multiple plate clutch, a wet clutch, a dry clutch, a vehicle clutch, a hydraulic pump clutch, an air compressor clutch, a marine environment propeller drive shaft clutch, a material disposal (cutting of wood or metal) clutch, a stump grinder clutch, a trencher clutch, etc.

The piston assembly 414 includes a dual actuation piston 466. As discussed in more detail later, the annular piston 466 allows the clutch assembly 410 to be used in both high pressure and low pressure applications. For example, hydraulic pressure may be used in high pressure applications, whereas pneumatic pressure may be used in relatively low pressure applications. Thus, the same clutch assembly 410 can be used in both pneumatic and hydraulic pressure operations. This enables the clutch to function as a variable fluid (multi-fluid or multi-pressure) clutch, which increases the usability of the clutch.

Figure 27:
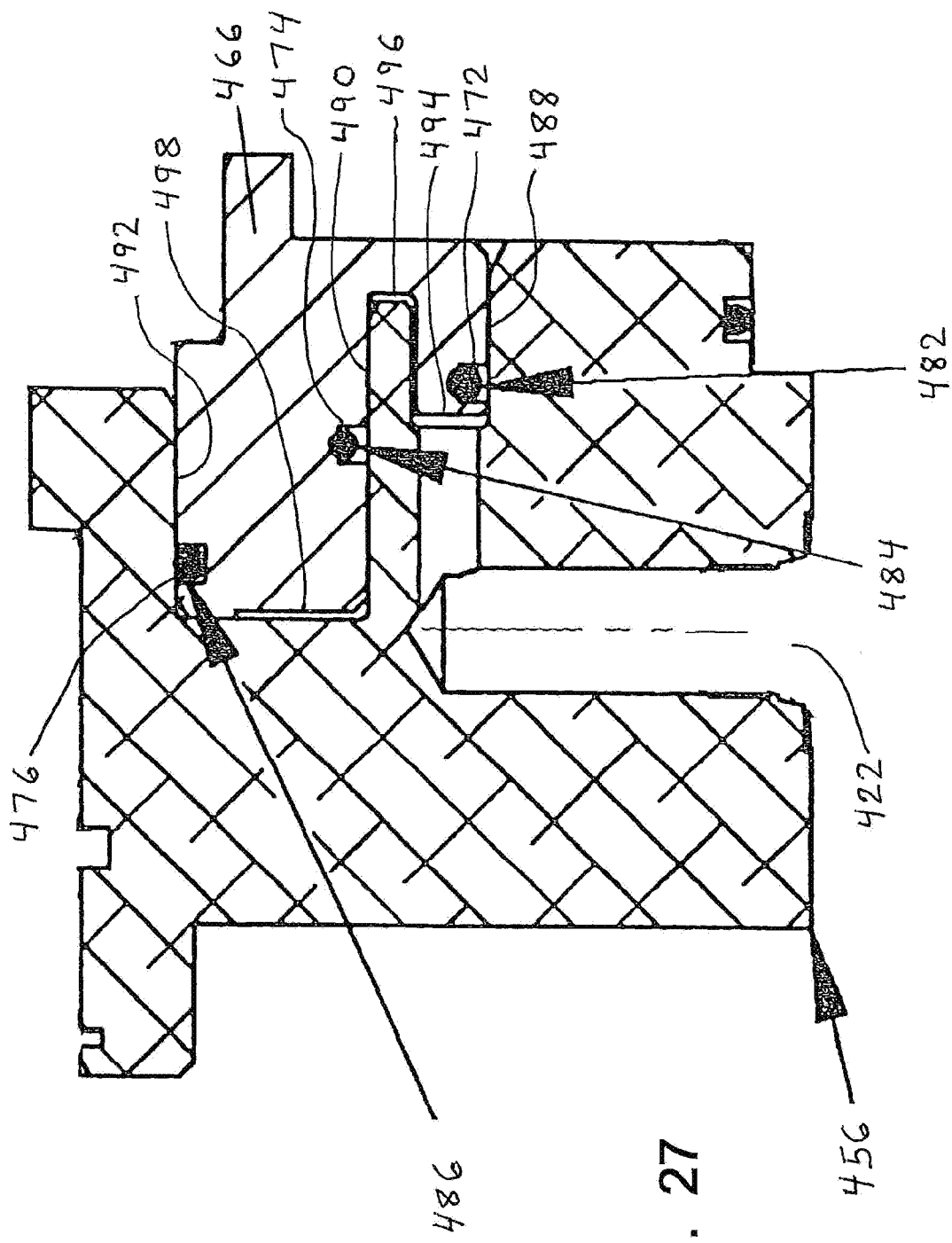
FIG. 27 provides an enlarged view of a portion of FIG. 26 which shows part of the piston seal arrangement.

FIG. 27 shows an enlarged view of the sealing arrangement (shown in FIG. 26) between the piston 466 and the output housing 456.

Figure 28:
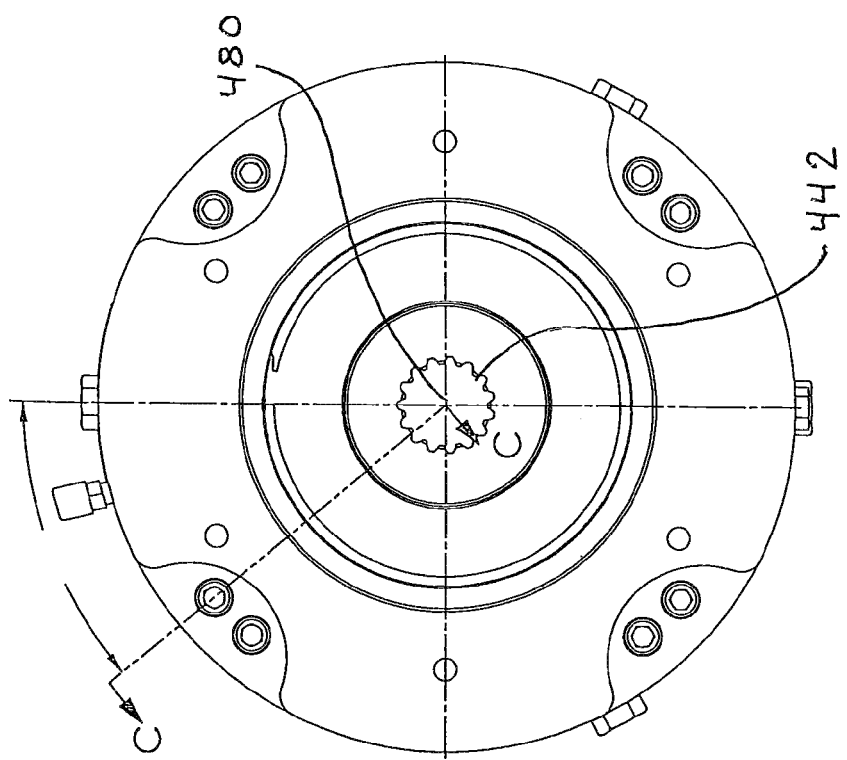
FIG. 28 shows a first end view of the clutch assembly of FIG. 26.

FIG. 28 shows a first end view of the clutch assembly 410. The end of the clutch assembly 410 shown is the end portion that includes the spline 442. The section taken along line C-C in FIG. 28 is shown in FIG. 30.

Figure 29:
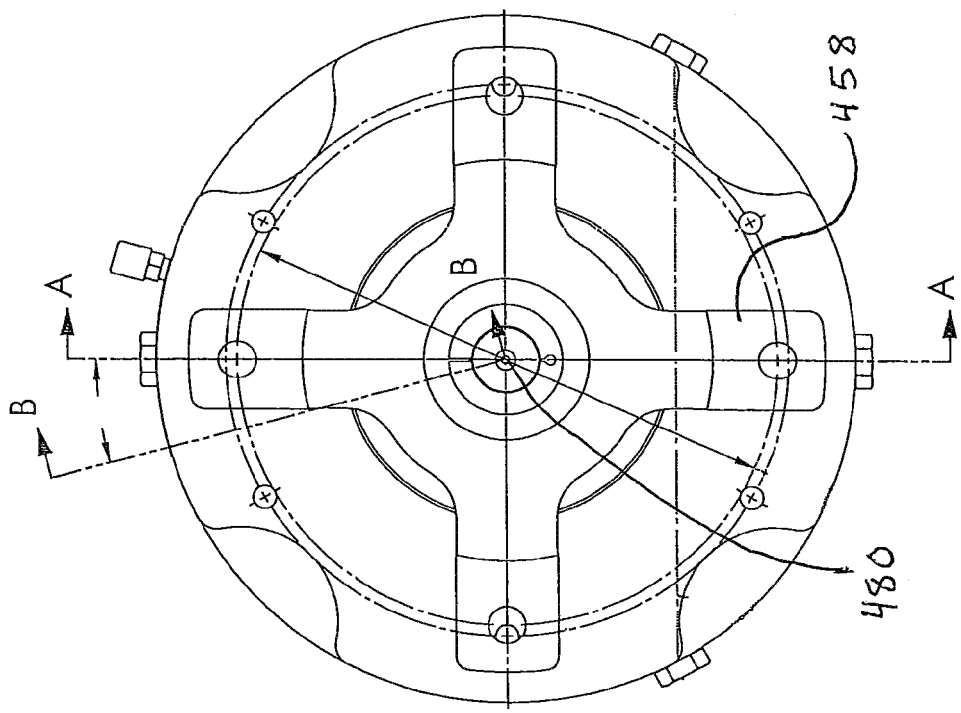
FIG. 29 shows an opposite end view of the clutch assembly of FIG. 26.
Figure 31:
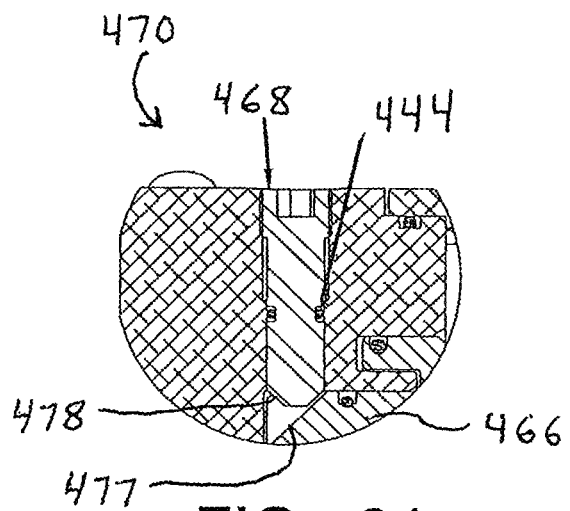
FIG. 31 shows an exemplary embodiment of a mechanical piston arrangement in which a threaded member can be manually rotated to engagingly abut the piston to impart actuation movement to the piston.

FIG. 29 shows a view of the other (opposite) end of the clutch assembly 410. The end of the clutch assembly 410 shown is the end portion that includes the drive flange 458. The section taken along line A-A in FIG. 29 is shown in FIG. 26. The section taken along line B-B in FIG. 29 is shown in FIG. 31, which will be discussed in more detail later.

Figure 30:
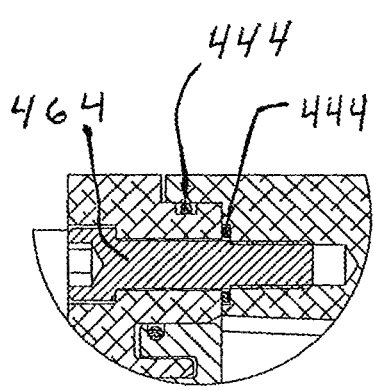
FIG. 30 shows a connection of the input and output housings.

FIG. 30 shows one of a plurality of connection members (screws or bolts) 464 that are used to connect the output housing 456 to the input housing 454. The seals 444 help provide sealing engagement between the adjacent housings 454, 456.

Figure 32:
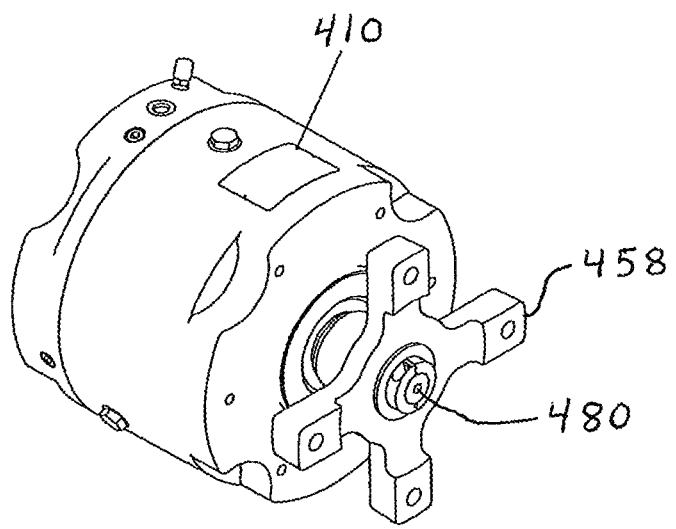
FIG. 32 shows an angled exterior view of the clutch assembly of FIG. 26.

FIG. 32 shows an angled exterior view of the assembled clutch assembly 410, which shows the drive flange 458 and the axis 480.

In the exemplary embodiment of FIG. 26 and FIG. 27, the clutch assembly 410 further includes an outer seal recess 472, an intermediate seal recess 474, and an inner seal recess 476. Each recess can be annular. A seal recess may also be referred to herein as a groove, a slot, an indentation, a hollow, a holding area, a retaining area, etc. Each respective seal recess is configured (e.g., shaped, sized) to hold or retain a respective seal 482, 484, 486. The outer recess 472 can hold the outer seal 482, the intermediate recess 474 can hold the intermediate seal 484, and the inner recess 476 can hold the inner seal 486. Again, each seal 482, 484, 486 may comprise an annular O-ring. The inner seal recess 476 is in a fluid flow path that is downstream of the intermediate seal recess 474. The seals 482, 484, 486 allow the pressure-activated piston 414 to sealingly move (slide) relative to the output housing 456.

FIG. 27 shows an embodiment of a piston arrangement that comprises at least three seal recesses 472, 474, 476. For purposes of greater understanding, all three seal recesses are shown holding a respective seal 482, 484, 486. However, it should be understood that not all of the seal recesses need to hold a seal in each exemplary seal arrangement (or configuration), which will be discussed in further detail later. Also, other exemplary embodiments can include different quantities (and locations) of seal recesses.

It should be understood that a multi-seal arrangement (e.g., double or triple seals) can be used instead of a single seal arrangement in the various exemplary embodiments in order to provide an additional (or backup) layer of sealing protection. For example, each seal recess may be sized to hold a set of two O-ring seals instead of only one O-ring seal. Alternatively, the seal recesses may each be replaced by two immediately adjacent seal recesses, where each seal recess is sized to hold a single seal.

In the exemplary embodiment shown, the respective seal recesses 472, 474, 476 are formed in respective axially extending outer 488, intermediate 490, and inner 492 surfaces of the piston 466. These piston surfaces extend in an axial direction, which is parallel to the movement of the piston. As the piston 466 axially moves, the respective seals 482, 484, 486 can slide in abutting relation along respective axially aligned surfaces of the adjacent output housing 456.

In alternative embodiments the seal recesses (e.g., annular grooves or slots) can be formed in the adjacent surfaces of the output housing 456, instead of being formed in the piston. A mixed combination of piston seal recesses and housing seal recesses may also be used. It should be understood that the structural configuration of the piston shown in FIG. 26 and FIG. 27 is exemplary, and that in alternative embodiments other piston configurations (e.g., shapes) can be used. These alternative embodiments can also comprise different quantities of seal recesses (and thus seals) located at different positions along the piston (or housing) surface.

The exemplary piston 466 can be used with either application of a relatively high activation pressure or a relatively low activation pressure to achieve rated torque transmission and output. For example, high pressure may be in the range of 300-340 psi (e.g., 320 psi), whereas low pressure may be in the range of 100-140 psi (e.g., 120 psi). In other examples, pressure used from a high pressure range may be a multiple factor (e.g., 2×, 3×, 4×) of pressure used from a low pressure range. The ability to use either a (high or low) pressure level for clutch engagement is achievable because the exemplary piston is structured to be used with different seal arrangements (or configurations). As discussed in more detail later, the piston 466 can be switched between operating in high pressure and low pressure applications based on usage (location) of the intermediate seal 484.

Applied pressure produces an actuation force that acts against a piston surface area to cause movement of the piston. The different seal arrangements provided for in the exemplary embodiments allow for this effective piston surface area to be different sizes. For example, placement of the O-rings in a first seal configuration creates a first piston surface area against which the pressure applied acts. Placement of the O-rings in a second seal configuration creates a second piston surface area. The second surface area differs from the first surface area in size. Thus, the piston surface area can be adjusted in size so that the piston receives substantially the same piston-moving force regardless of which (high or low) pressure level is applied.

In the exemplary embodiment, to use the piston 466 in a high pressure application both the outer seal 482 and the intermediate seal 484 are present. In contrast, to use of the piston 466 in a low pressure application the intermediate seal 484 is absent but both the outer seal 482 and the inner seal 486 are present. As can be seen, the low pressure seal arrangement creates a greater piston surface area in comparison to the high pressure seal arrangement.

The intermediate seal 484 can be manually swapped in and out of the intermediate recess 474 during an assembly, rebuilding or servicing operation. Such process may include separating (removing) the piston 466 from the housing 456.

Since the outer seal 482 is used in both high and low pressure applications, it may not have to be removed (or replaced) during the service handling (switching) of the intermediate seal 484. The inner seal 486 may be removed before high pressure applications are used, since it is not needed therein. Alternatively, the inner seal 486 may remain installed for such high pressure applications. Use of the intermediate seal 484 is dependent on the (high or low) pressure to be employed. In some embodiments, in order to ensure sealing integrity all seals can be replaced each time the piston 466 is serviced with regard to adjusting (installing/removing) the intermediate seal 484. The seals 482, 484, 486 can be of any known seal type that allows for the sealing described, including the O-ring type of seal.

A scenario of using differently sized piston surface areas to achieve an essentially same piston actuation force will now be discussed. Pressure (lbs/in$^2$)×piston surface area (in$^2$)=applied force (lbs). A piston surface area is ($\pi$ d$^2$)/4. In the example the high pressure will be 320 psi (22 bar) and the low pressure will be 120 psi (8.3 bar). The piston has an outer diameter of 10.0 in. The high pressure is used with a seal configuration that leaves an open inner diameter of 9.0 in. Thus, the amount of driving force applied to the piston when using the pressure of 320 psi will be:

$$320 \text{ psi} \times (\pi \times [(10 \text{ in})^2 - (9.00 \text{ in})^2]/4) = 4777 \text{ lbs.}$$

Accordingly, one can determine the reduction in the open inner diameter that would be needed to achieve essentially the same applied force (4777 lbs) when using the lower pressure of 120 psi. As can be resolved, the open diameter reduction would need to be approximately 1.976123 in. That is, when using the pressure of 120 psi the force applied to the piston will also be:

$$120 \text{ psi} \times (\pi \times [(10 \text{ in})^2 - (7.023877 \text{ in})^2]/4) = 4777 \text{ lbs.}$$

As can be seen, by decreasing the open inner diameter from 9.0 inches to approximately 7.0 inches (which increases the available piston surface area against which pressure driving force is applied), then the essentially same applied clutch engaging actuation force on the piston that was achieved in the high pressure (320 psi) example can also be achieved in the low pressure (120 psi) example.

In other scenarios a substantially same piston actuation force can be achieved through use of different pressures acting on different piston surface areas. For example, in respective high pressure and low pressure applications the applied forces may be:

$$320\ psi \times (\pi \times [(10.07\ in)^2 - (9.07\ in)^2]/4) = 4810\ lbs.$$

$$120\ psi \times (\pi \times [(10.07\ in)^2 - (7.47\ in)^2]/4) = 4298\ lbs.$$

As can be seen, the applied force for either pressure is within approximately 12% of the other. Thus, the pneumatically induced actuation force substantially corresponds to the hydraulically induced actuation force. The amount of differential pressure is acceptable due to variability of factors such as return spring compression force, seal drag, friction coefficient, etc. As a result, (for purposes of this description) substantially the same (equal) piston actuation force is achieved, even though the equality can include a difference in percentage (e.g., less than or equal to 15%). This substantially same actuation force enables the torque output to also be similarly rated the same, with minor adjustments to the safety factor due to the noted variables.

Operation of the same piston 466 in each of a high pressure environment and a low pressure environment will now be further described. For high pressure usage the intermediate seal 484 is present. High pressure (e.g., hydraulic fluid) enters through one or more inlet port 422. The high pressure is maintained in a cavity between the outer seal 482 and the intermediate seal 484. As shown in FIG. 27, located between the seals 482, 484 is both an annular outer surface area 494 and an annular intermediate surface area 496 of the piston 466. These radially extending surface areas 494, 496 are axially spaced from each other. The pressure that acts (in an axial direction) against these radial surface areas 494, 496 is the actuation force that functions to move the piston in its axial (driving) direction to engage the clutch. Of course pressure acting radially against the axially extending walls of the piston does not contribute to axial movement of the piston.

Upon actuation of the piston 466, the piston imparts axial movement to the pressure plate 418. The pressure plate moves against the force of the spring 424 (e.g., a coned-disc spring). Thus, the piston's axial movement causes the rotating separator discs 460 to respectively axially engage the adjacent friction discs 462. For example, one or more separator disc 460 can be alternating positioned between two friction discs 462. The discs 460, 462 get squeezed (compressed) together in sandwiched relation. This axial engagement causes the rotation of the separator discs 460 to be imparted to the friction discs 462. Thus, the friction discs 462 rotate in unison with the separator discs 460. The separator discs and the friction discs can be part of a replaceable disc pack.

Each friction disc 462 can include respective tabs which are fitted into and engage in corresponding respective slots of the drive cup 430. Thus, rotation of the friction discs 462 causes the drive cup 430 to also rotate. The drive cup 430 can be attached to a shaft. As a result, the shaft gets rotatably driven by the rotating drive cup. As can be appreciated, because of the specific arrangement of clutch elements, pressure can be applied to the piston 466 to cause rotation of an attached shaft.

For low pressure usage the intermediate seal 484 is absent. Low pressure (e.g., pneumatic fluid-air pressure) enters through the inlet port 422. With the absence of the intermediate seal 484 the inputted pressure can flow to (reach) the inner seal 486. Thus, the low pressure is maintained in a cavity that extends between the outer seal 482 and the inner seal 486.

As can be seen in FIG. 27, located between the seals 482, 486 is each of the annular outer surface area 494, the annular intermediate surface area 496, and an annular inner surface area 498. Each of the radially extending surface areas 494, 496, 498 is axially spaced from an immediately adjacent surface area. For example, the intermediate surface area 496 is axially spaced from both the outer surface area 494 and the inner surface area 498. The low pressure that acts in an axial direction against these radially extending surface areas 494, 496, 498 is the actuation force that operates to move the piston 466 in its axial (engaging) direction. As previously discussed, axial movement of the piston 466 causes engagement of the discs 460, 462, which in turn allows a shaft to be rotatably driven.

FIG. 31 shows an exemplary embodiment of a mechanical piston 470. The mechanical piston 470 includes a plurality of mechanical engagement members 468 (e.g., threaded screws or bolts). Seals 444 are also shown. The mechanical piston 470 can be used to manually actuate the fluid piston 466. Thus, the mechanical engagement screws 468 allow for mechanical locking of the (operating) clutch. For example, the loss of hydraulic or pneumatic pressure may cause the occurrence of an emergency situation, such as in a ship at sea. The mechanical piston 470, by allowing emergency clutch operation, may be used to take the ship home. Thus, the ability of the mechanical piston 470 allows the screws 468 to function as "take home" screws.

As can be seen, the screw 468 includes an angled (tapered) annular bottom portion 478. The screw's angle 478 substantially corresponds to (matches) an angled (tapered) outer surface portion 477 of the piston 466. The matched angles allow the screw 468 (during screw insertion) to engagingly push the piston 466 in its actuating axial direction. Thus, movement of the angled member 468 in the radial (inward) direction can impart abutting movement to the piston 466 in the axial direction. The members 468 are movable an ample distance which allows the moving piston to overcome the resistance of the spring 424, and thus cause engagement of the separator discs 460 and the friction discs 462.

The mechanical piston 470 can include a set (e.g., four) of the screws 468. The screws 468 can be substantially equally circumferentially spaced relative to each other around the clutch assembly 410. The screws are manually and/or tool accessible externally. During operation of the mechanical piston 470, each screw 468 is sequentially inserted (rotated) a substantially equal short distance. That is, a first screw is inserted a known small distance, then each of the other (second, third, and fourth) screws is in turn inserted the same distance. The insertion process is continued for another known small distance. The insertion process repetitively continues until all screws have been fully inserted the substantially same distance. The screws can remain in their fully inserted position in order to mechanically lock the clutch in its operating condition. As can be appreciated, the mechanical piston 470 acts as a backup piston, which is manually mechanically operated (without fluid pressure). After the mechanical piston 470 is no longer needed (e.g., usable fluid pressure for engaging the clutch is restored), then the screws 468 can be withdrawn (retracted) to allow normal operation of the fluid pressure activated piston 466.

FIG. 33 shows another embodiment of a clutch assembly arrangement 500. Many of the clutch assembly components have already been described with regard to FIG. 26. Thus, for the sake of clarity not all components of the clutch assembly 500 are shown or labeled. For even further simplicity, only portions of the clutch 500 that are located on one side of the center axis 504 are shown.

The shown portion of the clutch assembly 500 includes a piston 506, hub 508, input housing 510, output housing 512, washer 514, ball bearing 516, expansion plug 518, roller bearing 520, drive cup and/or shaft assembly 522, retaining rings 524, and a fluid pressure inlet opening 526.

As can be seen the piston 506 has a configuration which differs from the piston 466 configuration shown in FIG. 26. As previously discussed, the specific configuration (shape or contour) of the dual-actuation piston can vary in different embodiments.

The clutch assembly 500 also includes an outer seal 532, an intermediate seal 534, and an inner seal 536. In a manner previously discussed, the piston 506 can be used with different seal arrangements based on placement of the intermediate seal 534. That is, the piston 506 is convertible for usage in both high pressure and low pressure environments based on the presence/absence of the intermediate seal 534. The inner seal 536 is positioned in a flow passage at a location that is downstream from the intermediate seal 534. As a result, the intermediate seal recess (e.g., an annular groove) which can hold the intermediate seal 534 has to be vacant in order for the inner seal 536 to be exposed to the applied pressure.

The piston 506 includes an annular outer surface area 542, an annular intermediate surface area 544, and an annular inner surface area 546. Each surface area is axially spaced from an adjacent surface area. During high pressure operation the intermediate seal 534 is used. Thus, the high pressure acts axially against only the outer surface area 542. During low pressure operation the intermediate seal 534 is absent. Thus, the low pressure acts axially against each of the outer surface area 542, the intermediate surface area 544, and the annular inner surface area 546.

Again, the exemplary piston allows for its pressure-affected surface areas to be modified (increased or decreased) by its structural ability to be employed with different seal arrangements. Thus, the piston can be safely operated to receive substantially the same actuation force regardless of whether high or low pressure is being applied thereto. As can be appreciated, the exemplary pistons have an enhanced ability to be used with large differences in pressure (and different types of fluids).

FIG. 34 shows an angled exterior view of the clutch assembly 500, which includes a drive flange 548 and the axis 504.

FIG. 35 shows another exemplary embodiment of a mechanical piston 550. The mechanical piston 550 includes a plurality of piston engagement screws 552. Seals 554, 556 are also shown. Each respective screw 552 can be inserted into a respective threaded opening in housing structure. In a manner previously discussed, the mechanical piston 550 can be used to manually actuate the piston 506. Insertion of the engagement screws 552 can allow the clutch to be mechanically locked in its operating (engaged) condition, such as in an emergency situation in which fluid pressure is not available to drive the fluid piston 506.

FIGS. 36-39 are respectively directed to different piston/housing sealing relationships. For ease of understanding FIGS. 36-38 each only show clutch assembly portions. The other clutch assembly components are not shown, such as the discs, bearings, springs, etc. In comparison, a similar view of the piston/housing sealing relationship in FIG. 33 would only show a portion of its piston 506 and housing 512.

Figure 37:
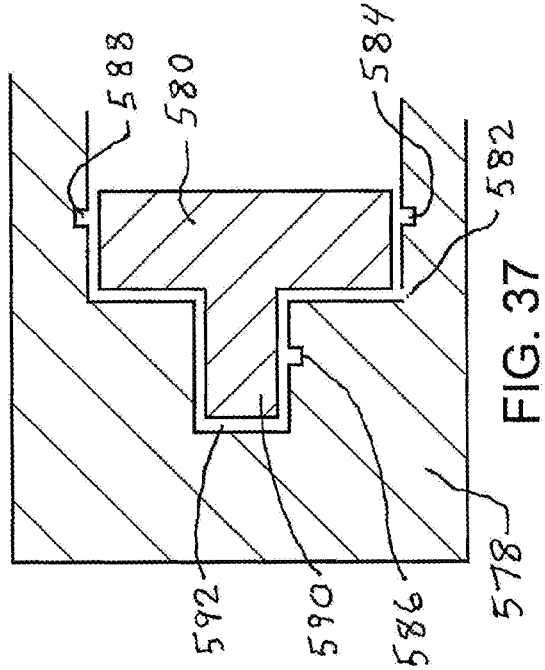
FIG. 37 shows another piston and housing sealing relationship for another exemplary clutch assembly arrangement.
Figure 36:
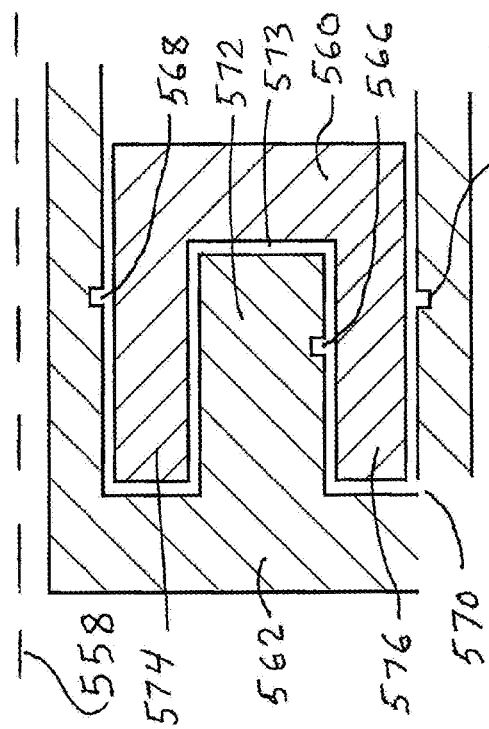
FIG. 36 shows a piston and housing sealing relationship for an exemplary clutch assembly arrangement.
Figure 38:
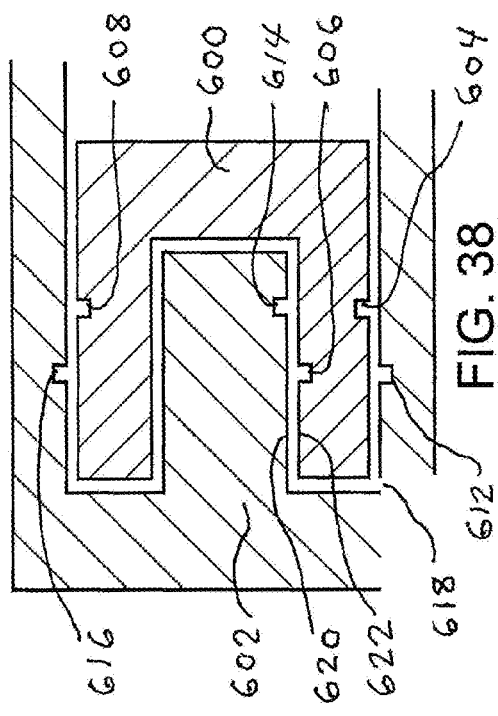
FIG. 38 shows a further piston and housing sealing relationship for a further exemplary clutch assembly arrangement.

Also, it should be understood that in each of FIGS. 36-38 only a portion (half) of the annular piston and cylinder are being shown. That is, the centerline of each clutch assembly is located above each respective assembly portion being shown (in FIGS. 36-38). As an illustrative example, FIG. 36 has been provided with the centerline (i.e., represented by dashed lines) of its clutch assembly. This centerline is merely representative of its positioning being relatively above the shown clutch assembly portion, and it is not necessarily drawn to scale with respect to the shown clutch assembly portion. The shown centerline location represented in FIG. 36 similarly applies to the (not shown) centerline locations for each of FIGS. 37-38.

Figure 39:
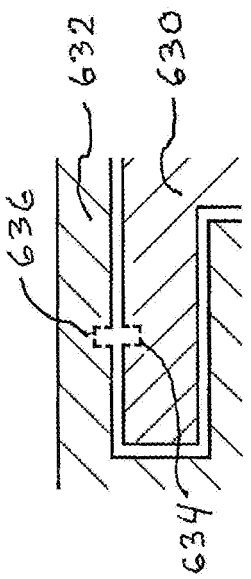
FIG. 39 shows a clutch assembly embodiment in which a needed sealing recess can be placed in either the piston body or the housing body.

The clutch assembly portion shown in FIG. 39 is even more narrowed (in comparison to FIGS. 36-38) to further ease understanding. In FIG. 39 the shown clutch assembly portion only includes a partial piston portion, a partial housing portion, and a sealing relationship that can occur between these adjacent partial portions. The location of the clutch assembly's centerline can be either above or below the partial portions shown in FIG. 39.

As previously noted, alternative exemplary embodiments of a clutch assembly can have the seal recesses (e.g., annular grooves) formed in the adjacent housing body instead of in the piston body. FIG. 36 and FIG. 37 each shows an example embodiment in which seal recesses are in the body of an adjacent housing but not in the piston. That is, the housing includes all of the seal recesses.

FIG. 36 shows a portion of an exemplary clutch assembly arrangement that includes a piston/housing sealing relationship. The arrangement includes a piston body 560 and a partial housing body 562. The housing body 562 includes annular seal recesses 564, 566, 568. Also shown are a pressure (inlet) port 570 and a representative centerline 558 of the clutch assembly.

FIG. 37 shows a portion of another exemplary clutch assembly arrangement. The arrangement includes a housing body portion 578, a piston body 580, and a pressure port 582. The housing body 578 includes annular seal recesses 584, 586, 588.

It should be understood that either the piston body or the housing body (against which the piston can slide in sealed relation) can have one or more members that project into the other body. FIG. 36 shows an example of the housing 562 including an annular (axially extending) projection 572 that is surrounded by adjacent annular legs 574, 576 of the U-shaped piston 560. The annular (male portion) projection 572 is configured to matingly fit into an annular recess portion 573 (female portion) of the piston. FIG. 37 shows an example of a piston 580 including an annular (axially extending) projection 590 that is configured to fit into an annular recess 592 (female portion) in the housing 578.

Also, a mixed combination sealing embodiment can include at least one seal recess in the piston body and at least one seal recess in the housing body. FIG. 38 shows another piston/housing sealing relationship for another exemplary clutch assembly arrangement. As can be seen, at least one seal recess is in each of the piston 600 and the housing 602. That is, both the piston 600 and the housing 602 each include one or more seal recesses. The piston 600 has seal recesses 604, 606, 608, whereas the housing 602 has seal recesses 612, 614, 616. A pressure fluid port 618 is also shown.

In FIG. 38 certain piston surfaces (which have a seal recess) respectively face adjacent housing surfaces (which also have a seal recess). For example, the piston surface 622 (which has the seal recess 606) faces the housing surface 620 (which has the seal recess 614). Each facing surface's seal recess is spaced (before piston actuation) a predetermined distance from the other facing surface's seal recess. Either one of or both of the facing seal recesses 606, 614 can be used to hold a seal during a piston actuation pressure application. Thus, the arrangement of seal recesses in FIG. 38 also allows for the use of double seals. FIG. 38 also provides an example in which all of the primary seal recesses 612, 606, 616 are axially and radially aligned with each other, and all of the secondary (backup) seal recesses 604, 614, 608 are also axially and radially aligned with each other. In the double seal pairing, each primary seal recess would hold the seal which is sequentially the first seal to be exposed to the pressure. In contrast, each secondary seal recess would hold the seal which would act as a backup to its corresponding primary seal.

FIG. 39 shows an example of a piston/housing relationship in which the predetermined sealing location for a possible seal recess is represented at the dashed outlines. In the example, the sealing requirement to be met is determined by the axial position of the seal. As a result, the needed sole seal recess (for the seal) can be formed in either the piston body 630 or the housing body 632. That is, in the example it does not matter whether the needed seal recess is formed in the piston or in the housing. Thus, from the two oppositely facing outlines of potential seal recesses 634, 636, one of the outlines can be selected from which the needed single seal recess can be formed.

FIGS. 49-52 show an alternative embodiment of a clutch generally indicated 640 which can be actuated using either hydraulic pressure or pneumatic (air) pressure. The exemplary clutch 640 includes a hydraulic inlet port 642 and a pneumatic inlet port 644. Each of the inlet ports 642 and 644 are configured to be respectively connected to a source of fluid pressure. In the case of port 642, the port is configured to be connected to a source of hydraulic fluid that can be delivered at elevated pressure. Generally for actuation purposes, the hydraulic fluid will be at a static pressure of about 320 psi. Of course in other arrangements other pressure ranges may be used. The pneumatic inlet port 644 of the exemplary embodiment is configured to be connected to a source of pneumatic fluid specifically compressed air at a static pressure of approximately 120 psi. Of course in other arrangements other pressure ranges may be used. It should be understood that although in the exemplary arrangement only one hydraulic inlet and one pneumatic inlet are shown, in other arrangements multiple hydraulic inlet ports and pneumatic inlet ports may be utilized. Further it should be understood that although in FIG. 49 both of the hydraulic and pneumatic inlet ports are shown as open, in actual operation the port that is not connected to a source of fluid pressure will generally be blocked or may have an air permeable screen or other similar breather type device therein or connected thereto so as to enable the port to be connected to atmosphere and prevent contaminants from entering the clutch while not restricting piston movement.

Figure 50:
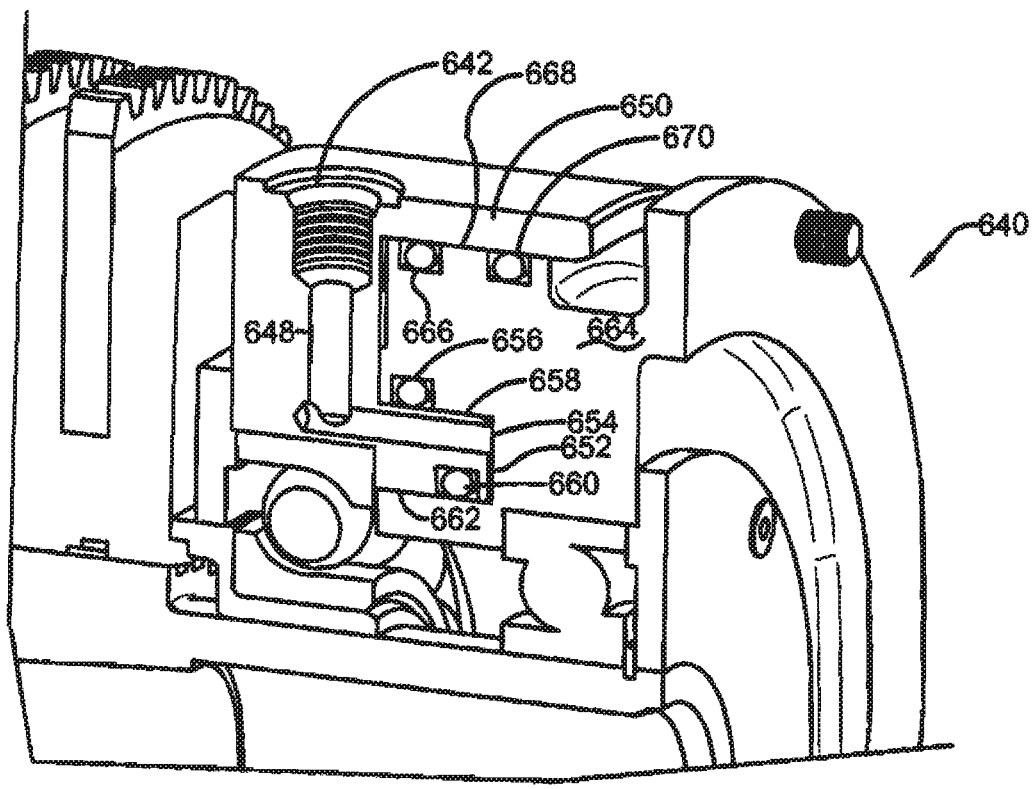
FIG. 50 is a partial cross-section isometric view of a quadrant of the exemplary clutch shown in FIG. 49 including a cutaway view of the hydraulic inlet port and first piston cavity to which hydraulic pressure may be applied.
Figure 51:
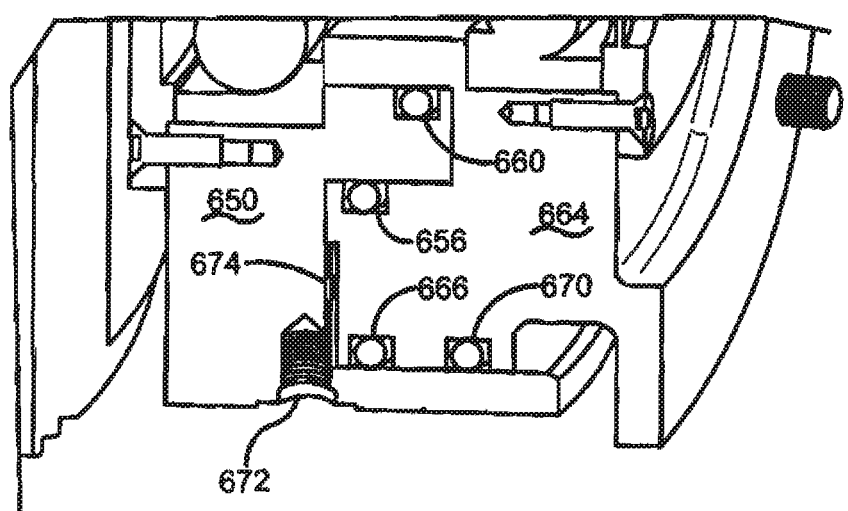
FIG. 51 is a partial cross-sectional view of a quadrant of the clutch shown in FIG. 50 including a hydraulic drain port usable to enable hydraulic fluid to escape from the outer cavity.

FIGS. 50 and 51 show features of the exemplary clutch 640 that are utilized when the clutch is hydraulically actuated. A fluid passage 648 extends in housing 650 and is in fluid communication with fluid inlet 642. Fluid passage 648 terminates at a generally annular inner cavity 652. Inner cavity 652 is bounded by the housing and a piston 664. Inner cavity 652 is generally annular in shape and includes a generally radially extending piston surface area 654. It should be understood that while in this exemplary embodiment piston surface area 654 is a single continuous surface that is radially extending along its entire length, in other exemplary arrangements the generally radially extending piston surface may have only portions thereof that are extending in the radial direction, and may include other portions that extend axially or in other directions. Of course as can be appreciated, radially extending portions of the piston surface area are acted against in the axial direction by the pressure of the hydraulic fluid in the inner cavity. Herein the axial direction refers to directions parallel to the central rotational axis of the clutch.

In the exemplary arrangement the inner cavity 652 is bounded by an annular intermediate resilient seal 656 which is positioned in a corresponding intermediate seal recess in the piston. Intermediate seal 656 provides a generally fluid tight axially movable engagement between the piston and the adjacent axially extending annular surface 658 of the housing. An annular inner resilient seal 660 extends in a corresponding recess of the housing. Inner seal 660 bounds the cavity and provides a movable generally tight fluid seal with an axially extending annular surface 662 of the piston. It should be understood that while in the exemplary embodiment a single seal is shown bounding the inner and outer area of the cavity, in other embodiments multiple seals may be used instead of a single seal.

Hydraulic fluid pressure applied to inlet port 642 acts against piston 664. The inner cavity 652 axially expands as the piston moves in the axial direction to the right as shown. Movement of the piston compresses the clutch and separator discs in a manner previously discussed so as to engage the driving and driven members of the clutch. Relieving the fluid pressure from port 642 through valving or other suitable arrangements enables the springs to separate the clutch and separator discs. The hydraulic fluid flows out of the inner cavity 652 and the clutch is again disengaged.

It should be understood that while the exemplary embodiments have been discussed as a clutch engaging and releasing driving and driven members, in other arrangements the clutch arrangement may be used as a brake in some applications. In such configurations engagement of the clutch causes a moving member to be engaged with a stationary structure so as to stop the moving member. Of course clutches of exemplary embodiments may also be used in other types of power transmission and management applications.

In the exemplary arrangement shown in FIGS. 50 and 51, the piston 664 has in engagement therewith an outer seal 666. Outer seal 666 is a generally annular seal that is positioned in a corresponding recess in the piston. Seal 666 bounds the outer cavity and provides generally fluid tight axially movable engagement with an axially extending annular surface 668 of housing 650. While a single seal is shown it should be understood that multiple seals may be used. The exemplary clutch arrangement further includes a resilient wiper seal 670. Wiper seal 670 is positioned in a corresponding recess in the piston 664. Wiper seal 670 of the exemplary arrangement is movable in generally fluid tight engagement with annular surface 668. Wiper seal 670 is positioned intermediate of the outer seal and the exterior of the clutch and operates to minimize the infiltration of dirt and other contaminants into the interior of the clutch and prevents such contaminants from reaching the outer seal 666. While one wiper seal is shown, in other embodiments multiple wiper seals may be used.

As shown in FIG. 51, when clutch 640 is actuated using hydraulic pressure, there may be some leakage of hydraulic fluid radially outward past intermediate seal 656. A drain port 672 is provided in exemplary housing 650 to collect and enable such hydraulic fluid to be captured and conducted away from the clutch.

As shown in FIG. 51, the drain port of the exemplary arrangement is in fluid connection with the annular outer cavity 674 that extends between the intermediate seal 656 and the outer seal 666. Drain port 672 is configured for attachment to a fitting or other appropriate coupling so that hydraulic fluid which moves past the seal 656 and into the outer cavity 674, is drained from the clutch through the drain port 672. Further as previously mentioned, in some exemplary arrangements when the clutch is actuated hydraulically, the pneumatic inlet port 644 is vented to atmosphere. This enables the drain port to drain via gravity. Alternatively in some exemplary arrangements where the drain port is at atmospheric pressure or a substantially lower pressure than hydraulic actuation pressure, the pneumatic inlet port 644 can be closed with a plug or similar member and axial movement of the piston 664 is not restricted by fluid pressure within the outer cavity 674.

Figure 52:
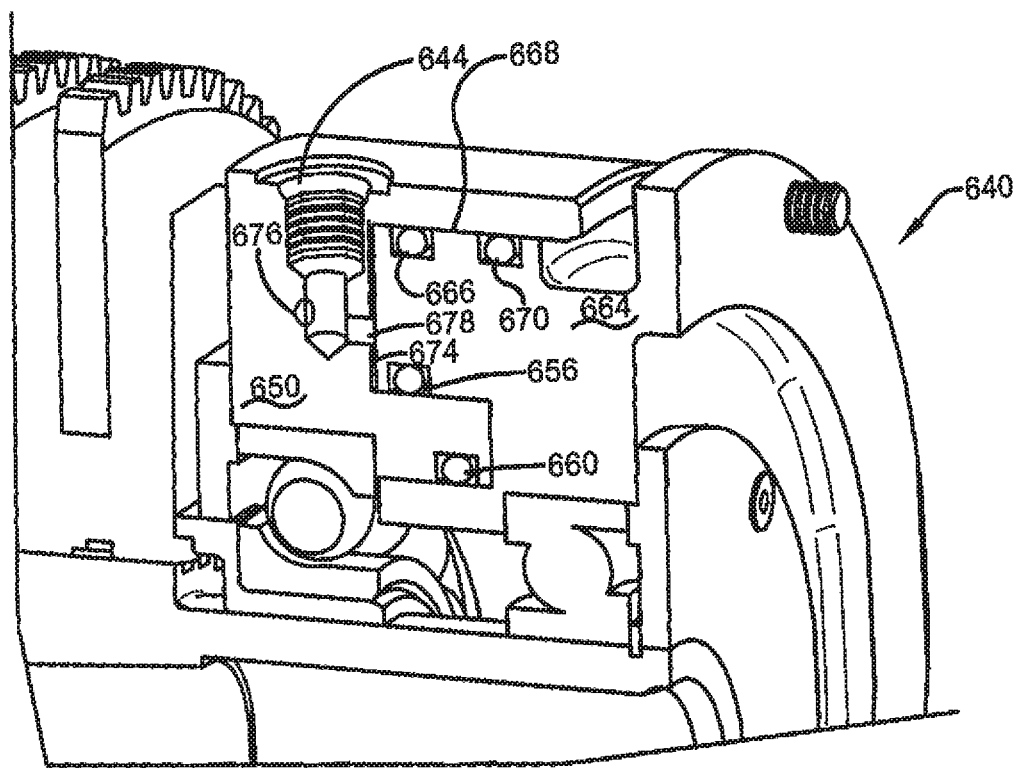
FIG. 52 is a cross-sectional view of the clutch similar to FIG. 51 showing the pneumatic inlet port and the outer cavity that operates to cause movement of the piston in response to pneumatic pressure.

FIG. 52 shows the exemplary clutch 640 and represents the operation of the clutch in response to pneumatic pressure applied through inlet port 644. Inlet port 644 is in fluid communication with a fluid passage 676 that extends in housing 650. Fluid passage 676 is in fluid communication with outer cavity 674. Outer cavity 674 is bounded by a generally radially extending surface area 678 of the piston 664. In this exemplary configuration the drain port 672 is plugged or otherwise closed so that fluid pressure can be held in the outer cavity 674.

In this exemplary arrangement fluid pressure in the form of compressed air is selectively applied to pneumatic inlet port 644. The application of the fluid pressure to inlet port 644 causes the fluid pressure to increase in the annular outer cavity 674. The pressure acts between outer seal 666 and intermediate seal 656. Generally the pneumatic pressure will be at a pressure of approximately 120 psi. Of course other pressure ranges may be used. The fluid pressure acting in the outer annular cavity causes the piston 664 to be moved to the right as shown. This causes the clutch discs and separator discs to be compressed so as to engage the clutch or brake as the case may be. Relieving the fluid pressure from inlet port 644 through operation of a suitable valve or other pneumatic circuitry causes the pressure in the outer cavity to be released enabling the clutch and separator discs to move apart and so as to disengage the clutch or brake.

As in the prior described arrangements, the generally radially extending surface area of the piston bounding the outer cavity is generally sized so that when the standard level of pneumatic pressure is applied to the outer cavity, the level of compression force exerted on the piston and causing it to move is substantially the same as when the hydraulic pressure at the higher standard pressure (approximately 320 psi) acts against the generally radially extending piston surface of the inner cavity. As a result the exemplary clutch (or brake) arrangement is enabled to operate effectively using either hydraulic or pneumatic pressure. Of course it should be understood that this arrangement is exemplary and in other arrangements, other configurations may be used.

As can be appreciated in the exemplary arrangement of clutch 640 actuation at even lower fluid pressures than normal pneumatic pressure can be achieved by removing seal 656. This results in the pressure applied through either fluid port (while the other is plugged) to act against an even larger radially extending surface area. The larger area decreases the pressure level needed to compress the discs in the disc pack and actuate the clutch. Alternatively the increased piston area may be used to achieve greater axial compressive force on the discs in a disc pack to enable the clutch to transmit greater torque through disc engagement with reduced slippage.

Some exemplary embodiments may utilize features like those described in U.S. patent application Ser. No. 14/731,520 filed Jun. 5, 2015 the disclosure of which is incorporated herein by reference in its entirety.

Further it should be understood that while in some exemplary embodiments the cavity in which hydraulic fluid pressure is applied to actuate and engage the clutch is positioned radially inward of the cavity in which pneumatic pressure is applied to engage the clutch, in some arrangements this configuration may be reversed, such that the cavity for hydraulic fluid pressure is radially outward of the pneumatic pressure cavity. Further, while the exemplary embodiment is described as being used in systems where only one of either hydraulic fluid pressure or pneumatic fluid pressure is applied and released to engage and disengage the clutch, in some systems both types of fluid pressure might be used. For example, in some systems pneumatic pressure might be used in conditions when it is desired to have a controlled relatively slow clutch engagement, disengagement or slipping, while hydraulic fluid pressure is sued in other conditions such as when solid rapid engagement of the clutch is desired. Also in some situations both hydraulic and pneumatic pressure may be applied concurrently to more uniformly or forcefully compress the clutch discs to assure solid clutch engagement. Of course these described approaches are exemplary of approaches that may be used.

As previously discussed with regard to some clutch embodiments, fluid pressure can be provided through one or more ports 422, 570, 582, 618, 642, 644 to engage a clutch to create an actuation force that axially moves a piston body 466, 506, 560, 580, 600, 630, 664 and compress the clutch discs. In some situations an opening of a pressure inlet valve can result in the internal cylinder of the clutch too quickly receiving a high pressure level. Such scenario can cause the piston to move so quickly and forcefully so as to cause a hard start (shock) clutch engagement, which can be damaging to clutch components or operatively connected structures.

Figure 40:
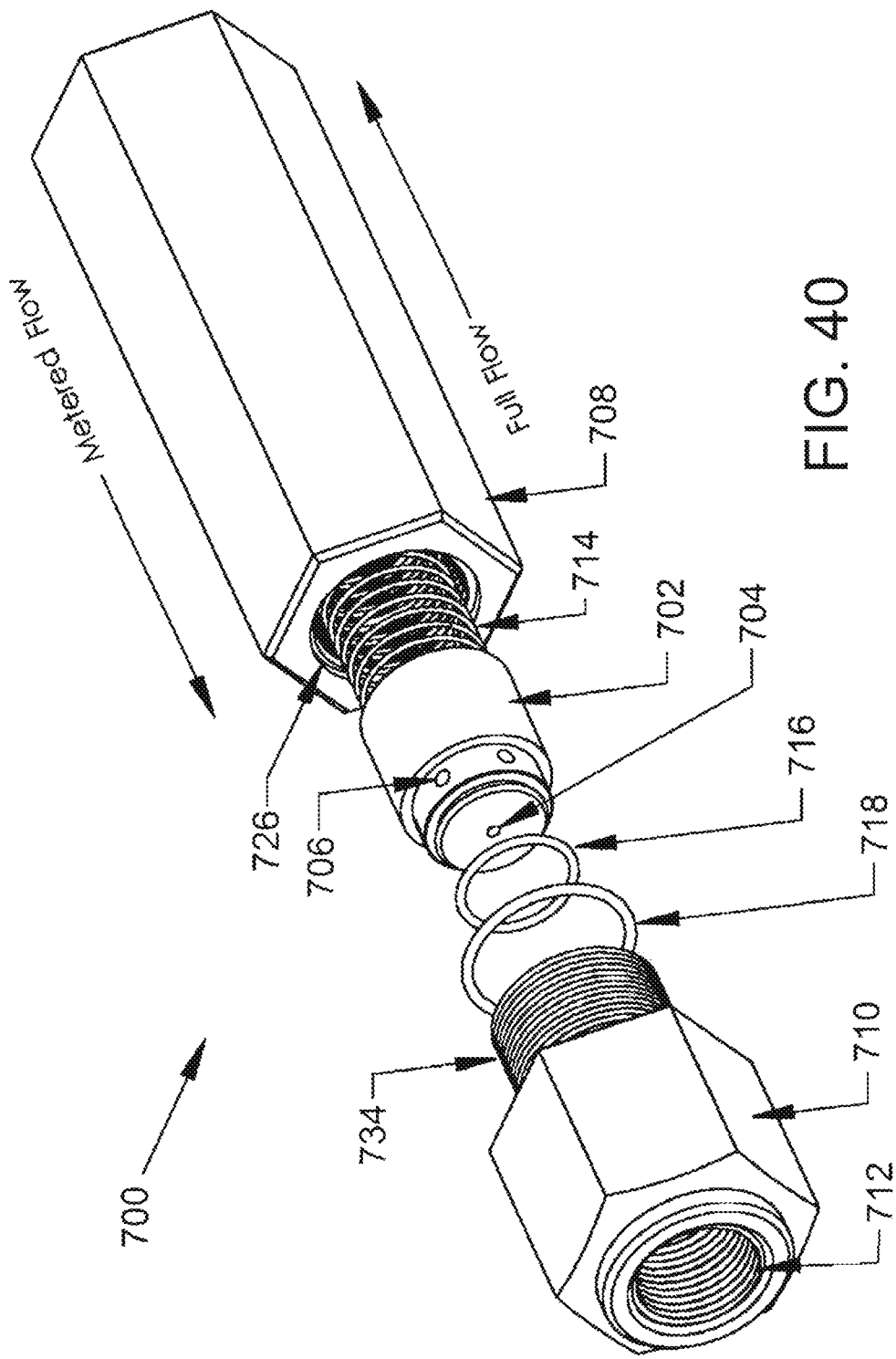
FIG. 40 shows components of an exemplary flow control valve assembly.

FIG. 40 shows an exemplary flow control valve assembly 700 which allows a soft start clutch engagement to be achieved. The flow control valve assembly 700 is operable to regulate rate of pressure increase through a pressure port of a PTO clutch or other clutch or brake arrangement.

In an exemplary embodiment, the flow control valve assembly 700 comprises a poppet style, tamper proof, fixed orifice, flow control valve. FIG. 40 shows individual valve components, with the valve in an unassembled condition. FIG. 41 shows the exemplary flow control valve 700 in an assembled condition. FIG. 42 shows an end view of the flow control valve 700. FIG. 41 is a cross section view taken along section A-A in FIG. 42.

The exemplary flow control valve 700 includes a poppet cartridge 702. For ease of understanding, FIG. 43 shows an enlarged view of the poppet cartridge 702. The poppet cartridge 702 includes an (axial) orifice 704 and (radial) outlet openings 706. The pressure-relief outlet openings (apertures) 706 allow full flow in the exhaust (outlet) direction, as indicated by the Full Flow arrow in FIG. 40. However, the (inlet) orifice 704 is configured to meter (regulate) flow therethrough in an opposite (inlet) direction, as indicated by the Metered Flow arrow in FIG. 40. Thus, the rate of pressure increase through the exemplary flow valve 700 can be controlled (e.g., slowed). As a result, a longer period of time is needed before the clutch is subject to full pressure. As can be appreciated, the exemplary flow control valve 700 prevents hard starting clutch engagement, resulting rapid wear which can lead to premature clutch failure.

Although a single orifice 704 (or axial opening) is discussed herein in some embodiments, it should be understood that it is the planar area of the opening 704 that dictates amount of flow therethrough. Thus, instead of a single large (diameter) orifice several smaller (diameter) orifices may be used, where the combined areas of the smaller orifices equate to the single large orifice's area.

Different sized poppet cartridges 702 can be used in the exemplary flow control valve 700. Each respective particular sized poppet cartridge 702 can be factory preset to allow a respective particular predetermined flow control. The exemplary poppet cartridges 702 are easily interchangeable (and replaceable) for use in the same flow control valve 700. For example, one poppet cartridge may be used for pneumatic actuation of the clutch, whereas another sized poppet cartridge is used for liquid actuation. As discussed in more detail later, the ability to provide different predetermined flow controls allows proper engagement for various clutch models to be achieved, and the life of a clutch to be extended.

The orifice 704 can be created by being factory drilled directly in the structure of the poppet cartridge 702, which results in a fixed orifice of a predetermined dimension (and a predetermined flow control ability). As can be appreciated, because the orifice 704 of a poppet cartridge 702 is structurally fixed (and manually unchangeable) it is essentially tamper proof. This tamper proof feature can remove need of a hand-adjustable flow control valve. Hence, the exemplary flow control valve 700 allows for the elimination of an operator negatively acting (through improper manual control of flow through a valve) in a manner that would cause premature wear on clutch components.

As can be seen in FIGS. 40-43, the components of the exemplary valve assembly include the poppet cartridge 702, a valve body 708, an end cap 710 with inner threads 712, a coil spring 714, an O-ring 716, and a gasket 718. The valve body 708 can comprise various forms of outer surface, including a hexagonal configuration. The valve body 708 also includes an interior body cavity 720, which has a cavity outer diameter. The body cavity 720 includes a first cavity portion 722 that is bound by a threaded cylindrical inner surface portion, which includes valve body threads 726. The body cavity 720 also includes a spring stop wall portion 728 and at least one other (intermediate) cavity portion that is bound by a non threaded cylindrical inner surface portion 730.

The end cap 710 can also comprise various forms of outer surface, including a hexagonal configuration. As seen in FIG. 41, when in an assembled state the end cap's (hexagonal) outer surface substantially matches the contour of the valve body's (hexagonal) outer surface. The end cap 710 also includes a threaded cylindrical outer surface. This threaded surface has outer threads 734 that are configured for mating engagement with the valve body threads 726. The end cap 710 further includes an interior end cap cavity 740. The spring 714 has an outer diameter that is less than the inner diameter of the body cavity 720.

In an exemplary embodiment each replaceable (or disposable) poppet cartridge member 702 is a one-piece configuration. The poppet cartridge 702 includes a center axis that extends in an axial direction. As can be seen in FIG. 40 and FIG. 43, the poppet cartridge 702 also includes stepped cylindrical outer surfaces 742, 744, 746. These outer surfaces include annular steps which comprise at least a first step 742, a second step 744, a third step 746. The first step 742 has a first diameter and extends in the axial direction a first distance. The outer surface of the first step 742 may have an annular recess 756 configured for holding the O-ring 716 therein.

The second step 744 is located adjacent the first step 742. The second step 744 has a second diameter and extends in the axial direction a second distance. The second diameter is greater than the first diameter, and the second distance is greater than the first distance. The second step 744 includes the circumferentially-spaced outlet openings 706 extending therethrough in a radial direction, which allow exhaust (relief) of pressure from the clutch. A first annular wall portion 736 radially extends between the second step 744 and the first step 742. The exhaust flow can be part of a normal clutch cycle that includes disc engagement and disengagement.

A third step 746 is located adjacent the second step 744. The third step 746 has a third diameter and extends in the axial direction a third distance. The third diameter is greater than the second diameter, and the third distance is greater than the second distance. The third diameter is less than the cavity inner diameter. A second annular wall portion 738 radially extends between the third step 746 and the second step 744.

The third step 746 also includes an open end 748 and an inner wall portion 752. An interior area extends in the axial direction between the open end 748 and the inner wall portion 752. The interior area has an area outer diameter that is greater than the spring outer diameter. The opposite ends of the spring 714 can respectively abut against the stop wall portion 728 and the inner wall portion 752.

The poppet cartridge 702 includes a generally planar circular end face 750. The end face 750 radially extends substantially perpendicular to the axial direction. The end face 750 comprises a (front) face diameter that substantially corresponds to the first diameter. The end face has an axial thickness which results in a back (opposite) side 754. The end face includes the pre-sized orifice 704 extending therethrough in the axial direction. The inlet orifice 704 has a predetermined inlet orifice diameter, and can be substantially aligned with the center axis. The inlet orifice diameter is configured to control rate of pressure increase that can be received by the end cap cavity 740.

The O-ring 716 includes a ring inner diameter which is less than the second diameter. The ring inner diameter is sized to allow the O-ring 716 to be slid over the first diameter and into the annular recess 756 (or seal seat). The O-ring 716 is sized to surround the first step 742 in sealing engagement with the first annular wall portion 736. Other embodiments may not include an annular recess seat for the O-ring. In such embodiments the O-ring can be slid on the first step 742 until it abuts against the first annular wall portion 736.

The gasket 718 includes a gasket inner diameter that allows the gasket to be slipped over the end cap threads 734. The gasket 718 can provide a sealing engagement between the end cap 710 and the valve body 708. Also, it should be understood that more than one gasket and more than one O-ring can be used. Other types of sealing elements may also be used.

As can be seen from FIG. 41, when the exemplary flow control valve 700 is in an assembled (and operative) condition then the poppet cartridge 702 is located inside the body cavity 720. The interior area of the cartridge 702 is in fluid communication with the body cavity 720. The outlet apertures 706 are in fluid communication with the interior area of the cartridge. The spring 714 is located inside the body cavity 720 between the spring stop wall portion 728 and the cartridge's inner wall portion 752. Thus, the spring 714 is positioned to be compressed by axial movement of the poppet member 702 toward the spring. The end cap threads 734 are in mating engagement with the valve body threads 726.

Furthermore in the assembled condition, the orifice 704 allows two-way flow of fluid between the body cavity 720 and the end cap cavity 740. The orifice's diametrical area is configured to control the rate of pressure increase that can be received by the end cap cavity 740. The gasket 718 is operatively positioned to provide a sealing engagement between the valve body 708 and the end cap 710. The O-ring 716 is operatively positioned to provide a sealing engagement between the end cap 710 and the poppet cartridge 702. The outlet apertures 706 are (initially) blocked from fluidly communicating with the end cap cavity 740. During fluid flow into the cavity 740 of the end cap 710, the biasing force provided by the spring 714 is sufficient to maintain the seal created at the O-ring 716, which causes the outlet apertures 706 to be kept out of fluid communication with the end cap cavity 740.

FIG. 44 shows an example of fluid flow into the end cap cavity 740 during a pressure increase operation. For ease of understanding, only a portion of the flow control valve is shown. As can be seen by the fluid path represented by flow arrows in FIG. 44, fluid can pass through the body cavity 720, through the orifice 704, and into the end cap cavity 740. The valve assembly 700 is configured such that inward flow of fluid has to pass through the orifice 704 before it can enter the end cap cavity 740. That is, all fluid that enters into the end cap cavity 740 comes through the orifice 704. Inwardly directed pressure allows some fluid to exit the radial apertures 706 and then act against the second annular wall portion 738. However, this backside portion has less surface area than the backside of the end face 750. Thus, inlet pressure is unable to undo the sealing engagement.

FIG. 45 shows an example of fluid flow out of the end cap cavity 740 during a pressure decrease (release) operation. Only a portion of the flow control valve is shown. The exemplary flow control valve assembly 700 allows for full flow rapid-release of (exhaust) pressure therethrough. That is, in contrast to the slow flow of fluid that is allowed in the inlet direction by the flow-restricting orifice 704, volume flow in the opposite (outlet) direction can be considered relatively fast.

In operation, the end face 750 of the poppet cartridge 702 is subject to the pressure built up in the end cap cavity 740. The spring 714 is configured to be compressed at a predetermined force. Thus, when the end cap cavity 740 obtains a predetermined high pressure level which corresponds to the predetermined force necessary to compress the spring 714, then the valve assembly 700 allows the spring 714 to begin being compressed. That is, when a set pressure is reached in the end cap cavity 740 then the force of this pressure is sufficient to axially move (push) the poppet cartridge 702 against the spring 714, which in turn causes the spring 714 to be compressed.

Figure 46:
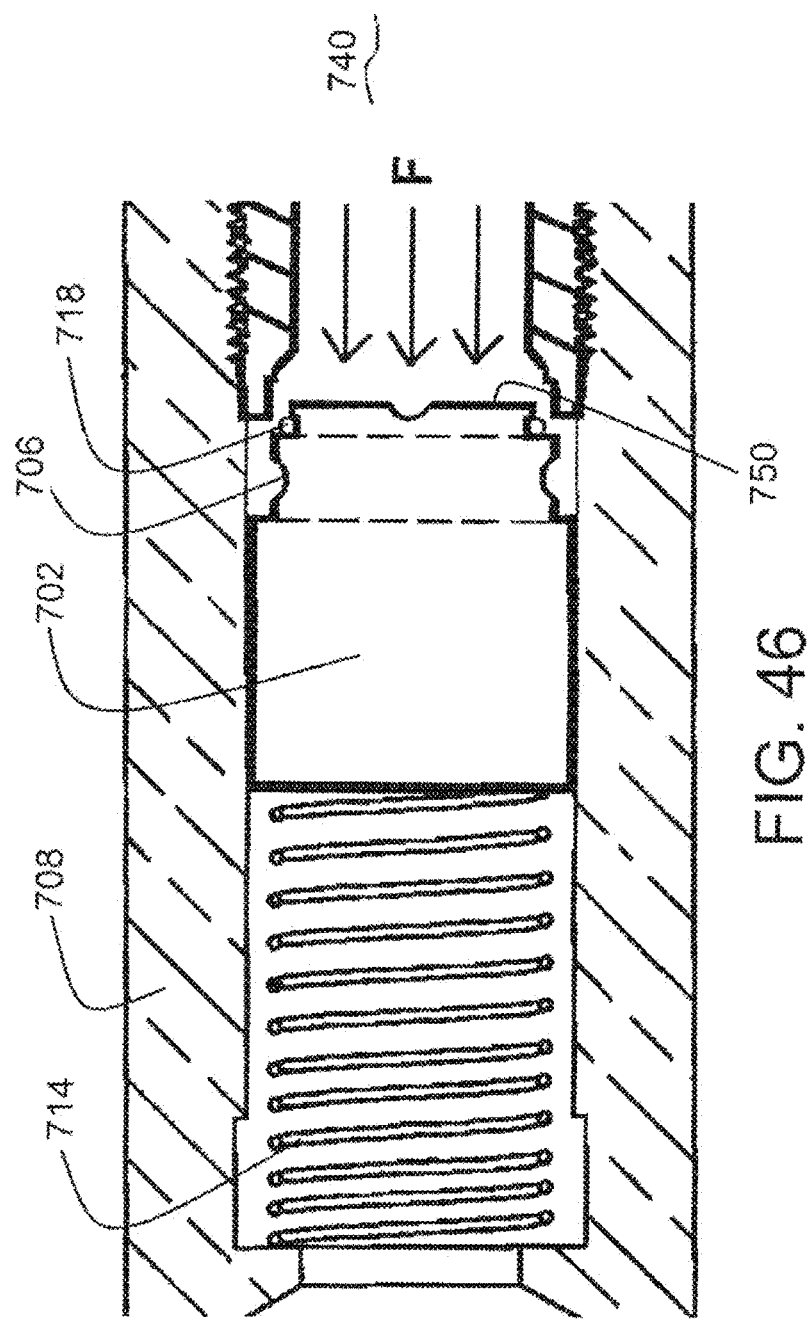
FIG. 46 shows a pressure force moving the poppet cartridge to compress the spring.

Furthermore, the poppet cartridge 702 being pushed to an open position causes the O-ring sealing engagement between the end cap 710 and the cartridge 702 to be broken. The removal of this sealing engagement then places the outlet openings 706 in fluid communication with the end cap cavity 740. As a result, high pressure fluid from the end cap cavity 740 is now allowed to freely flow into the body cavity 720 through the (pressure relief) outlet apertures 706. As can be generally seen by the fluid path represented by flow arrows in FIG. 45, fluid can exit outside of the O-ring 716, pass through the radial apertures 706, and into the body cavity 720. Fluid can also take a flow path directly through the orifice 704 to enter the body cavity 720. FIG. 46 shows a representative example of sufficient pressure in the end cap cavity 740 creating a force (F) against the cartridge end face 750 which causes opening movement of the cartridge 702.

The area size of the orifice 704 does not prevent the build up of pressure in the end cap cavity 740. Thus, the flow control valve assembly 700 provides for a tamper proof safe inlet flow operation without interfering with the ability of rapid exhaust outlet flow operation.

The predetermined high pressure level in the end cap cavity 740 may be obtained during normal operation of a clutch. For example, high pressure can be intentionally created by movement of one or more components of the clutch. The high pressure being relieved can be the exhaust from a clutch operation. However, the exemplary flow control valve assembly 700 is configured to also allow relief of pressure during an (unintended) over pressure condition in the end cap cavity 740. Thus, the exemplary valve assembly 700 is also a (over pressure) safety check valve.

Figure 47:
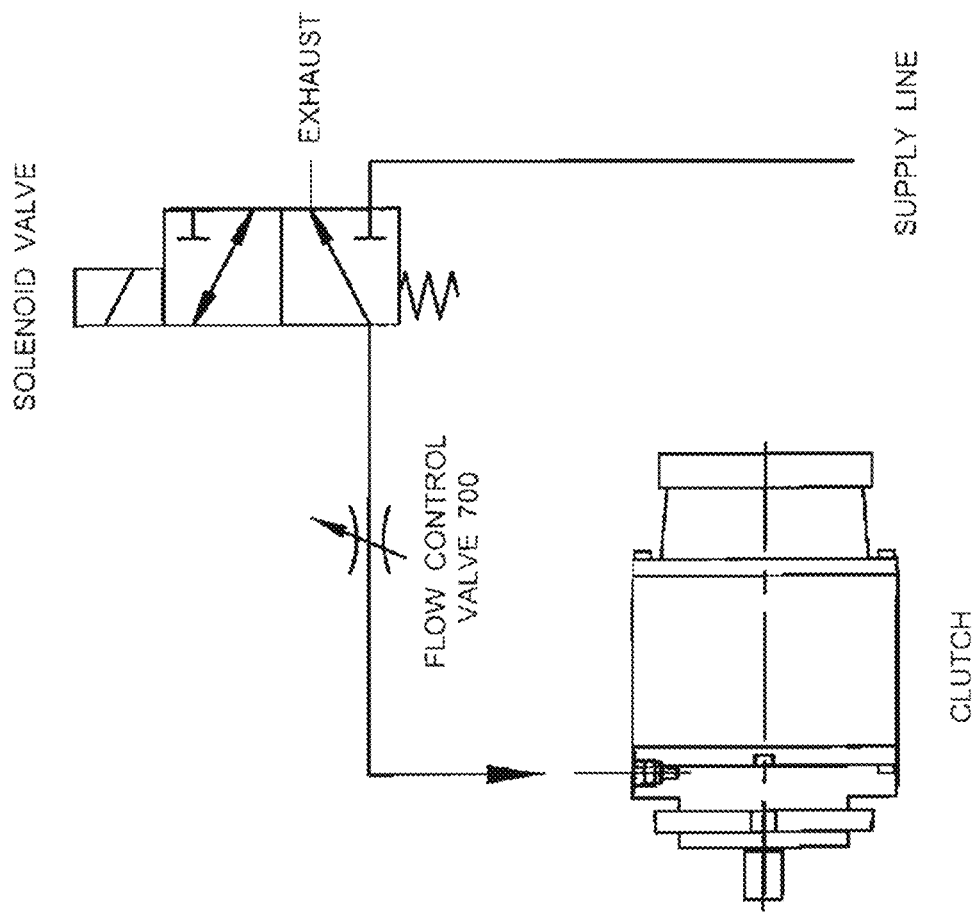
FIG. 47 shows the flow control valve positioned in a flow line connected to a clutch.
Figure 49:
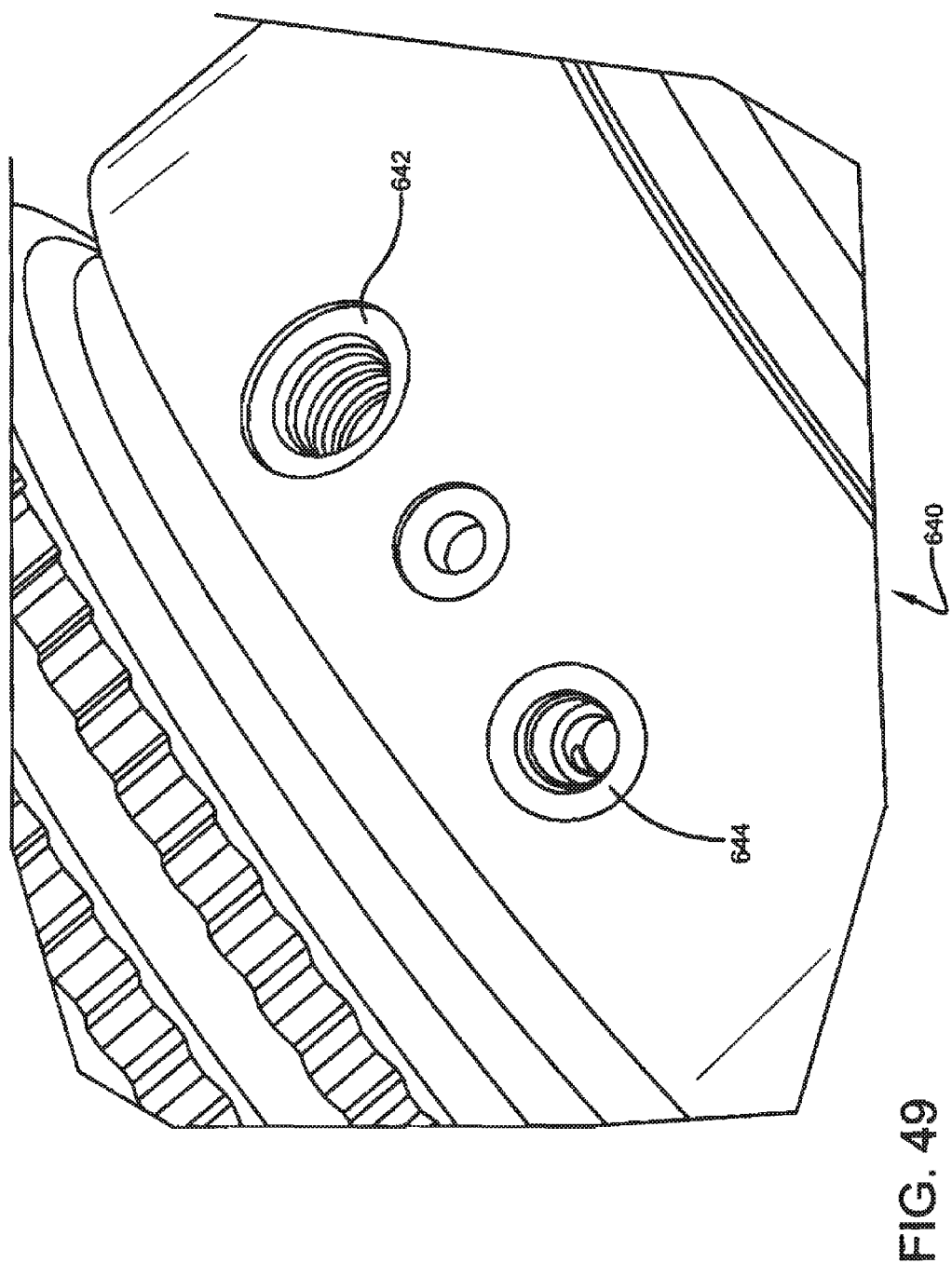
FIG. 49 is a partial top view showing an alternative arrangement of a clutch which includes both a hydraulic inlet port and a pneumatic inlet port.

FIG. 47 shows an example schematic layout of a clutch actuation arrangement in which the exemplary flow control valve assembly 700 may be used. As can be seen in the example, pressurized fluid from a pressure source supply line can flow through a solenoid valve, then through the flow control valve assembly, and then into the clutch. Other components may be installed in operative connection with the flow path. For example, a low pressure switch can be used to ensure a minimum pressure level is available prior to clutch operation. The low pressure switch may be located upstream of the solenoid valve. An example solenoid valve can be a 3-way, 2-position solenoid valve. An example pressure source can provide 120, 200, and 320 psi.

Different schematics can comprise different flow path arrangements and components, especially for different pneumatic and hydraulic operations. However, the exemplary flow control valve assembly 700 can be used in each of the different schematics, where the appropriate poppet cartridge 702 is easily installed to meet the appropriate flow situation. That is, the exemplary cartridges 702 are configured to meet a plurality of different flow control situations, based on the pressure level is being used and whether the fluid is pneumatic or hydraulic.

An exemplary flow control kit includes (along with the valve assembly 700) an assorted arrangement of plural poppet cartridges 702, where each cartridge has a differently sized flow orifice 704. Each respective cartridge 702 can also have distinguishing visual identification markings which correspond to the appropriate usage for that respective cartridge 702. For example, each cartridge 702 can be identified for designated usage in either pneumatic or hydraulic flow. Each cartridge 702 can also be labeled to indicate its usage within a specified pressure range based on whether the pressure source is air or liquid.

Figure 48:
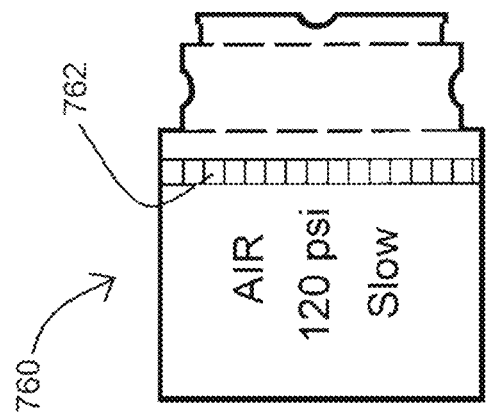
FIG. 48 shows a poppet cartridge with markings that identify the fluid type and pressure level conditions for which the cartridge is intended to be used.

A cartridge 702 (whether designated for pneumatic or liquid usage) can also be color coded to represent low, medium, and high flow rates. For example, the color red may be used to indicate that the specific cartridge 702 has an orifice 704 that is sized for slow flow. Similarly, yellow may be used to indicate a mid flow rate, whereas green indicates a fast flow rate. FIG. 48 shows an example of a replacement poppet cartridge 760 that is marked for pneumatic usage at 120 psi. The cartridge 760 also includes a red color 762 (e.g., a circular band) to indicate a low flow rate. The band can be engraved into, printed on, or adhesively fixed to the cartridge. For a disposable cartridge the identifying data may be provided on a removable peel-off label.

A poppet cartridge may also have a same marking (identifier) that matches a marking on a pressure source container (or a valve thereof). The number of different sized poppet cartridges 702 that can be used as part of the same flow control valve assembly 700 creates an ability to correctly match a clutch to different (available) pressure flow situations. As can be appreciated, the novel ability to use a particular orifice cartridges that is pre-configured (or assigned) for a particular fluid type/pressure level environment allows for enhanced clutch operation and safety.

Thus, the apparatus of the exemplary embodiments achieves at least one of the above stated objectives, eliminates difficulties encountered in the use of prior devices and systems, solves problems, and attains the desirable results described herein.

In the foregoing description, certain terms have been used to describe embodiments for purposes of brevity, clarity, and understanding. For example, certain terms like "left", "right", "outer", "inner", "front", "rear", "up", "down", "top", and "bottom" may have been used. However, no unnecessary limitations are to be implied therefrom because such terms are for descriptive purposes and are intended to be broadly construed. The terms are not to be construed as limitations on the scope of the described embodiments or the principles described. Moreover, the descriptions and illustrations herein are by way of examples and the inventive aspects are not limited to the details shown and described.

It will be readily understood that the features of exemplary embodiments, as generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, as represented in the attached Figures, is not intended to limit the scope of the invention as claimed, but is merely representative of selected exemplary embodiments that implement the principles described herein.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the exemplary embodiments, the manner in which each is constructed and operated and the advantages and useful results attained, the new and useful structures, devices, elements, arrangements, parts, combinations, systems, equipment, operations, methods, processes, and relationships are set forth in the appended claims.

We claim:

1. An apparatus comprising:
   a clutch,
      wherein the clutch includes a housing,
         wherein the housing includes at least two fluid inlet ports, including
            at least one first fluid inlet port configured to receive hydraulic fluid, and
            at least one second fluid inlet port configured to receive pneumatic fluid,
      wherein the clutch includes a plurality of discs that are rotatable about an axis,
         wherein the discs include at least one separator disc and at least one friction disc,
      wherein the clutch includes a fluid pressure movable piston, wherein the piston is movably mounted in operative connection with the housing,
      wherein the piston and housing are in operative connection with a plurality of annular resilient seals,
         wherein the plurality of annular seals include at least one radially outer seal, at least one radially intermediate seal and at least one radially inner seal,
      wherein the piston, housing and plurality of annular seals bound a plurality of generally radially extending axially expandable piston cavities, including
         a generally annular outer piston cavity and a generally annular inner piston cavity,
            wherein the outer piston cavity is fluidly bounded by the at least one outer seal and the at least one intermediate seal, and extends radially outward relative to the inner piston cavity,
            wherein the outer piston cavity is in fluid communication with the at least one second fluid port,
            wherein the inner piston cavity is fluidly bounded by the at least one intermediate seal and the at least one inner seal and is in fluid communication with the at least one first fluid inlet port,
      wherein the piston is configured to axially move relative to the housing while the outer piston cavity and the inner piston cavity remain in sealed engagement with the housing,
         such that the piston is axially movable in a first axial direction relative to the housing responsive to pressure received through either of the at least one first fluid inlet port or the at least one second fluid inlet port,
      wherein movement of the piston in the first axial direction is operative to impart an axially directed compressive engagement force to the plurality of discs
      wherein application of a relatively high hydraulic fluid pressure at the at least one first fluid inlet port is operative to cause:
         the high hydraulic fluid pressure to be in fluid communication with the generally annular inner piston cavity but not the generally annular outer piston cavity, and
         the piston to move in the first axial direction and apply a first compressive force to the plurality of discs to cause the clutch to be engaged,
      wherein application of a relatively low pneumatic fluid pressure at the at least one second fluid inlet port is operative to cause:
         the low pneumatic fluid pressure to be in fluid communication with the generally annular outer piston cavity but not the generally annular inner piston cavity, and
         the piston to move in the first axial direction and apply a second compressive force to the plurality of discs to cause the clutch to be engaged,
      wherein the second compressive force is substantially equal to the first compressive force.

2. The apparatus according to claim 1 wherein the piston includes
   an inner radially extending surface which bounds the inner piston cavity,
   an outer radially extending surface which bounds the outer piston cavity,
   an axially extending surface that extends radially intermediate of the inner radially extending surface and the outer radially extending surface.

3. The apparatus according to claim 2 wherein the at least one intermediate seal is in sealed engagement with the axially extending surface.

4. The apparatus according to claim 3 wherein the inner radially extending surface is axially disposed on the piston from the outer radially extending surface.

5. The apparatus according to claim 4 wherein the at least one intermediate seal is removable such that application of fluid pressure to either the at least one first fluid port or the at least one second fluid port at a pressure lower than the low pneumatic fluid pressure is operative to cause the piston to move in the first axial direction and apply a third compressive force to the plurality of discs, wherein the third compressive force is at least as great as at least one of the first compressive force and the second compressive force.

6. The apparatus according to claim 4
wherein the housing further includes a drain port, wherein the drain port is in fluid communication with the outer piston cavity,
wherein the drain port is configured to provide an outlet for hydraulic fluid that reaches the outer piston cavity when the clutch is actuated by high hydraulic fluid pressure applied to the inner piston cavity.

7. The apparatus according to claim 6, wherein the clutch further includes
at least one annular wiper seal, wherein the at least one wiper seal is positioned in movable sealed engagement between the piston and the housing,
wherein the at least one wiper seal is operatively positioned between the at least one outer seal and an area external of the housing.

8. The apparatus according to claim 7
wherein the plurality of discs include a plurality of friction discs and a plurality of separator discs, wherein a separator disc is positioned between each immediately adjacent pair of friction discs.

9. The apparatus according to claim 8, wherein the clutch further includes
a plurality of angled Bellville springs, wherein the Bellville springs act to oppose compressive force of the piston acting on the discs.

10. The apparatus according to claim 9
wherein a pair of angled Bellville springs is adjacent at least one separator disc, with one Bellville spring of the pair being disposed on each respective side of the separator disc and each Bellville spring in the pair angled in an opposed direction to the other Bellville spring of the pair.

11. The apparatus according to claim 9
wherein the piston includes a plurality of annular recesses, wherein each of the at least one outer seal, at least one intermediate seal, at least one inner seal and at least one wiper seal extend in a respective annular recess,
wherein the housing includes a plurality of axially extending annular faces,
wherein each seal is in movable sealed engagement with a respective adjacent axially extending annular face as the piston moves in the first axial direction.

12. The apparatus according to claim 11
wherein the at least one first fluid inlet port is configured to accept an air permeable screen therein, whereby the annular inner piston cavity can be open to atmosphere when the clutch is actuated by pneumatic fluid pressure applied to the outer piston cavity.

13. The apparatus according to claim 1 wherein at least one of the at least one first fluid port and the at least one second fluid port is in fluid connection with a flow control valve assembly, wherein the flow control valve assembly includes
a flow control axis,
a coil spring,
a poppet cartridge, wherein the poppet cartridge includes an interior cavity configured to house an axial portion of the spring,
wherein the poppet cartridge includes a stepped cylindrical outer surface, wherein a plurality of spaced apertures extend generally radially through the stepped cylindrical outer surface, wherein the apertures are in fluid communication with the interior cavity,
wherein the poppet cartridge further includes an end face, wherein a single orifice extends axially through the end face, the orifice being in fluid communication with the interior cavity, and sized to control rate of flow therethrough.

14. The apparatus according to claim 1
wherein the at least one first fluid inlet port is configured to accept an air permeable screen therein, whereby the inner piston cavity is enabled to be open to atmosphere when the clutch is actuated by pneumatic fluid pressure applied to the outer piston cavity.

15. The apparatus according to claim 1
wherein the housing further includes a drain port, wherein the drain port is in fluid connection with the outer piston cavity,
wherein the drain port is configured to provide an outlet for hydraulic fluid that reaches the outer piston cavity when the clutch is actuated by hydraulic fluid pressure applied to the inner piston cavity.

16. The apparatus according to claim 1
wherein the clutch is configured to have the high hydraulic fluid pressure and low pneumatic fluid pressure applied respectively to the at least one first fluid port and the at least one second fluid port at different times or to both the at least one first fluid port and the at least one second fluid port concurrently.

17. An apparatus comprising:
a clutch including
a housing,
wherein the housing includes
a first fluid port configured to have hydraulic fluid at a high fluid pressure applied thereto,
a second fluid port configured to have air pressure at a relatively lower pressure than the high hydraulic fluid pressure applied thereto,
a piston area,
a disc pack including a plurality of alternative friction discs and separator discs, wherein the discs are configured to be rotatable about an axis and wherein axial compression of the discs in the disc pack is operative to cause clutch engagement,
a piston, wherein the piston is configured to be axially movable within the piston area of the housing in movable sealed engagement,
a plurality of resilient seals, wherein the seals extend between the piston and the housing,
wherein the seals are operative to fluidly separate an axially expandable first piston cavity and an axially expandable second piston cavity within the piston area,
wherein the first piston cavity is bounded by a first radially extending area of the piston,
wherein the first piston cavity is in fluid connection with the first fluid port,
wherein the second piston cavity is bounded by a second radially extending area of the piston,
wherein the second radially extending area is larger than the first radially extending area,
wherein the second piston cavity is in fluid connection with the second fluid port,
wherein application of either or both of
high hydraulic fluid pressure to the first fluid port, and
relatively lower pneumatic pressure to the second fluid port,
is operative to cause the piston to move in the axial direction and compress the plurality of discs in the disc pack to engage the clutch.

18. The apparatus according to claim 17
wherein one of the piston and the housing includes an axially extending annular wall, wherein the axially extending annular wall extends between the first and second piston cavities, wherein at least one fluid seal fluidly separates the first and second piston cavities through engagement with the axially extending annular wall.

19. An apparatus comprising:
a clutch,
- wherein the clutch includes a housing,
  - wherein the housing includes at least two fluid inlet ports, including
    - at least one first fluid inlet port configured to receive hydraulic fluid, and
    - at least one second fluid inlet port configured to receive pneumatic fluid,
- wherein the clutch includes a plurality of discs that are rotatable about an axis,
  - wherein the discs include at least one separator disc and at least one friction disc,
- wherein the clutch includes a fluid pressure movable piston, wherein the piston is movably mounted in operative connection with the housing,
- wherein the piston and housing are in operative connection with a plurality of annular resilient seals,
  - wherein the plurality of annular seals include at least one radially outer seal, at least one radially intermediate seal and at least one radially inner seal,
- wherein the piston, housing and plurality of annular seals bound a plurality of generally radially extending axially expandable piston cavities, including
  - a generally annular outer piston cavity and a generally annular inner piston cavity,
  - wherein the outer piston cavity is fluidly bounded by the at least one outer seal and the at least one intermediate seal, and extends radially outward relative to the inner piston cavity,
  - wherein the outer piston cavity is in fluid communication with the at least one second fluid port,
  - wherein the inner piston cavity is fluidly bounded by the at least one intermediate seal and the at least one inner seal and is in fluid communication with the at least one first fluid inlet port,
- wherein the piston is configured to axially move relative to the housing while the outer piston cavity and the inner piston cavity remain in sealed engagement with the housing,
  - such that the piston is axially movable in a first axial direction relative to the housing responsive to pressure received through either of the at least one first fluid inlet port or the at least one second fluid inlet port,
- wherein movement of the piston in the first axial direction is operative to impart an axially directed compressive engagement force to the plurality of discs,
- wherein application of either a relatively high hydraulic fluid pressure at the at least one first fluid inlet port or application of a relatively low pneumatic fluid pressure at the at least one second fluid inlet port is operative to cause the piston to move in the first axial direction and compress the plurality of discs to engage the clutch.

* * * * *